United States Patent
Kim et al.

(10) Patent No.: US 9,864,459 B2
(45) Date of Patent: Jan. 9, 2018

(54) DRIVING CIRCUIT, TOUCH DISPLAY DEVICE, AND METHOD OF DRIVING THE TOUCH DISPLAY DEVICE

(71) Applicant: LG Display Co., Ltd., Seoul (KR)

(72) Inventors: Seungkyeom Kim, Paju-si (KR); SungChul Kim, Goyang-si (KR); Sungsu Han, Goyang-si (KR); JiYeon Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/222,876

(22) Filed: Jul. 28, 2016

(65) Prior Publication Data

US 2017/0242524 A1 Aug. 24, 2017

(30) Foreign Application Priority Data

Feb. 19, 2016 (KR) ........................ 10-2016-0019892

(51) Int. Cl.
*G06F 3/045* (2006.01)
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ............................. G06F 3/0416; G06F 3/044
See application file for complete search history.

(56) References Cited

U.S. PATENT DOCUMENTS 6,492,979 B1 * 12/2002 Kent .................... G06F 3/0414
178/18.01
7,839,392 B2 * 11/2010 Pak ......................... G06F 3/044
345/173

(Continued)

FOREIGN PATENT DOCUMENTS

CN 101436111 A 5/2009
CN 105117080 A 12/2015

(Continued)

OTHER PUBLICATIONS

Korean Office Action, Korean Application No. 10-2016-0019892, dated Feb. 2, 2017, 8 pages (with concise explanation of relevance).

(Continued)

*Primary Examiner* — Peter D McLoone
(74) *Attorney, Agent, or Firm* — Fenwick & West LLP

(57) ABSTRACT

A driving circuit, a touch display device, and a method of driving the touch display device. A plurality of first electrodes are disposed within a display panel. A second electrode is disposed outside of the display panel. A driving circuit detects at least one of a touch position and a touching force of a touch by sequentially applying a first electrode driving signal to at least one first electrode among the plurality of first electrodes and applying a second electrode driving signal to the second electrode in a touch driving period. When a user touches a screen, not only can a touch position be sensed, but also a touching force with which the user presses the screen can also be efficiently sensed. This provides a range of functions that existing touch position-detecting technologies have failed to provide.

30 Claims, 66 Drawing Sheets

(56) References Cited

U.S. PATENT DOCUMENTS

| | | | |
|---|---|---|---|
| 2007/0030255 A1* | 2/2007 | Pak | G06F 3/044 |
| | | | 345/173 |
| 2011/0128254 A1 | 6/2011 | Teranishi et al. | |
| 2013/0141348 A1* | 6/2013 | Jamshidi-Roudbari | G06F 3/044 |
| | | | 345/173 |
| 2013/0234734 A1 | 9/2013 | Iida et al. | |
| 2014/0247239 A1* | 9/2014 | Jamshidi-Roudbari | |
| | | | G06F 3/0414 |
| | | | 345/174 |
| 2014/0267128 A1 | 9/2014 | Bulea et al. | |
| 2015/0084873 A1* | 3/2015 | Hagenbuch | G06F 3/0416 |
| | | | 345/173 |
| 2015/0268783 A1* | 9/2015 | Yoon | G06F 3/044 |
| | | | 345/173 |
| 2016/0026297 A1* | 1/2016 | Shinkai | G06F 3/044 |
| | | | 345/174 |
| 2016/0259481 A1* | 9/2016 | Lee | G02F 1/133345 |
| 2017/0045992 A1* | 2/2017 | Lee | G06F 3/0416 |

FOREIGN PATENT DOCUMENTS

| | | |
|---|---|---|
| CN | 204965385 A | 1/2016 |
| CN | 205038623 A | 2/2016 |
| EP | 2 214 084 A1 | 8/2010 |
| KR | 101486493 B1 | 1/2015 |
| KR | 10-2015-0032409 A | 3/2015 |
| KR | 10-2016-0004242 A | 1/2016 |
| KR | 101583765 B1 | 1/2016 |

OTHER PUBLICATIONS

European Extended Search Report, European Application No. 16182515.3, dated Jun. 27, 2017, 10 pages.

* cited by examiner

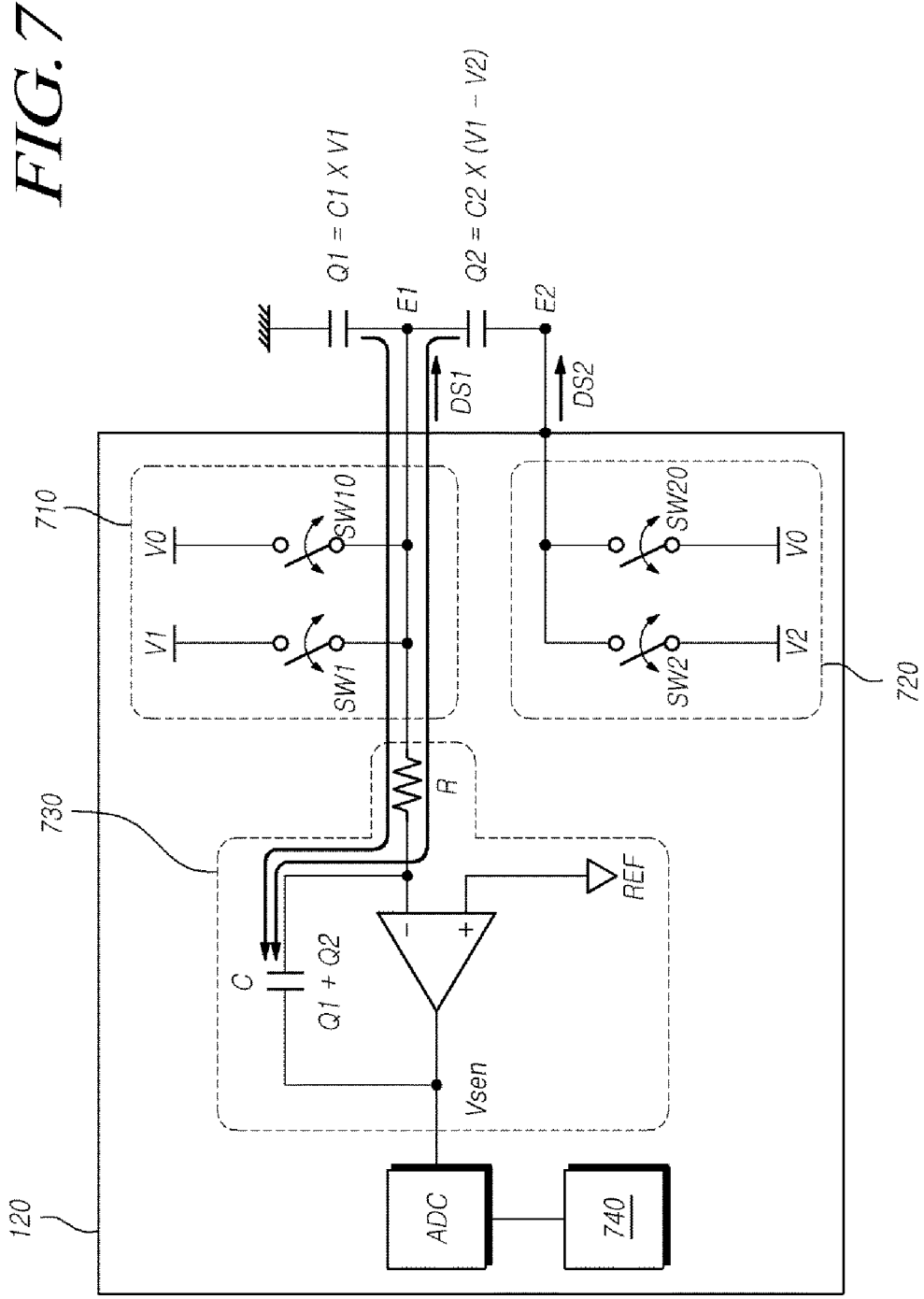

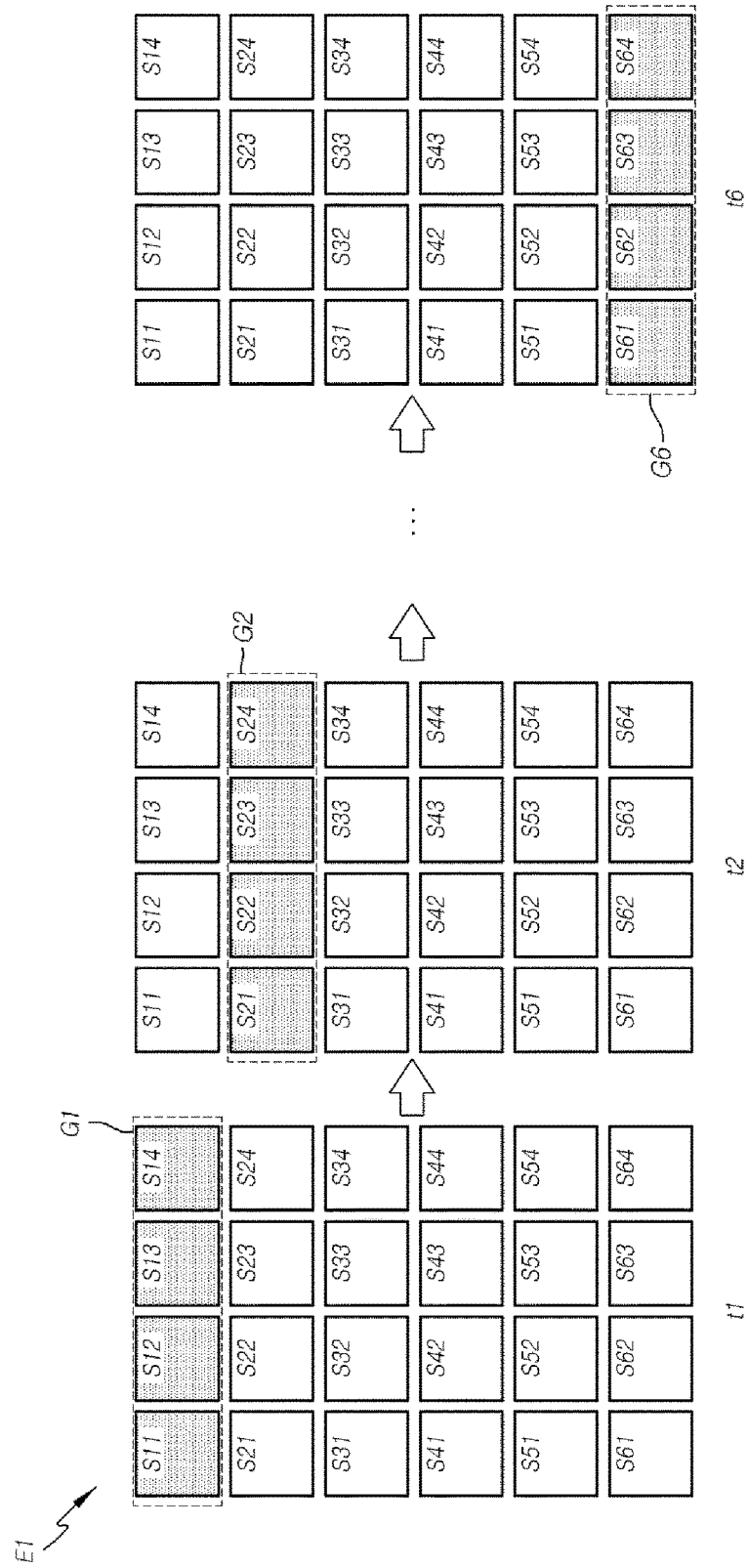

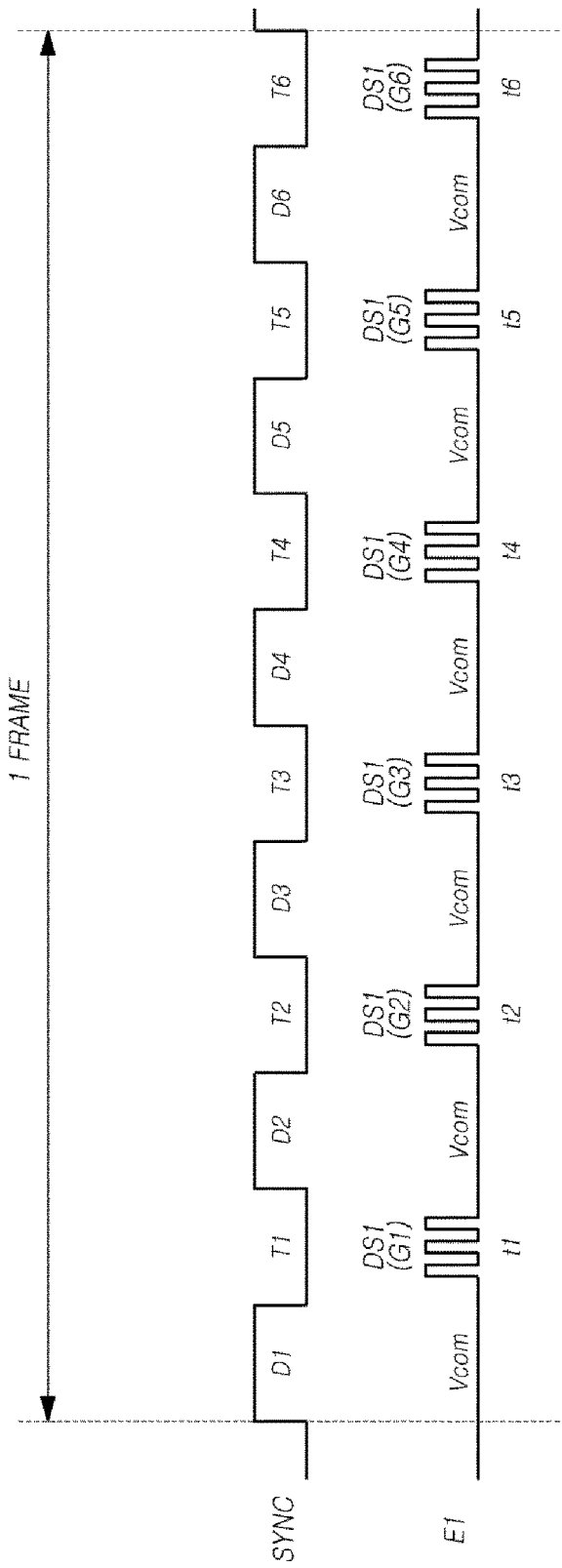

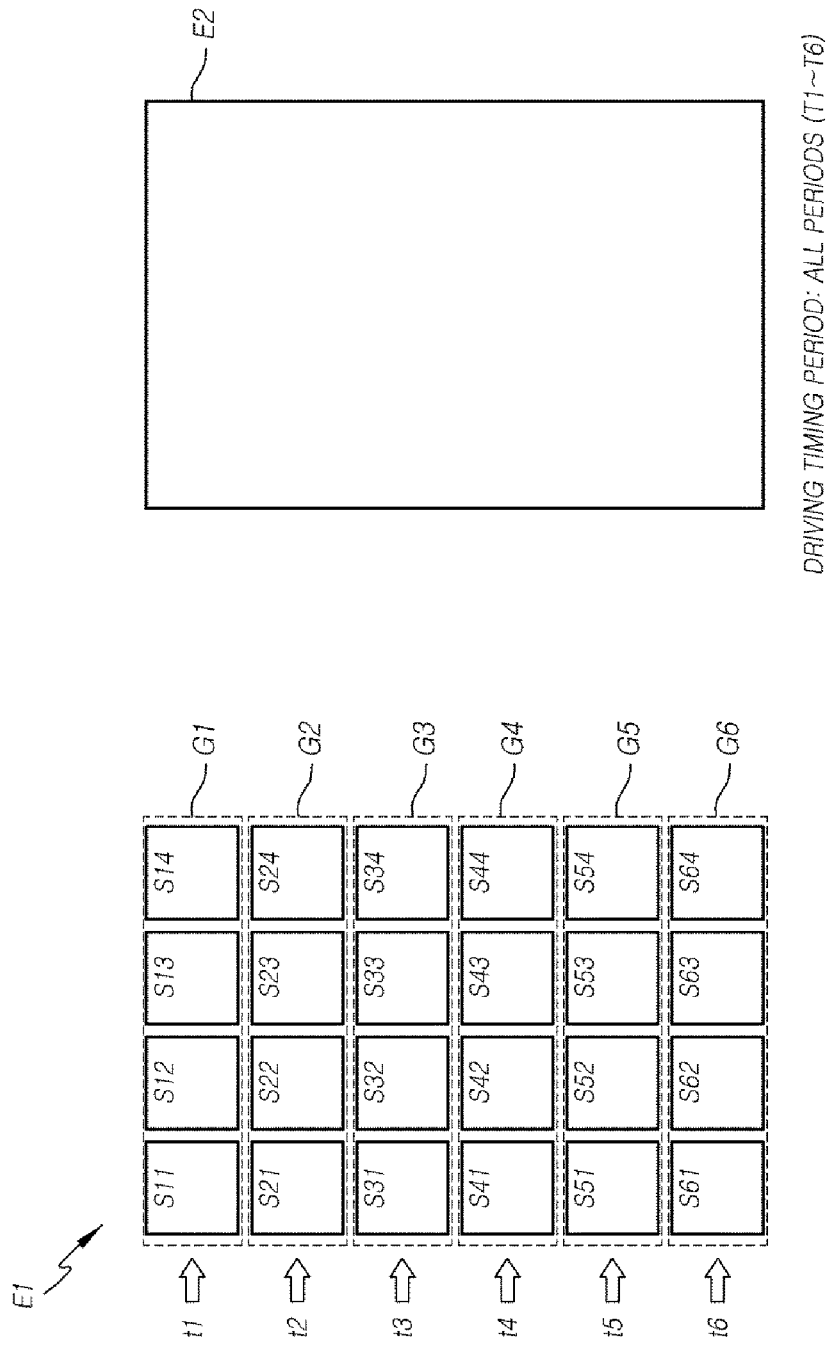

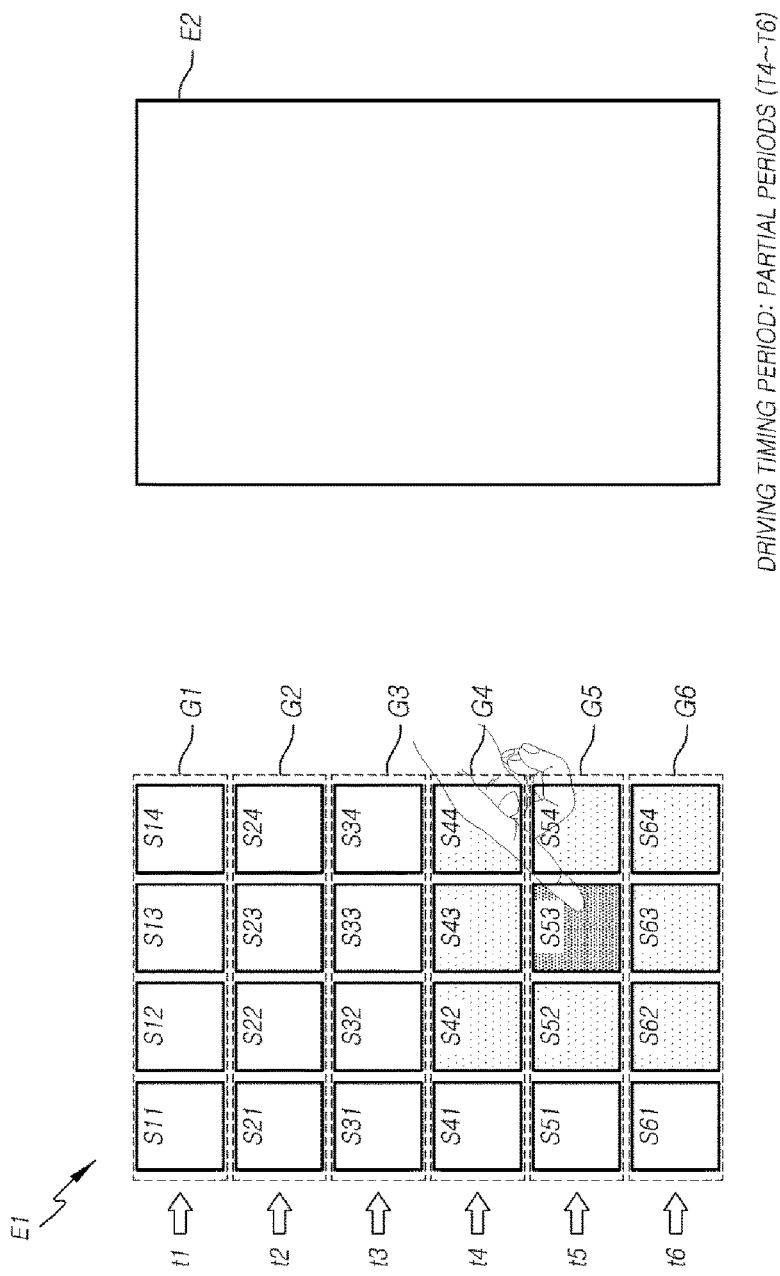

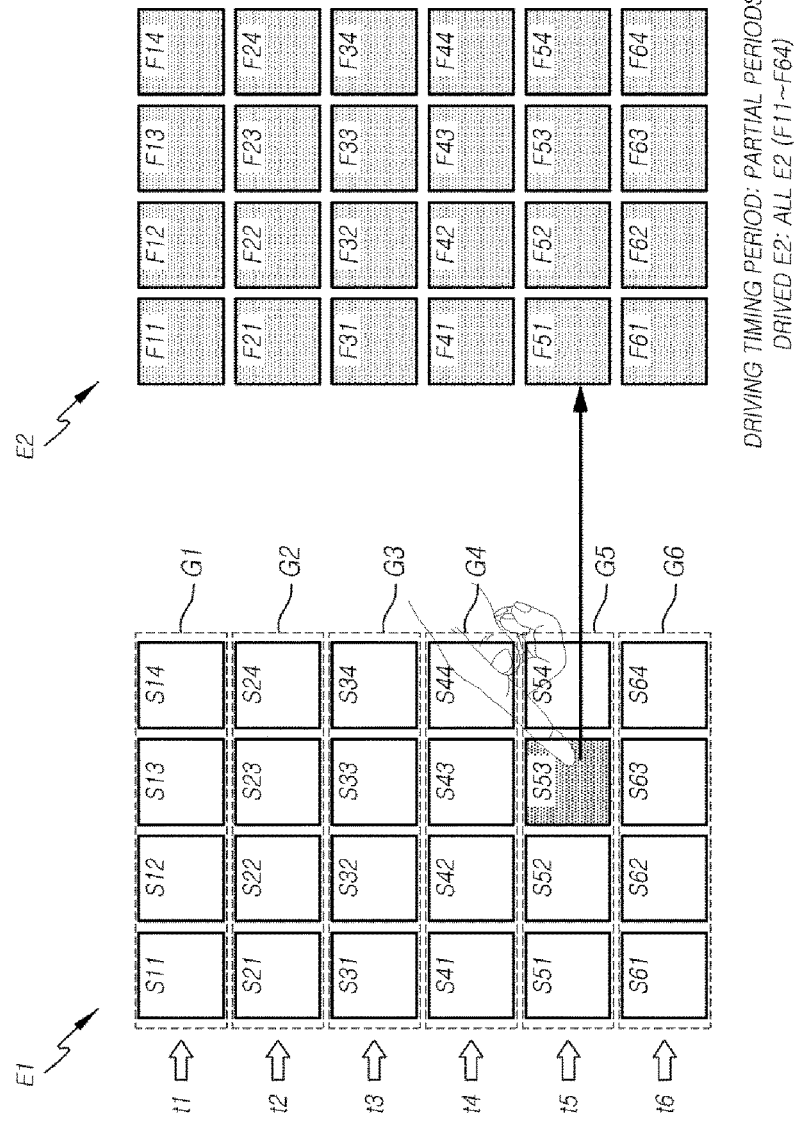

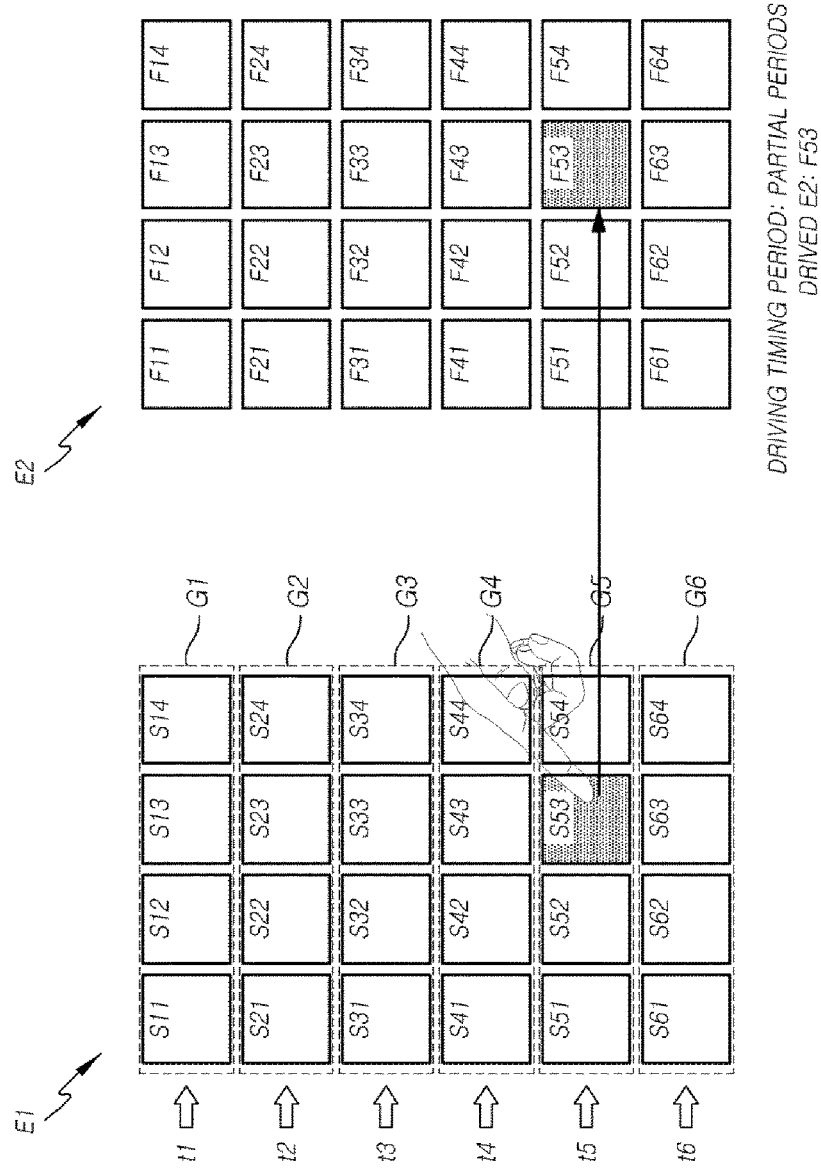

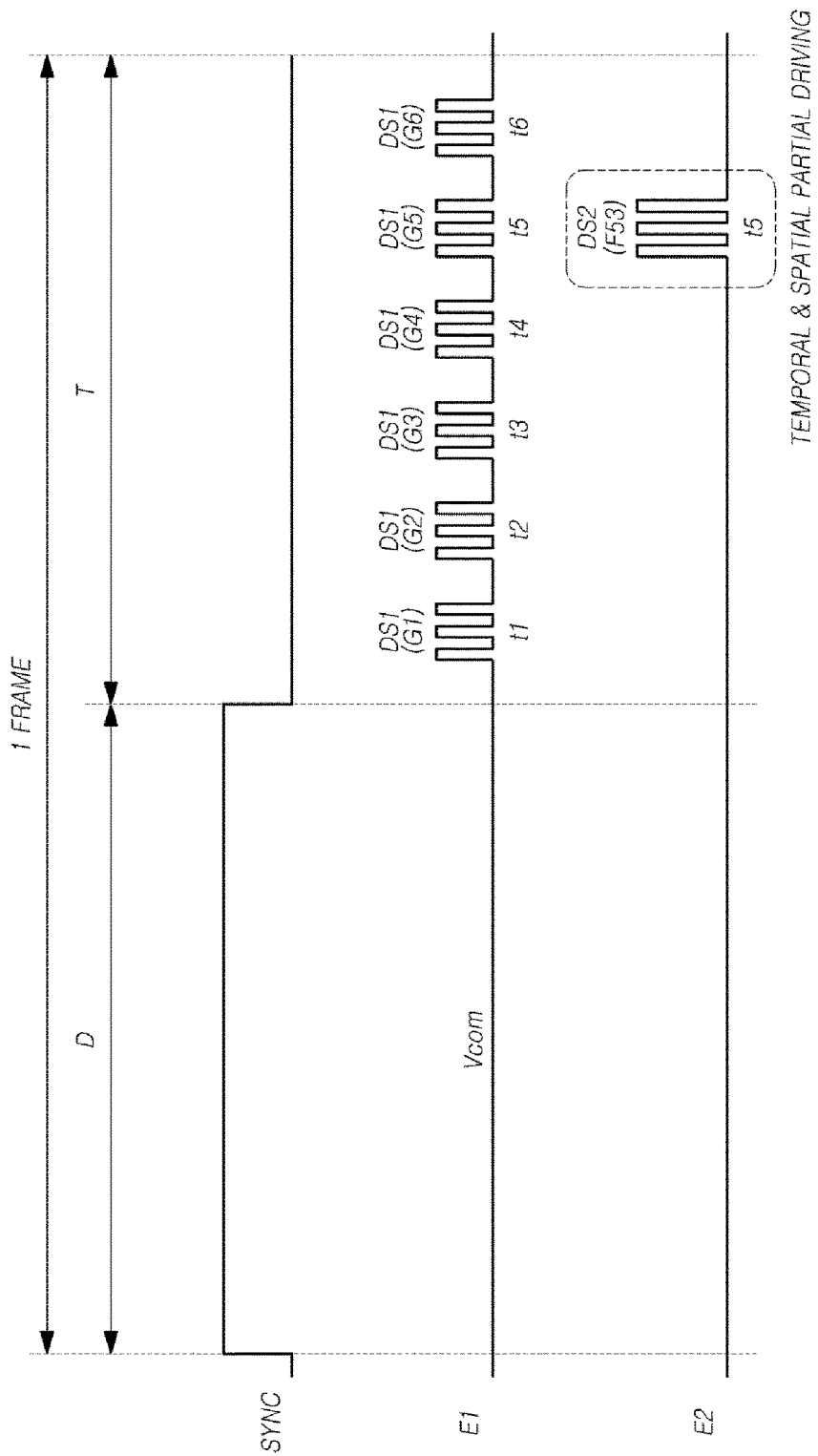

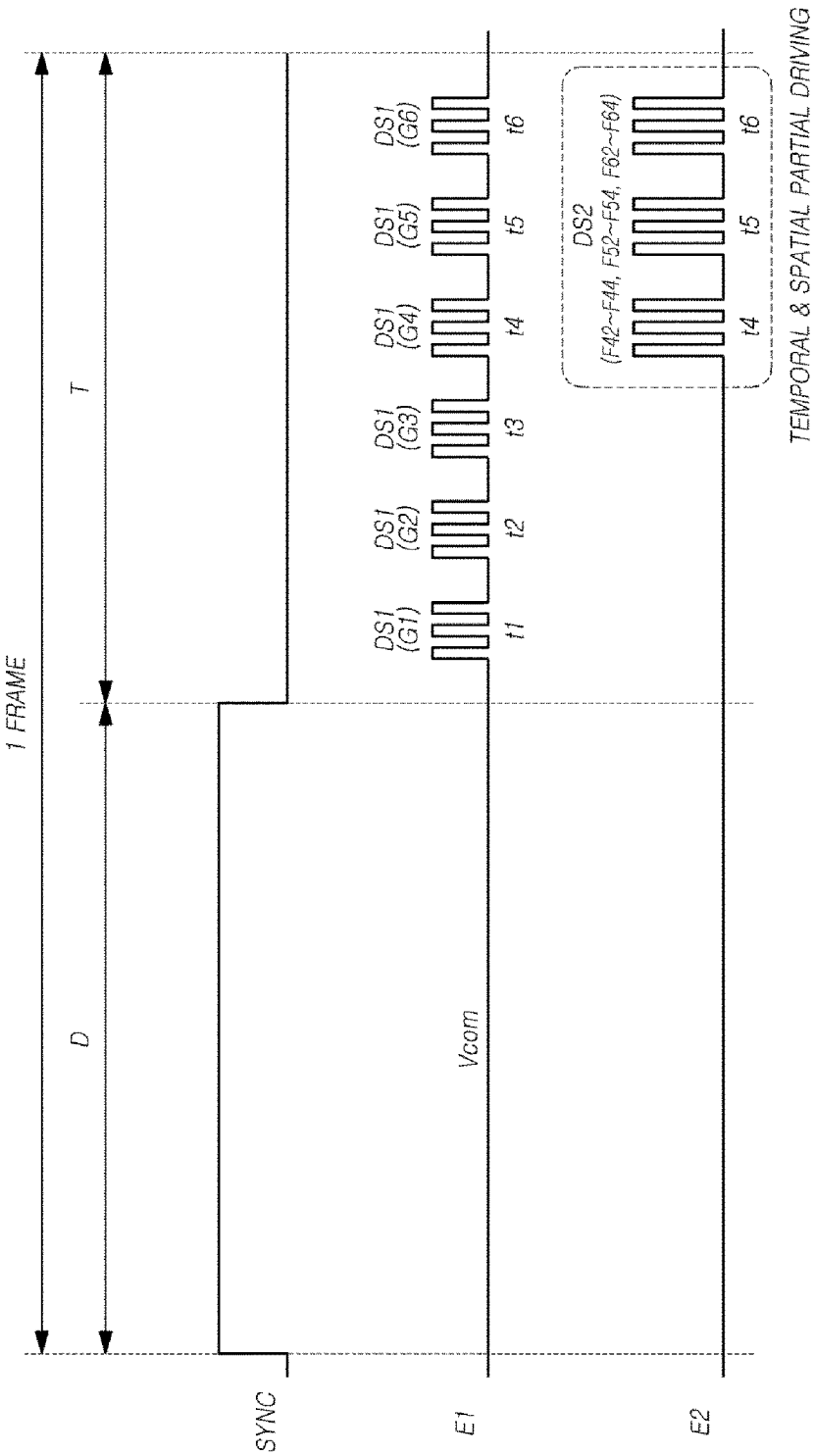

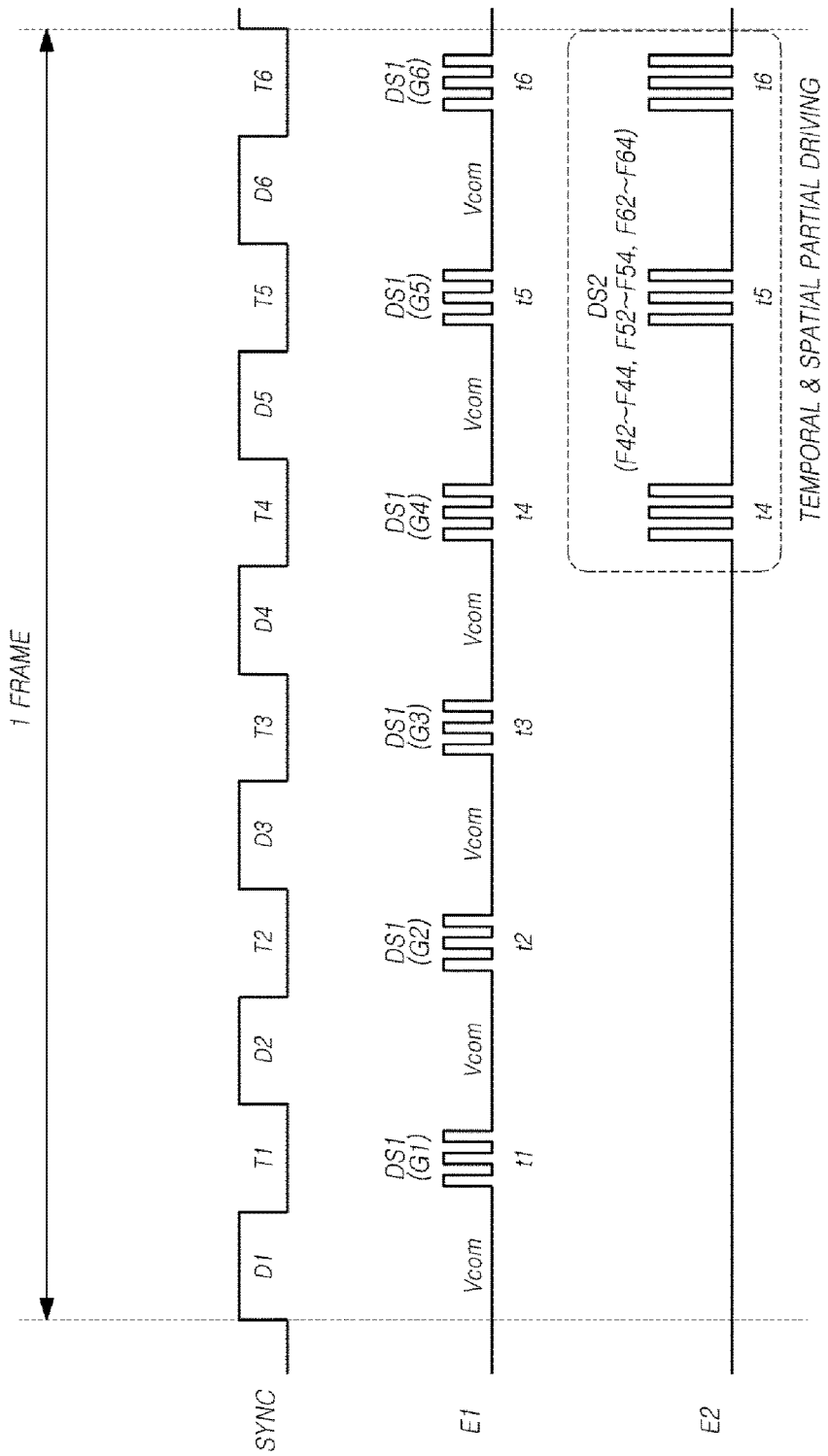

DRIVING CIRCUIT, TOUCH DISPLAY DEVICE, AND METHOD OF DRIVING THE TOUCH DISPLAY DEVICE

CROSS REFERENCE TO RELATED APPLICATION

This application claims priority from and the benefit under 35 U.S.C. §119(a) of Republic of Korea Patent Application Number 10-2016-0019892 filed on Feb. 19, 2016, which is hereby incorporated by reference for all purposes as if fully set forth herein.

BACKGROUND

Field

The present disclosure relates to a driving circuit, a touch display device, and a method of driving the touch display device.

Description of Related Art

In response to the development of the information society, there has been increasing demand for various types of display devices able to display images. A range of display devices, such as liquid crystal display (LCD) devices, plasma display panels (PDPs), and organic light-emitting diode (OLED) display devices, are in common use.

Such display devices may be included in mobile devices, such as smartphones and tablets, and medium-sized or larger display devices, such as smart TVs, to provide a touch-based user interface for user convenience according to various device characteristics.

Such display devices allowing for touch-based device interactions are being developed to provide a wider range of functions, and user demands are also becoming ever more diverse.

However, currently available touch-type user interfaces are designed to only detect a point touched by a user (touch coordinates) and execute input processing at the sensed touch position. Current touch-type user interfaces are limited in current circumstances in which a large number of functions must be provided in a range of types and shapes and a large number of user demands must be satisfied.

BRIEF SUMMARY

Various aspects of the present disclosure provide a driving circuit, a touch display device, and a method of driving the touch display device, in which, when a user touches a screen, not only can a touch position be sensed, but also a touching force with which the user presses the screen can also be efficiently sensed, in order to provide a range of functions.

Also provided are a driving circuit, a touch display device, and a method of driving the touch display device, in which electrodes of a single type disposed within a display panel can be simultaneously used for three distinct driving operations, including display (image output), touch sensing, and force sensing.

Also provided are a driving circuit, a touch display device, and a method of driving the touch display device, in which both a touch sensing operation and a force sensing operation can be simultaneously executed in a touch driving period.

Also provided are a driving circuit, a touch display device, and a method of driving the touch display device, in which multiple touches can be detected by executing force sensing.

According to an aspect of the present invention, a touch display device may include: a plurality of first electrodes disposed within a display panel; a second electrode disposed outside of the display panel; and a driving circuit. The driving circuit detects at least one of a touch position and a touching force of a touch by sequentially applying a first electrode driving signal to at least one first electrode among the plurality of first electrodes and applying a second electrode driving signal to the second electrode in a touch driving period.

According to another aspect of the present invention, a method of driving a touch display device may include: driving a display panel in a display driving period; sequentially driving at least one first electrode among a plurality of first electrodes disposed within the display panel and driving a second electrode disposed outside of the display panel in a touch driving period; and detecting at least one of a touch position and a touching force of a touch.

According to further another aspect of the present invention, a driving circuit may include: a signal generating circuit generating and outputting a first electrode driving signal; a first electrode driving circuit receiving the first electrode driving signal and applying the first electrode driving signal to at least one first electrode among a plurality of first electrodes in a touch driving period; and a second electrode driving circuit applying a second electrode driving signal to a second electrode disposed outside of a display panel in the touch driving period.

According to yet another aspect of the present invention, a touch display device may include: a plurality of first electrodes disposed within a display panel; a second electrode disposed outside of the display panel, the second electrode comprising two or more split electrodes; and a driving circuit applying a first electrode signal to the plurality of first electrodes and applying a second electrode driving signal to the two or more split electrodes.

According to the present disclosure as set forth above, when a user touches a screen, not only can a touch position be sensed, but also a touching force with which the user presses the screen can also be efficiently sensed, in order to provide a range of functions.

In addition, according to the present disclosure, the electrodes of a single type disposed within the display panel can be simultaneously used for three distinct driving operations, including display (image output), touch sensing, and force sensing.

Furthermore, according to the present disclosure, both a touch sensing operation and a force sensing operation can be simultaneously executed in a touch driving period.

In addition, according to the present disclosure, it is possible to detect multiple touches by executing force sensing.

In one embodiment, a touch display device comprises a plurality of first electrodes disposed within a display panel. The display device also includes one or more second electrodes separated from the first electrodes by a gap. The display device also includes a driving circuit. The driving circuit applies a first electrode driving signal to at least one first electrode among the plurality of first electrodes, applies a second electrode driving signal different than the first electrode driving signal to the one or more second electrodes, and detects touch position and force touch based on a signal generated responsive to both the first electrode driving signal and the second electrode driving signal.

In one embodiment, the driving circuit applies a common voltage to the at least one first electrode during a display driving period of a frame period; and the driving circuit applies the first electrode driving signal and the second electrode driving signal during a touch driving period of the frame period, the touch driving period distinct in time from the display driving period.

In one embodiment, the first electrode driving signal is a pulse signal, and the second electrode driving signal is a pulse signal or a signal having a direct current (DC) voltage.

In one embodiment, when the first electrode driving signal and the second electrode driving signal are pulse signals, the first electrode driving signal and the second electrode driving signal are in phase with each other or 180 degrees out of phase with each other.

In one embodiment, when the first electrode driving signal and the second electrode driving signal are in-phase pulse signals, an amplitude of the second electrode driving signal is greater than an amplitude of the first electrode driving signal.

In one embodiment, the direct current voltage is a predetermined reference voltage or a ground voltage.

In one embodiment, the one or more second electrodes is a single second electrode that corresponds to all of the plurality of first electrodes. The plurality of first electrodes is divided into a plurality of first electrode groups. The driving circuit applies, during a frame period, the first electrode driving signal to respective groups of the first electrode groups at different respective times.

In one embodiment, the driving circuit applies, during a frame period, the second electrode driving signal to the second electrode during each of the different respective times.

In one embodiment, the driving circuit applies, during a frame period, the second electrode driving signal to the second electrode only at a point in time at which the first electrode driving signal is applied to an electrode group among the first electrode groups corresponding to a previously-detected touch position.

In one embodiment, the driving circuit applies, during a frame period, the second electrode driving signal to the second electrode only at a points in time at which the first electrode signal is applied to an electrode group among the first electrode groups corresponding to a previously-detected touch position and is applied to other electrode groups among the first electrode groups that are adjacent to the electrode group.

In another embodiment the one or more second electrodes comprises a plurality of second electrodes. The plurality of first electrodes are divided into a plurality of first electrode groups and the driving circuit applies, during a frame period, the first electrode driving signal to respective groups of the first electrode groups at different respective times.

In one embodiment, the driving circuit applies, during the frame period, the second electrode driving signal to all of the plurality of second electrodes during each of the different respective times.

In one embodiment, the driving circuit applies, during a frame period, the first electrode driving signal to respective groups of the first electrode groups at different respective times while also providing the second electrode driving signal to respective groups of the second electrode groups at each of the different respective times.

In one embodiment, the driving circuit applies, during the frame period, the second electrode driving signal to all of the plurality of second electrodes only at a point in time during which the first electrode driving signal is applied to an electrode group among the plurality of first electrode groups corresponding to a previously-detected touch position.

In one embodiment, the driving circuit applies, during the frame period, the second electrode driving signal to all of the plurality of second electrodes only at points in time at which the first electrode signal is applied to an electrode group of the electrode groups and is applied to other electrode groups among the first electrode groups that are adjacent to the electrode group.

In one embodiment, the driving circuit applies the second electrode driving signal during the frame period and at a point in time at which the first electrode driving signal is applied to an electrode group among the plurality of first electrode groups corresponding to a previously-detected touch position, the second electrode driving signal applied only to a single second electrode among the plurality of second electrodes that corresponds to the previously-detected touch position.

In one embodiment, the driving circuit applies the second electrode driving signal during the frame period and at a point in time at which the first electrode driving signal is applied to an electrode group among the plurality of first electrode groups corresponding to a previously-detected touch position and other electrode groups among the plurality of first electrode groups adjacent to the electrode group, the second electrode driving signal applied only to a subset of the second electrodes corresponding to the previously-detected touch position and adjacent to the previously-detected touch position.

In one embodiment, the signal used by the driving circuit to detect touch position and force touch is a signal received from the one or more first electrodes.

In one embodiment, a size of the gap varies depending on a force of a touch.

In one embodiment, a driving circuit for a touch display device is disclosed. The driving circuit comprises a first circuit to apply a first electrode driving signal to at least one first electrode among the plurality of first electrodes. A second circuit is to apply a second electrode driving signal different than the first electrode driving signal to the one or more second electrodes. A third circuit is to detect touch position and force touch based on a signal generated responsive to both the first electrode driving signal and the second electrode driving signal.

In one embodiment, a method of driving a touch display device is disclosed. The method comprises applying a first electrode driving signal to at least one first electrode among the plurality of first electrodes; applying a second electrode driving signal different than the first electrode driving signal to the one or more second electrodes; and
detecting touch position and force touch based on a signal generated responsive to both the first electrode driving signal and the second electrode driving signal.

BRIEF DESCRIPTION OF THE DRAWINGS

The above and other objects, features and advantages of the present disclosure will be more clearly understood from the following detailed description when taken in conjunction with the accompanying drawings, in which:

FIG. 7 is an exemplary view of the driving circuit of the touch display device according to the present embodiments;

FIG. 19, FIG. 20A, and FIG. 20B illustrate an exemplary first electrode driving method of the touch display device according to the present embodiments;

FIG. 21, FIG. 22A, and FIG. 22B illustrate an exemplary touch driving method including full driving of the second electrode in the touch display device according to the present embodiments when the second electrode is an electrode plate;

FIG. 25, FIG. 26A, and FIG. 26B illustrate an exemplary touch driving method including extended temporal partial driving of the second electrode in the touch display device according to the present embodiments when the second electrode is an electrode plate;

FIG. 31, FIG. 32A, and FIG. 32B illustrate an exemplary touch driving method including temporal partial driving of the second electrode when the second electrode of the touch display device according to the present embodiments is a split electrode assembly;

FIG. 35, FIG. 36A, and FIG. 36B illustrate an exemplary touch driving method including temporal/spatial partial driving of the second electrode when the second electrode of the touch display device according to the present embodiments is a split electrode assembly;

FIG. 37, FIG. 38A, and FIG. 38B illustrate an exemplary touch driving method including extended temporal/spatial partial driving of the second electrode when the second electrode of the touch display device according to the present embodiments is a split electrode assembly;

DETAILED DESCRIPTION

Figure 1:
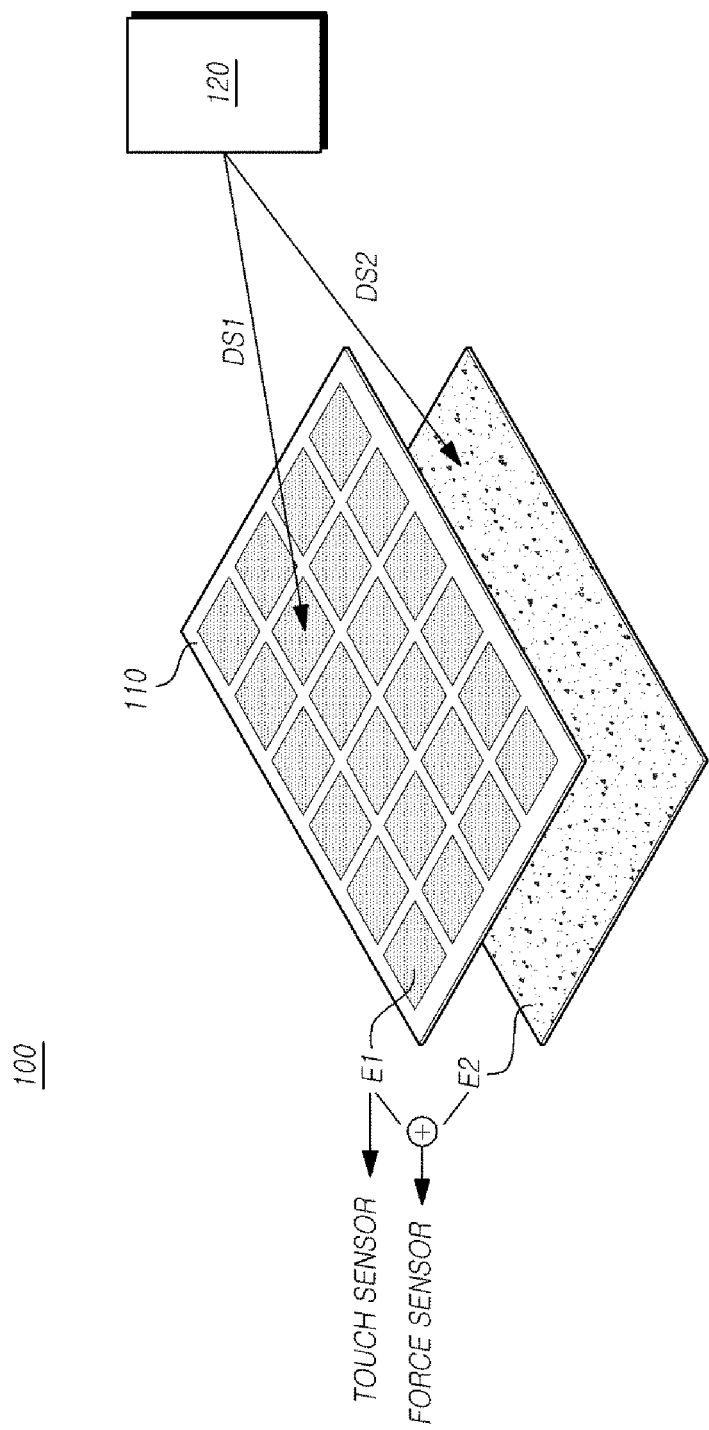
FIG. 1 schematically illustrates a touch display device according to exemplary embodiments.

Reference will now be made in detail to embodiments of the present disclosure, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected" or "coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 schematically illustrates a touch display device 100 according to exemplary embodiments.

Referring to FIG. 1, the touch display device 100 according to the present embodiments can provide not only a display function to display images, but also a "touch sensing function" to detect a touch position (i.e. a concept including whether or not a touch has occurred, and also referred to as touch coordinates) when the screen has been touched by a pointer, such as a finger or a stylus, and/or and a "force sensing function" to detect a touching force corresponding to the magnitude of force (pressure) applied by a user touching the screen.

The term "touch" used herein refers to an action in which the user touches a display panel 110 with a pointer, such as a finger or a stylus.

Here, the term "touch" may be divided into "soft touch" in which the magnitude of force (pressure) of pressing the display panel 110 is equal to or less than a predetermined magnitude and "force touch (strong touch)" in which the magnitude of force (pressure) pressing the display panel 110 is greater than the predetermined magnitude.

The pointer may be a pointer, such as a finger of the user or a stylus, a panel contact portion of which is formed of a conductive material, or in some cases, may be a pointer, a panel contact portion of which is formed of a nonconductive material.

For the touch sensing function, the pointer must be a pointer, the panel contact portion of which is formed of a conductive material. In contrast, for the force sensing function, the pointer may be a pointer formed not only of a conductive material, but also of a nonconductive material. The pointer for the force sensing function may be any type of pointer able to press the screen.

That is, when a soft touch is performed using the pointer, the panel contact portion of which is formed of a conductive material, the touch display device 100 can detect a touch position (touch coordinates) using the touch sensing function. The touch position is also referred to as touch coordinates, and may be a concept including whether or not a touch has actually occurred.

When a force touch is performed using the pointer, the panel contact portion of which is formed of a conductive material, the touch display device 100 can detect a touch position using the touch sensing function and can detect a touching force corresponding to the magnitude of force (pressure) applied by the user using the force sensing function.

When a force touch is performed using the pointer, the panel contact portion of which is formed of a nonconductive material, the touch display device 100 can detect a touching force corresponding to the magnitude of applied force (pressure) using the force sensing function.

Referring to FIG. 1, the touch display device 100 according to the present embodiments includes a plurality of first electrodes E1, at least one second electrode E2, and a driving circuit 120.

The plurality of first electrodes E1 form "touch sensors" required to determine whether or not a touch has occurred and to detect touched coordinates. The plurality of first electrodes E1 may be disposed on a touchscreen panel separate from the display panel 110 or may be disposed within the display panel 110.

When the plurality of first electrodes E1 are disposed within the display panel 110, the display panel 110 may be referred to as a "touchscreen embedded display panel" within which the plurality of first electrodes E1 functioning as touch sensors are disposed.

The touchscreen disposed within the display panel 110 may be an in-cell touchscreen panel or an on-cell touchscreen panel.

The second electrode E2 is an electrode added to sense a touching force, and may be located outside (e.g. on the bottom, top, and sides) of the display panel 110.

In order to sense the touching force, not only the second electrode E2 is operated, but also the plurality of first electrodes E1 are operated.

Thus, in the touch display device 100 according to the present embodiments, the plurality of first electrodes E1 disposed within the display panel 110 and the second electrode E2 located outside of the display panel 110 may be collectively referred to as "force sensors."

In the touch display device 100 according to the present embodiments, the first electrodes E1 function as touch sensors for detecting a touch position as well as force sensors for detecting a touching force.

In addition, in the touch display device 100 according to the present embodiments, the first electrodes E1 may be one type of display electrodes to which display driving voltages are applied during a display driving period.

For example, in the touch display device 100 according to the present embodiments, the first electrodes E1 may be common electrodes to which common voltages Vcom corresponding to display driving voltages are applied during the display driving period. Here, the common voltages Vcom may be voltages corresponding to pixel voltages (data voltages) of subpixels.

When the first electrodes E1 are used as one type of display driving electrodes to which display driving voltages are applied during the display driving period, the first electrodes E1 perform three functions, namely those of touch sensors, force sensors, and display driving electrodes.

During the display driving period, the second electrode E2 may be in a floating state in which no voltage is applied thereto, may be in a state in which a ground voltage GND is applied thereto, may be in a state in which a specific DV voltage other than the ground voltage GND is applied thereto, or may be in a state in which an AC voltage is applied thereto.

Although the second electrode E2 may be controlled to be in a variety of voltage states during the display driving period as described above, it is more advantageous, in terms of system reliability and reductions of power consumption, to set the second electrode E2 to be in a floating state or to apply a specific DC voltage to the second electrode E2.

Figure 2:
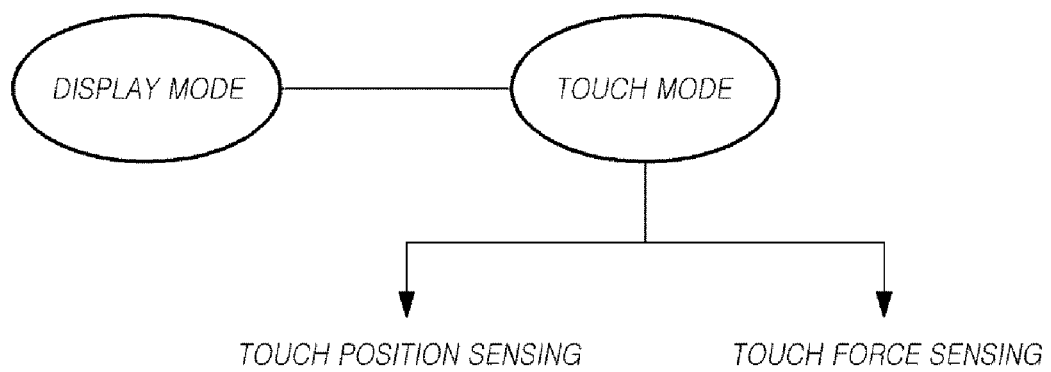
FIG. 2 illustrates two driving modes of the touch display device according to the present embodiments.

FIG. 2 illustrates two driving modes of the touch display device 100 according to the present embodiments.

The two driving modes of the touch display device 100 according to the present embodiments include a display mode of providing a display function to display images and a touch mode of providing a touch sensing function to detect a touch position and a force sensing function to detect a touching force.

In a predefined display driving period, the touch display device 100 according to the present embodiments can provide a display function of displaying an intended image by driving a variety of display driving electrodes, such as data lines and gate lines, arranged on the display panel 110, and thus controlling the gradation levels of subpixels defined by the data lines and the gate lines.

In a predefined touch driving period, the touch display device 100 according to the present embodiments can provide a touch sensing function of detecting a touch position and a force sensing function of detecting a touching force by driving the plurality of first electrodes E1 as well as driving the second electrode E2 using the driving circuit 120.

Returning to FIG. 1, in the touch driving period, the driving circuit 120 can drive the plurality of first electrodes E1 by sequentially applying a first electrode driving signal DS1 to the plurality of first electrodes E1 and drive the second electrode E2 by applying a second electrode driving signal DS2 to the second electrode E2, thereby detecting at least one of a touch position and a touching force in response to a single touch.

In the touch driving period, the driving circuit 120 may detect a touch position, a touching force, or both the touch position and the touching force in the single touch, depending on touch type, by driving the plurality of first electrodes E1 and driving the second electrode E2.

In this regard, the driving circuit 120 executes the same sensing process regardless of touch type, thereby obtaining detection results regarding both a touch position and a touching force or obtaining a detection result on the touch position or the touching force, instead of detecting the touch position, the touching force, or both the touch position and the touching force in the single touch by executing different sensing processes depending on touch type.

As described above, the touch display device 100 according to the present embodiments can detect both a touch position and a touching force in a single touch mode in which the touch display device 100 is operating, instead of using a touch position-detecting operating mode (i.e. an operating mode for the touch sensing function) and a touching force-detecting operating mode (i.e. an operating mode for the force sensing function) as separate operating modes. In other words, the number of operating modes of the touch display device 100 may be reduced.

Consequently, it is easier to control each of the operating driving periods, and it is unnecessary to spend a greater amount of time (a longer time) to detect a touch position and a touching force, such that a greater amount of time (a longer time) can be allocated to the display driving period, thereby improving image display performance.

The display driving period in which the touch display device 100 operates in the display mode and the touch driving period in which the touch display device 100 operates in the touch mode may be set by collectively considering display efficiency, touch sensing efficiency, and force sensing efficiency.

The display driving period and the touch driving period may occur at different times or may overlap in time. In some cases, intervals of time in which the display driving period and the touch driving period are divided and intervals of time in which the display driving period and the touch driving period overlap may be mixed.

For example, a single frame period may include at least one display driving period. One or more touch driving periods may be present in every frame period.

As described above, it is possible to set the display driving period, in which the touch display device 100 operates in the display mode, and the touch driving period, in which the touch display device 100 operates in the touch mode, as a variety of forms by collectively considering display efficiency, touch sensing efficiency, and force sensing efficiency. It is thereby possible to improve the display performance, the touch sensing performance, and the force sensing performance of the touch display device 100.

Returning to FIG. 1, in the touch driving period, the driving circuit 120 can detect at least one of a touch position and a touching force in response to a single touch, based on signals received from the first electrodes E1.

As described above, it is possible to simultaneously detect a touch position and a touching force based on signals obtained by a signal detection process via the first electrodes E1, without having to individually execute a signal detection process for detecting the touch position and a signal detection process for detecting the touching force.

Figure 3A:
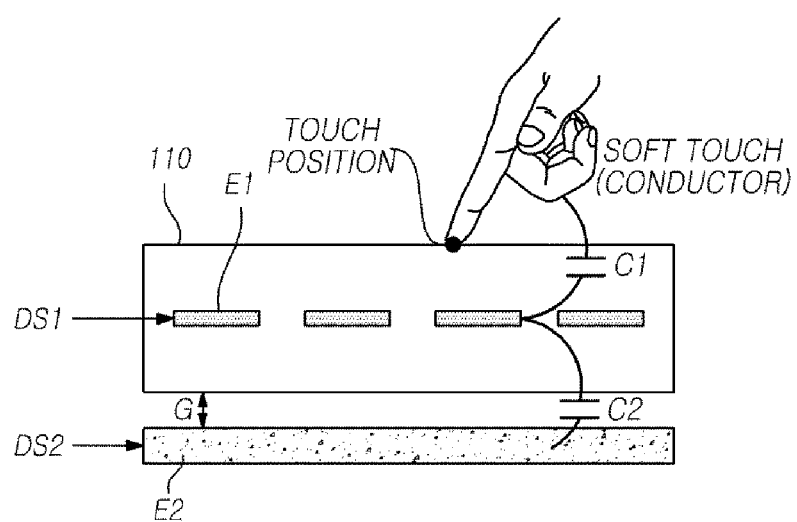
FIG. 3A and FIG. 3B illustrate a sensing method for a first touch type in the touch display device according to the present embodiments.
Figure 3B:
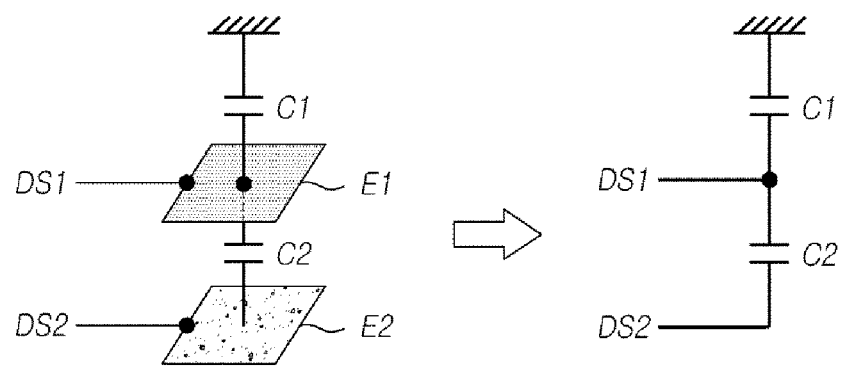
Figure 4A:
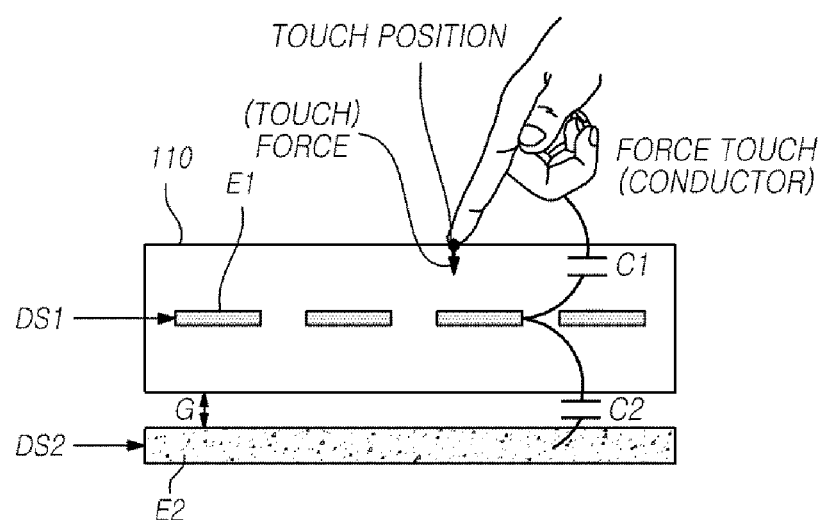
FIG. 4A and FIG. 4B illustrate a sensing method for a second touch type in the touch display device according to the present embodiments.
Figure 4B:
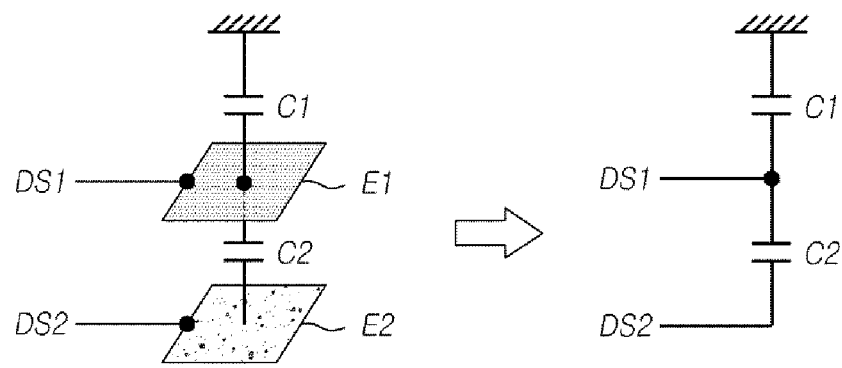
Figure 5A:
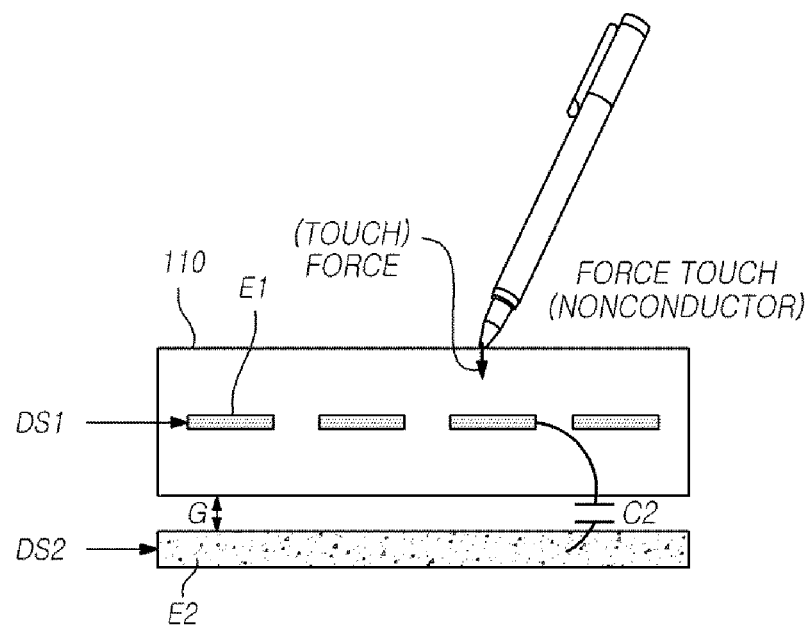
FIG. 5A and FIG. 5B illustrate a sensing method for a third touch type in the touch display device according to the present embodiments.
Figure 5B:
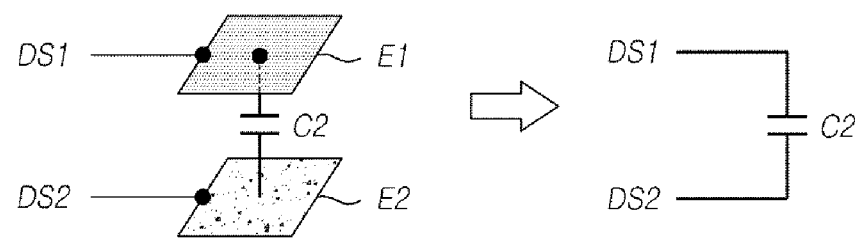

FIG. 3A and FIG. 3B illustrate a sensing method for a first touch type in the touch display device 100 according to the present embodiments, FIG. 4A and FIG. 4B illustrate a sensing method for a second touch type in the touch display device 100 according to the present embodiments, and FIG. 5A and FIG. 5B illustrate a sensing method for a third touch type in the touch display device 100 according to the present embodiments.

Referring to FIG. 3A to FIG. 5B, in a touch driving period, the driving circuit 120 executes an operation for detecting a touch position and a touching force by sequentially applying a first electrode driving signal DS1 to the plurality of first electrodes E1 and applying a second electrode driving signal DS2 to the second electrode E2.

In response to the operation of the driving circuit 120 in the touch driving period, a first capacitance C1 is formed between a pertinent first electrode E1 and a pointer matching the first touch type, and a second capacitance C2 is formed between the pertinent first electrode E1 and the second electrode E2.

The first capacitance C1 and the second capacitance C2 formed in relation to the pertinent first electrode E1 may vary depending on whether or not a touch has occurred in the position of the pertinent first electrode E1 and the presence (magnitude) of touching force.

Thus, the driving circuit 120 can determine a change in the magnitude of the first capacitance C1 and a change in the magnitude of the second capacitance C2 based on signals received from the first electrodes E1, can detect a touch position based on the change in the magnitude of the first capacitance C1, and can detect a touch force based on the change in the magnitude of the second capacitance C2.

Referring to FIG. 3A to FIG. 5B, the touch display device 100 may be structurally provided with at least one gap G, the size of which varies depending on the touching force, formed between the plurality of first electrodes E1 and the second electrode E2, such that a touching force detection is possible.

The gap G may be, for example, an air gap or a dielectric gap.

When a force touch occurs at a point, the vertical size of the gap G changes. This consequently causes a change in the magnitude of the second capacitance C2 between the pertinent first electrode E1 and the second electrode E2. Based on this change in the magnitude of the second capacitance C2, the touching force sensing function of detecting a touching force can be executed.

Here, the result of touching force detection may include information regarding the presence of touching force and information regarding the magnitude of touching force.

As described above, since the size-changeable gap G is structurally formed between the first electrode E1 and the second electrode E2, the touching force sensing function can be executed.

As described above, even in the case in which the driving circuit 120 drives the first electrodes E1 and the second electrode E2 in the same manner during the touch driving period, detected information may be different depending on touch type.

For example, referring to FIG. 3A and FIG. 3B, when a touch is a first touch type performed using the pointer, the contact portion of which is formed of a conductive material, and corresponding to a soft touch occurring due to pressing force being equal to or less than a predetermined level, the driving circuit 120 can only detect the touch position of the touch based on signals received from the first electrodes E1 by driving the first electrodes E1 and the second electrode E2.

When the touch is the first touch type performed using the pointer, the contact portion of which is formed of a conductive material, and corresponding to a soft touch occurring due to pressing force being equal to or less than a predetermined level, the magnitude of the first capacitance C1 between the relevant first electrode E1 and the pointer has changed but the magnitude of the second capacitance C2 between the relevant electrode E1 and the second electrode E2 has not changed, whereby only the touch position can be detected.

In another example, referring to FIG. 4A and FIG. 4b, when a touch is a second touch type performed using a pointer, the contact portion of which is formed of a conductive material, and corresponding to a force touch occurring due to pressing force exceeding a predetermined magnitude, the driving circuit 120 can detect both the touch position and the touching force of the touch, based on signals received from the first electrodes E1.

When the touch is the second touch type performed using the pointer, the contact portion of which is formed of a conductive material, and corresponding to a force touch occurring due to pressing force exceeding a predetermined magnitude, both a change in the first capacitance C1 between the pertinent first electrode E1 and the pointer and a change in the second capacitance C2 between the pertinent first electrode E1 and the second electrode E2 have occurred, whereby both the touch position and the touching force of the single touch can be detected.

In a further example, referring to FIG. 5A and FIG. 5B, when a touch is a third touch type performed using a pointer, the contact portion of which is formed of a nonconductive material, and corresponding to a force touch occurring due to pressing force exceeding a predetermined magnitude, the driving circuit 120 can only detect a touching force of the touch, based on signals received from the first electrodes E1.

When the touch is the third touch type performed using the pointer, the contact portion of which is formed of a nonconductive material, and corresponding to a force touch occurring due to pressing force exceeding a predetermined magnitude, no first capacitance C1 is formed between the pertinent first electrode E1 and the pointer but the magnitude of the second capacitance C2 between the relevant electrode E1 and the second electrode E2 has changed, whereby only the touching force of the single touch can be detected.

As described above, the touch display device 100 has the gap structure between the first electrodes E1 and the second electrode E2 and executes the sensing process based on signals received from the first electrodes E1. Thus, even in the case in which the first electrodes E1 and the second electrode E2 are driven in the same manner and the signal detection process and the sensing process are executed in the same manner, regardless of touch type, during the touch driving period, detection information according to touch type can be obtained.

Hereinafter, the first electrode driving signal DS1 and the second electrode driving signal DS2 for touch driving during the touch driving period will be described.

During the touch driving period, the first electrode driving signal DS1 applied to the first electrodes E1 may be regarded as a touch driving signal in terms of the touch sensing function of detecting a touch position and may be regarded as a force driving signal in terms of the force sensing function of detecting a touching force.

In addition, during the touch driving period, the second electrode driving signal DS2 applied to the second electrode E2 may be regarded as a force driving signal in terms of the force sensing function of detecting a touching force.

Since the touch sensing function of detecting a touch position and the force sensing function of detecting a touching force are simultaneously executed in the touch display device 100 according to the present embodiments, the first electrode driving signal DS1 and the second electrode driving signal DS2 are used in place of the touch driving signal and the force driving signal that are indicative of the types of functions.

FIG. 6A to FIG. 6D illustrate a first electrode driving signal DS1 and a second electrode driving signal DS2 for touch driving according to the present embodiments.

Figure 6A:
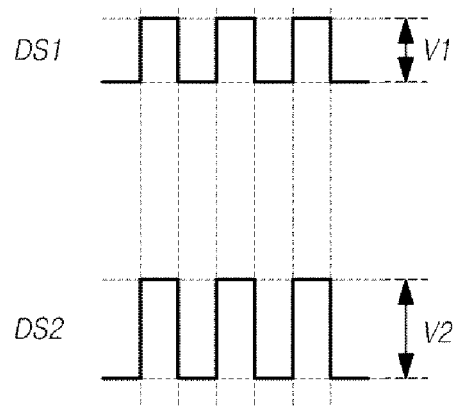
FIG. 6A to FIG. 6D illustrate a first electrode driving signal and a second electrode driving signal for touch driving according to the present embodiments.
Figure 6B:
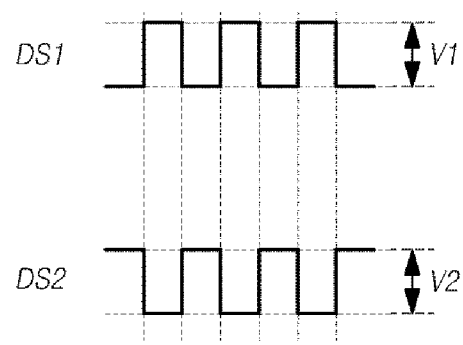

Referring to FIG. 6A and FIG. 6B, the first electrode driving signal DS1 may be a pulse signal having an amplitude, a frequency, and a phase.

Figure 6C:
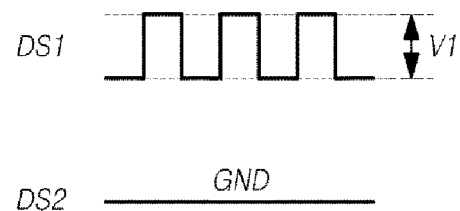
Figure 6D:
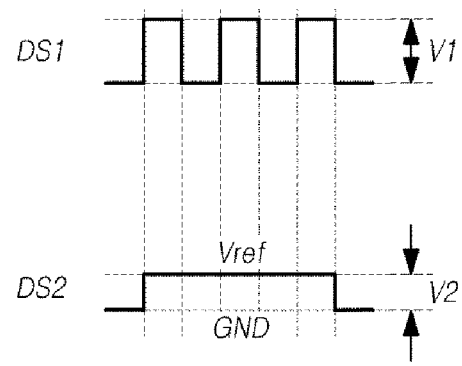

In contrast, the second electrode driving signal DS2 may be a pulse signal, as illustrated in FIG. 6A and FIG. 6B, or in some cases, may be a signal having a DC voltage, as illustrated in FIG. 6C and FIG. 6D.

As described above, a driving operation can be executed in a touch driving period using a variety of combinations of the first electrode driving signal DS1 and the second electrode driving signal DS2, with which a touch position and a touching force can be detected. Thus, in the touch display device 100, a signal generating or converting component (e.g. a signal generating circuit 1300 illustrated in FIG. 13A or a signal converter 1340 illustrated in FIG. 13B) can use a suitable form of second electrode driving signal DS2 according to a power system environment, a signal generating scheme, or a signal conversion scheme of the touch display device 100.

When the first electrode driving signal DS1 and the second electrode driving signal DS2 are pulse signals, the first electrode driving signal DS1 and the second electrode driving signal DS2 may be in phase with each other, as illustrated in FIG. 6A, or may be out of phase with each other, as illustrated in FIG. 6B.

When the phase of the first electrode driving signal DS1 and the phase of the second electrode driving signal DS2 are the same, the first electrode driving signal DS1 and the second electrode driving signal DS2 are referred to as being in phase with each other.

When the phase of first electrode driving signal DS1 and the phase of the second electrode driving signal DS2 are inverse to each other and therefore out of phase by 180 degrees, the first electrode driving signal DS1 and the second electrode driving signal DS2 are referred to as being out of phase with each other.

The frequency of the first electrode driving signal DS1 and the frequency of the second electrode driving signal DS2 are the same.

As described above, when the first electrode driving signal DS1 and the second electrode driving signal DS2 are pulse signals, driving can be executed using the first electrode driving signal DS1 and the second electrode driving signal DS2 that are in phase or out of phase with each other. Thus, the first electrode driving signal DS1 and the second electrode driving signal DS2, corresponding to the signal generating scheme or the signal conversion scheme of the signal generating component or the signal converting component (e.g. the signal generating circuit 1300 illustrated in FIG. 13A or the signal converter 1340 illustrated in FIG. 13B) of the touch display device 100, can be used.

Referring to FIG. 6A, when the first electrode driving signal DS1 and the second electrode driving signal DS2 are in-phase pulse signals, the phase of the second electrode driving signal DS2 is the same as the phase of the first electrode driving signal DS1, whereas the amplitude V2 of the second electrode driving signal DS2 may be greater than the amplitude V1 of the first electrode driving signal DS1.

The amplitude V1 of the first electrode driving signal DS1 swinging between a higher level voltage and a lower level voltage corresponds to the difference between the higher level voltage and the lower level voltage. The amplitude V1 of the second electrode driving signal DS2 swinging between a higher level voltage and a lower level voltage corresponds to the difference between the higher level voltage and the lower level voltage.

When the first electrode driving signal DS1 and the second electrode driving signal DS2 are in-phase pulse signals as described above, the amplitude V2 of the second electrode driving signal DS2 can be set to be greater than the amplitude V1 of the first electrode driving signal DS1. Thus, when touch position information and touching force information are mixed in signals received from the first electrodes E1, it is possible to detect a touch position and a touching force by accurately distinguishing the touch position and the touching force.

When the second electrode driving signal DS2 is a DC voltage signal, the DC voltage thereof may be a ground voltage GND, as illustrated in FIG. 6C, or may be a predetermined reference voltage Vref corresponding to a second voltage V2, as illustrated in FIG. 6D.

Since the second electrode driving signal DS2 is used as a signal having the ground voltage GND or the DC voltage corresponding to the predetermined reference voltage Vref as described above, it is advantageously easy to generate the second electrode driving signal DS2.

FIG. 7 is an exemplary view of the driving circuit 120 of the touch display device 100 according to the present embodiments.

As illustrated in FIG. 7, the driving circuit 120 includes a first electrode driving signal provider 710, a second electrode driving signal provider 720, an integrator 730, and the like.

The first electrode driving signal provider 710 supplies a first electrode driving signal DS1 having a signal waveform from among the signal waveforms illustrated in FIG. 6A to FIG. 6D to the first electrodes E1 by on/off controlling of two switches SW1 and SW10.

The second electrode driving signal provider 720 supplies a second electrode driving signal DS2 having a signal waveform among the signal waveforms illustrated in FIG. 6A to FIG. 6D to the second electrode E2 by on/off controlling of the two switches SW1 and SW10.

The integrator 730 includes an operation amplifier OP-AMP, a capacitor C, and a resistor R, and produces an output value by integrating an input value of an input point electrically connected to the pertinent first electrode E2.

The driving circuit 120 further includes an analog-digital converter ADC, a processor 740, and the like. The analog-digital converter ADC converts the output value of the integrator into a digital value. The processor 740 calculates a touch position and detects a touching force based on the digital value output by the analog-digital converter ADC.

At least one of the analog-digital converter ADC and the processor 740 may be disposed outside of the driving circuit 120.

The circuit configuration of the driving circuit 120 illustrated in FIG. 7 is only illustrative for the sake of explanation and may be embodied in a variety of forms.

Referring to FIG. 7, when the driving circuit 120 is operated in a touch driving period, the driving circuit 120 applies the first electrode driving signal DS1 to the first electrodes E1, and applies the second electrode driving signal DS2 to the second electrode E2. Thereafter, the driving circuit 120 converts integral values Vsen, produced by integrating signals received from the first electrodes E1 using the integrator 730, into digital values.

It is thereby possible to detect at least one of a touch position and a touching force by determining a charge level (or a voltage) or a change thereof depending on whether or not a touch has occurred, the presence of touching force, and the like, based on the digital values of the first electrodes E1.

Referring to FIG. 7, a signal (an input of the integrator 730) received from each of the first electrodes E1 corresponds to a total amount of charges Q1+Q2 of a charge Q1 charged in a capacitor C1 between the pointer and the first electrode E1 and a charge Q2 charged in a capacitor C2 between the first electrode E1 and the second electrode E2. Thus, the signal at the input of integrator 730 is affected by the capacitances C1, C2 and the levels of the touch driving signal DS1 and DS2.

The total amount of charges Q1+Q2 is charged in a capacitor C within the integrator 730, and is then output as a sensing voltage Vsen from the integrator 730.

Then, the analog-digital converter ADC converts the sensing voltage Vsen into a digital value.

The processor 740 can determine at least one of a touch position and a touching force based on the digital value (sensing value) output to the analog-digital converter ADC.

When the touching force is determined, an application or a function, previously set to correspond to the touching force, can be executed.

Alternatively, when the touching force is detected, an application or a function, previously set to correspond to the magnitude of touching force, can be executed.

Figure 8:
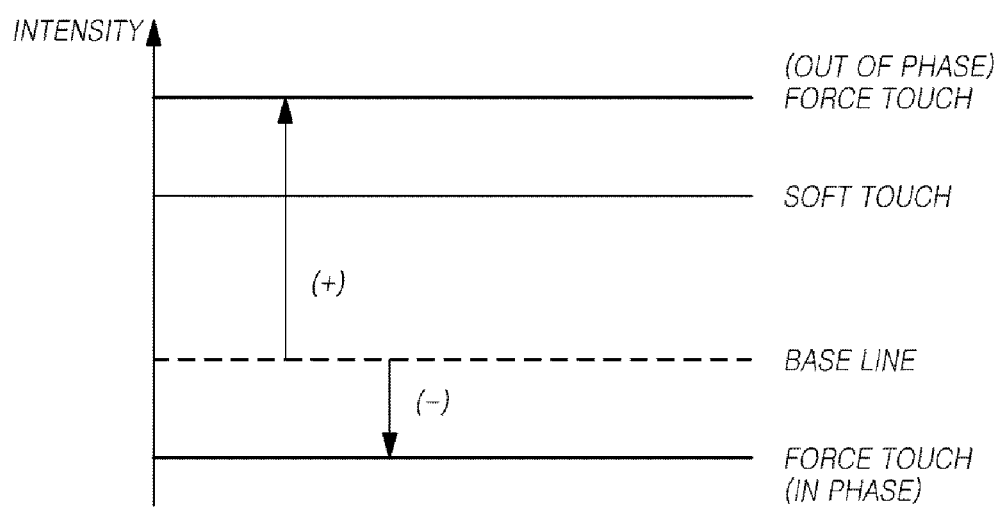
FIG. 8 illustrates the intensity of an incoming signal in response to in-phase touch driving and the intensity of an incoming signal in response to out-of-phase touch driving in the touch display device according to the present embodiments, when a force touch is performed using a pointer, the contact portion of which is formed of a nonconductive material.

FIG. 8 illustrates the intensity of an incoming signal in response to in-phase touch driving and the intensity of an incoming signal in response to out-of-phase touch driving in the touch display device 100 according to the present embodiments, when a force touch is performed using a pointer, the contact portion of which is formed of a non-conductive material.

Here, FIG. 8 is based on the assumption that the first electrode driving signal DS1 and the second electrode driving signal DS2 are pulse signals, as illustrated in FIG. 6A and FIG. 6B.

Referring to FIG. 8, the intensity of a signal received from a first electrode E1 may be determined as a digital value output from the analog-digital converter ADC.

Referring to FIG. 8, in the case of a soft touch, in which the magnitude of pressing force is equal to or less than a predetermined magnitude, a digital value output from the analog-digital converter ADC is a positive (+) value with respect to a digital value (baseline) output from the analog-digital converter ADC when no touch has occurred.

Referring to FIG. 8, when the first electrode driving signal DS1 and the second electrode driving signal DS2 are in phase with each other, in the case of a force touch, in which the magnitude of pressing force applied using the pointer, the contact portion of which is formed of a nonconductive material, exceeds the predetermined magnitude, a digital value output from the analog-digital converter ADC is a negative (−) value with respect to the baseline.

Referring to FIG. 8, when the first electrode driving signal DS1 and the second electrode driving signal DS2 are out of phase with each other, in the case of a force touch, in which the magnitude of pressing force applied using the pointer, the contact portion of which is formed of a nonconductive material, exceeds the predetermined magnitude, a digital value output from the analog-digital converter ADC is a positive (+) value with respect to the baseline.

Figure 9A:
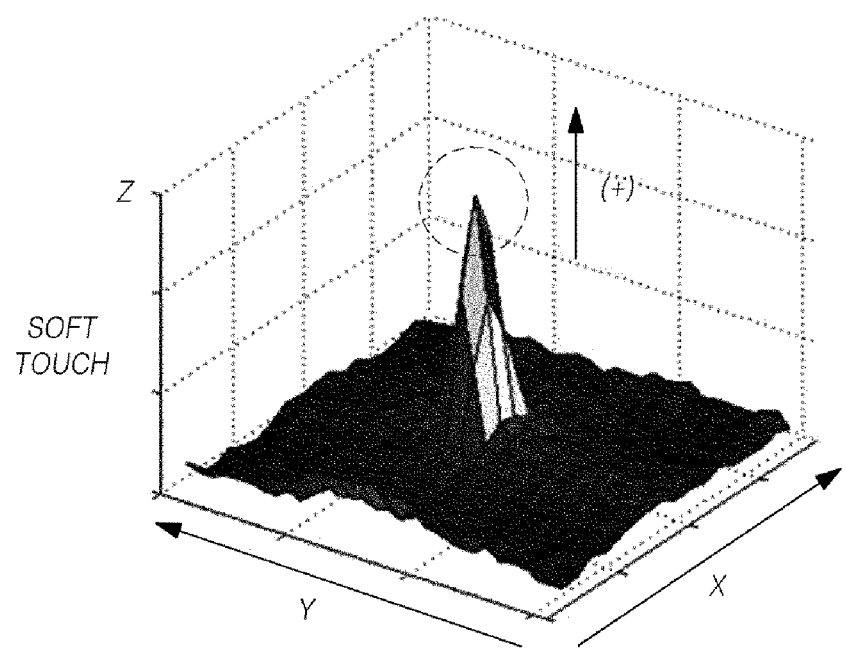
FIG. 9A and FIG. 9B illustrate signal intensity distributions in the touch display device according to the present embodiments when signals are received in response to a soft touch and a force touch.
Figure 9B:
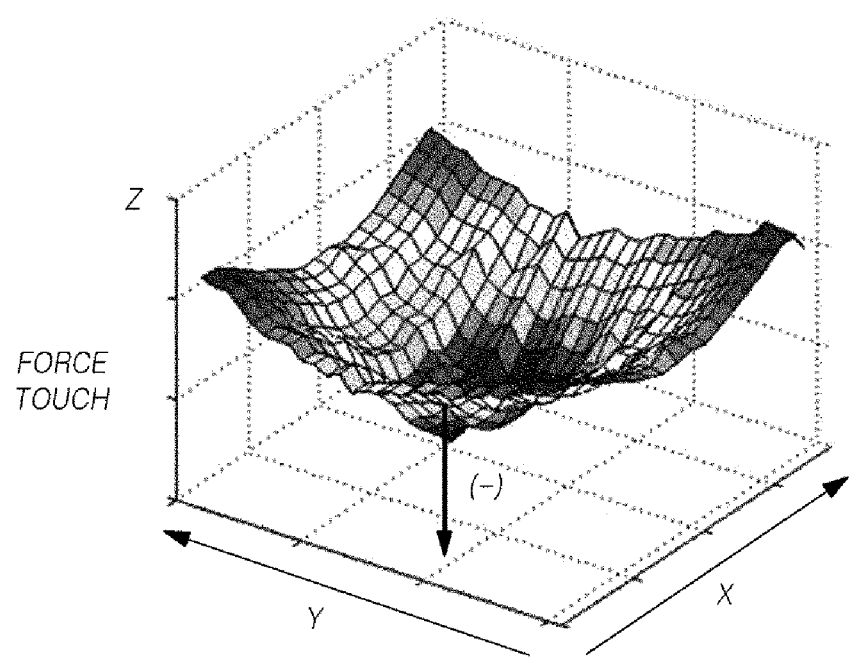

FIG. 9A and FIG. 9B illustrate signal intensity distributions over the entire area (X-Y plane) of the display panel 110 of the touch display device 100 according to the present embodiments when signals are received in response to a soft touch and a force touch.

Referring to FIG. 9A, regarding the entire area of the display panel 110, when a soft touch occurs in specific points, the magnitudes of digital values (signal intensities) output from the analog-digital converter ADC are distributed such that signal intensity generally increases in the positive (+) direction of the z-axis with respect to the baseline.

In addition, referring to the distribution of signal intensity in the case of a soft touch, higher signal intensities may be concentrically distributed at a point of the entire screen area (i.e. the entire area of the display panel 110) at which the soft touch has occurred.

Referring to FIG. 9B, when the second electrode E2 is a single electrode plate, in the case of a force touch, the magnitudes of digital values (signal intensities) output from the analog-digital converter ADC are distributed such that signal intensity generally increases in the negative (−) direction of the z-axis with respect to the baseline.

In addition, when a force touch has occurred, a maximum signal intensity in the negative (−) direction appears in the center of the screen, and signal intensities gradually increase from the periphery toward the center of the screen.

As the force touch becomes stronger, changes in the size of the gap G between the plurality of first electrodes E1 and the second electrode E2 increase. Consequently, digital values output from the analog-digital converter ADC increase in the negative (−) direction of the z-axis with respect to the baseline. The stronger the force touch is, the greater the signal intensity becomes.

Figure 10A:
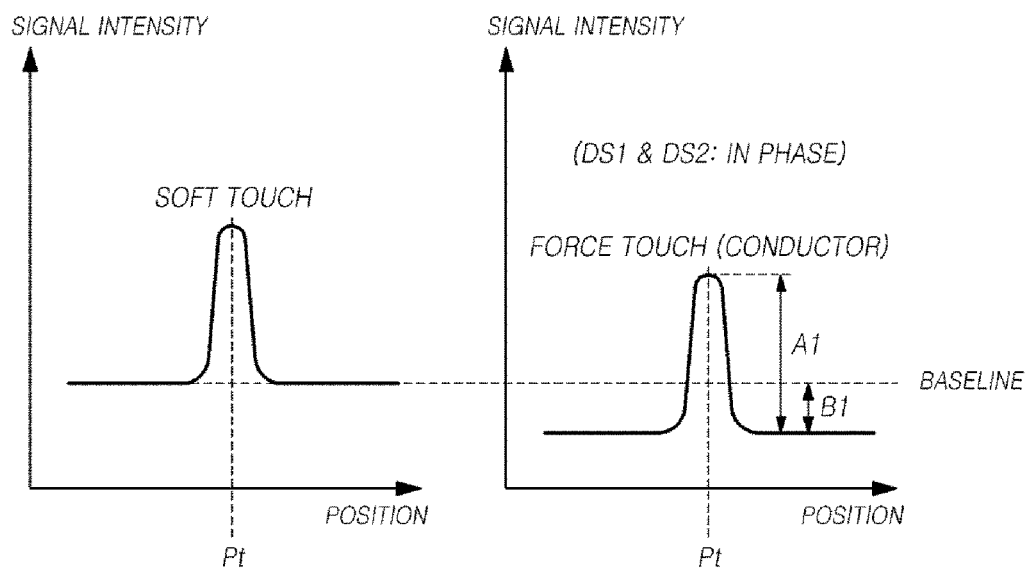
FIG. 10A illustrates signal intensities when a soft touch is performed using a pointer, the contact portion of which is formed of a conductive material, and signal intensities when a force touch is performed using a pointer, the contact portion of which is formed of a conductive material, in the case in which the touch display device according to the present embodiments executes in-phase phase touch driving during a touch driving period.
Figure 10B:
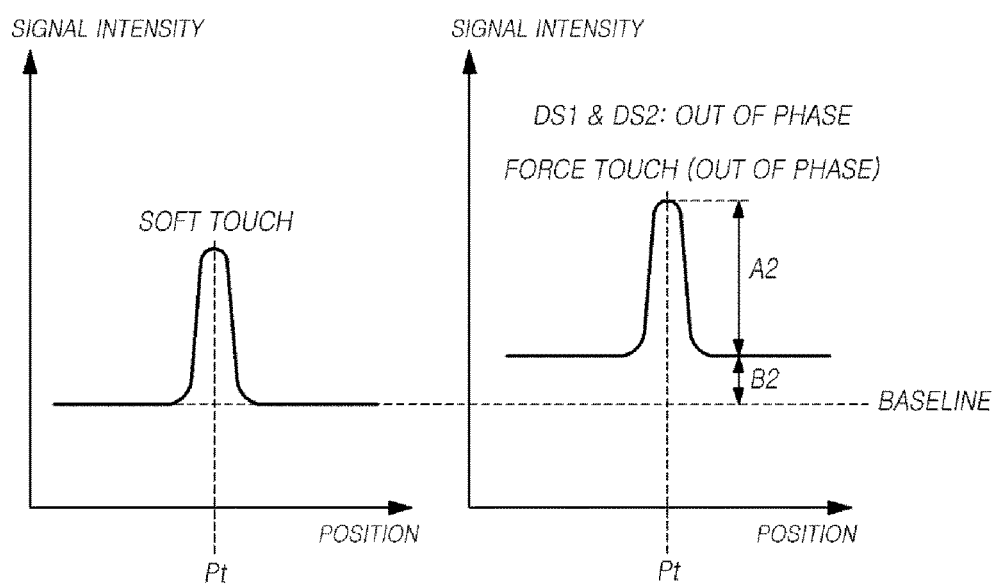
FIG. 10B illustrates signal intensities when a soft touch is performed using a pointer, the contact portion of which is formed of a conductive material, and signal intensities when a force touch is performed using a pointer, the contact portion of which is formed of a conductive material, in the case in which the touch display device according to the present embodiments executes out-of-phase touch driving during a touch driving period.

FIG. 10A illustrates signal intensities when a soft touch is performed using a pointer, the contact portion of which is formed of a conductive material, and signal intensities when a force touch is performed using a pointer, the contact portion of which is formed of a conductive material, in the case in which the touch display device 100 according to the present embodiments executes in-phase touch driving during a touch driving period, and FIG. 10B illustrates signal intensities when a soft touch is performed using a pointer, the contact portion of which is formed of a conductive material, and signal intensities when a force touch is performed using a pointer, the contact portion of which is formed of a conductive material, in the case in which the touch display device 100 according to the present embodiments executes out-of-phase touch driving during a touch driving period.

Referring to FIG. 10A, the touch display device 100 executes in-phase touch driving during a touch driving period, and a soft touch has occurred at a point Pt, using a pointer, the contact portion of which is formed of a conductive material. In this case, the distribution of digital values (signal intensities) has the following profile: a digital value corresponding to a first electrode E1 in a position corresponding to the point Pt at which the soft touch has occurred is higher than the baseline, and a digital value (signal intensity) corresponding to a first electrode E1 in a position corresponding to a point at which no soft touch has occurred is equal to or similar to the baseline.

When a force touch has occurred at the point Pt, using the pointer, the contact portion of which is formed of a conductive material, the profile of the distribution of digital values (signal intensities) is shifted in the negative (−) direction with respect to the baseline.

Referring to the distribution of digital values (signal intensities) when a force touch has occurred at the point Pt, the driving circuit 120 detects a position at which the size difference A1 from the minimum digital value to the maximum digital value is the maximum as a touch position.

Referring to the distribution of digital values (signal intensities) when a force touch has occurred at the point Pt, the driving circuit 120 detects the presence of the force touch when the minimum digital value is not identical to the baseline in the case in which the size B1 from the minimum digital value to the baseline is greater than zero (0).

In addition, referring to the distribution of digital values (signal intensities) when a force touch has occurred at the point Pt, the driving circuit 120 detects the magnitude of touching force based on the size B1 from the minimum digital value to the baseline.

Referring to FIG. 10B, the touch display device 100 executes out-of-phase touch driving during the touch driving period, and a soft touch has occurred at a point Pt, using a pointer, the contact portion of which is formed of a conductive material. In this case, the distribution of digital values (signal intensities) has the following profile: a digital value corresponding to a first electrode E1 in a position corresponding to the point Pt at which the soft touch has occurred is higher than the baseline, and a digital value (signal intensity) corresponding to a first electrode E1 in a position corresponding to a point at which no soft touch has occurred is equal to or similar to the baseline.

When a force touch has occurred at the point Pt, using the pointer, the contact portion of which is formed of a conductive material, the profile of the distribution of digital values (signal intensities) is shifted in the positive (+) direction with respect to the baseline.

Referring to the distribution of digital values (signal intensities) when a force touch has occurred at the point Pt, the driving circuit 120 detects a position at which the size difference A2 from the minimum digital value to the maximum digital value is the maximum as a touch position.

Referring to the distribution of digital values (signal intensities) when a force touch has occurred at the point Pt, the driving circuit 120 detects the presence of the force touch when the minimum digital value is not identical to the baseline in the case in which the size difference B2 from the minimum digital value to the baseline is greater than zero (0).

In addition, referring to the distribution of digital values (signal intensities) when a force touch has occurred at the point Pt, the driving circuit 120 detects the magnitude of touching force based on the size B2 from the minimum digital value to the baseline.

Figure 11A:
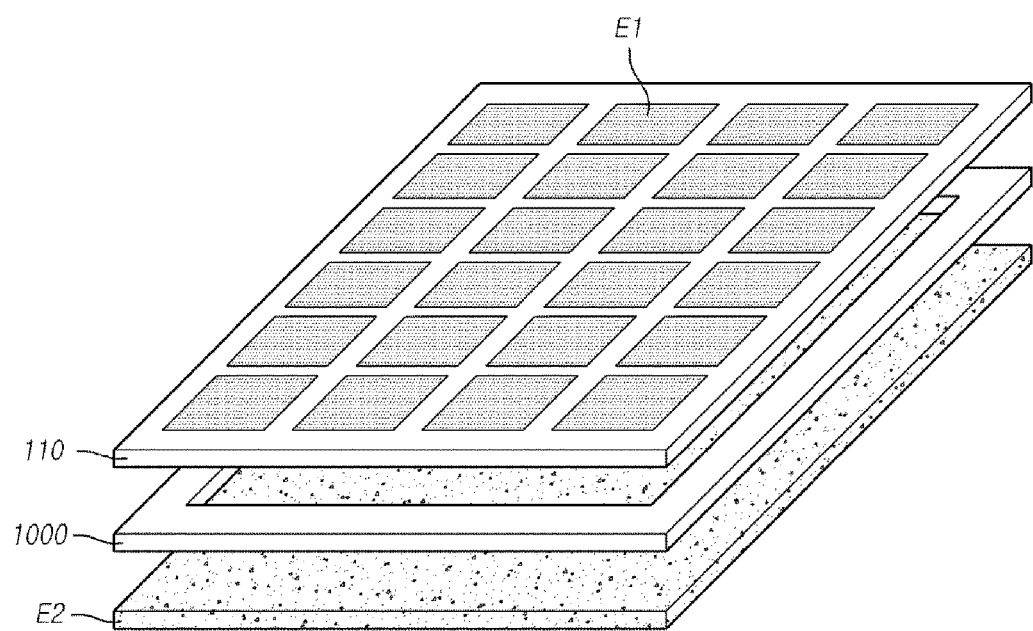
FIG. 11A and FIG. 11B schematically illustrate a force sensing structure of the touch display device according to the present embodiments.
Figure 11B:
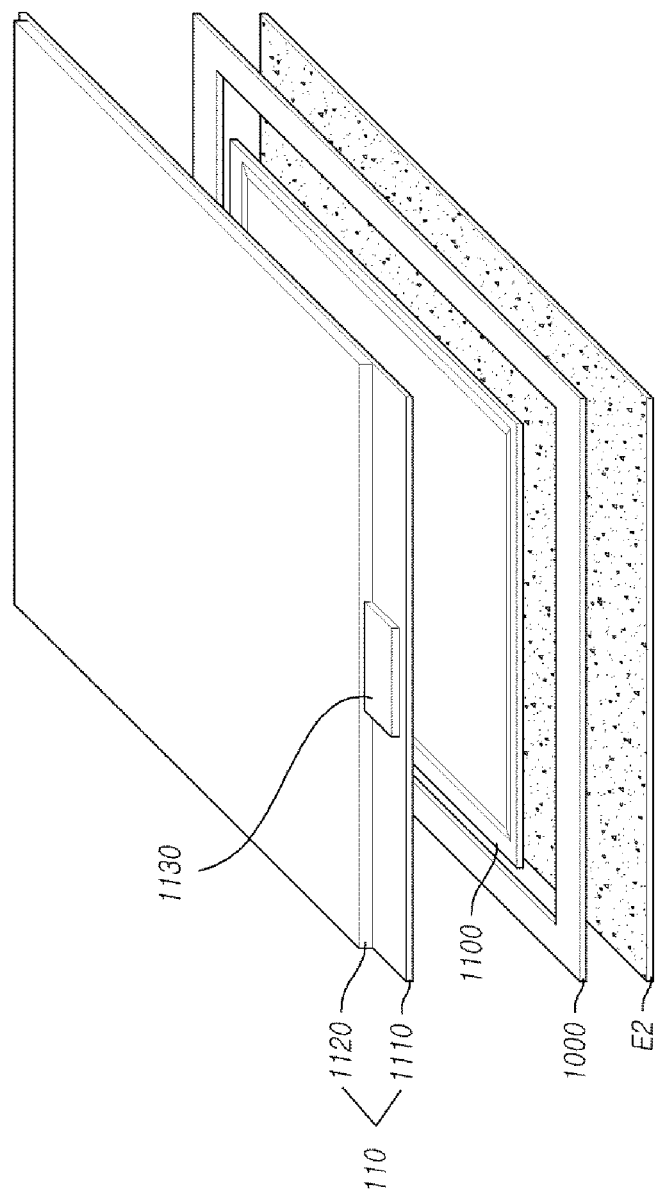

FIG. 11A and FIG. 11B schematically illustrate a force sensing structure of the touch display device 100 according to the present embodiments.

Referring to FIG. 11A, the touch display device 100 according to the present embodiments includes a plurality of first electrodes E1 disposed within a display panel 110 and a second electrode E2 disposed outside of (e.g. below) the display panel 110.

In addition, a gap G, the size of which is changeable in response to a force touch, is formed between the plurality of first electrodes E1 and the second electrode E2, such that force sensing is enabled.

In this regard, the touch display device 100 according to the present embodiments includes a gap structure unit 1000 forming the gap G between the plurality of first electrodes E1 and the second electrode E2, such that the size of the gap G is changeable in response to the force touch.

The gap structure unit 1000 enables force sensing.

The gap structure unit 1000 may have a shape (e.g. a frame period shape) corresponding to the outline shape of the display panel 110.

The gap structure unit 1000 may be a separate structure or may be embodied using an existing structure such as a guide panel.

The touch display device 100 according to the present embodiments may be a range of display devices, such as a liquid crystal display (LCD) device or an OLED display device.

Hereinafter, for the sake of explanation, the touch display device 100 according to the present embodiments will be assumed to be an LCD device.

Referring to FIG. 11B, in the touch display device 100 according to the present embodiments, the display panel 110 includes a first substrate 1110 on which thin-film transistors (TFTs) and the like are disposed and a second substrate 1120 on which color filters (CFs) and the like are disposed.

A driving chip 1130 may be disposed on, bonded to, or connected to the peripheral portion (non-active area) of the first substrate 1110.

The driving chip 1130 may be a chip in which a data driving circuit is formed, a chip including a first electrode driving circuit 1310 within the driving circuit 120, a chip including a data driving circuit and a first electrode driving circuit (1310 in FIG. 13A and FIG. 13B), or in some cases, a chip including the driving circuit 120.

Referring to FIG. 11B, a lower structure 1100 is disposed below the display panel 110.

The lower structure 1100 may be, for example, a backlight unit. In addition, the lower structure 1100 may be any structure positioned below the display panel 110.

The gap structure unit 1000 may be disposed below, within, or to one side of the lower structure 1100.

The second electrode E2 is disposed below the gap structure unit 1000.

The second electrode E2 may be positioned below or within the lower structure 1100 of the display panel 110.

As described above, the position of the second electrode E2 or the position of the gap structure unit 1000 is variously designed. Thus, the force sensor structure can be designed to be suitable for the designed structures of the display panel 110 and the display device.

Figure 12A:
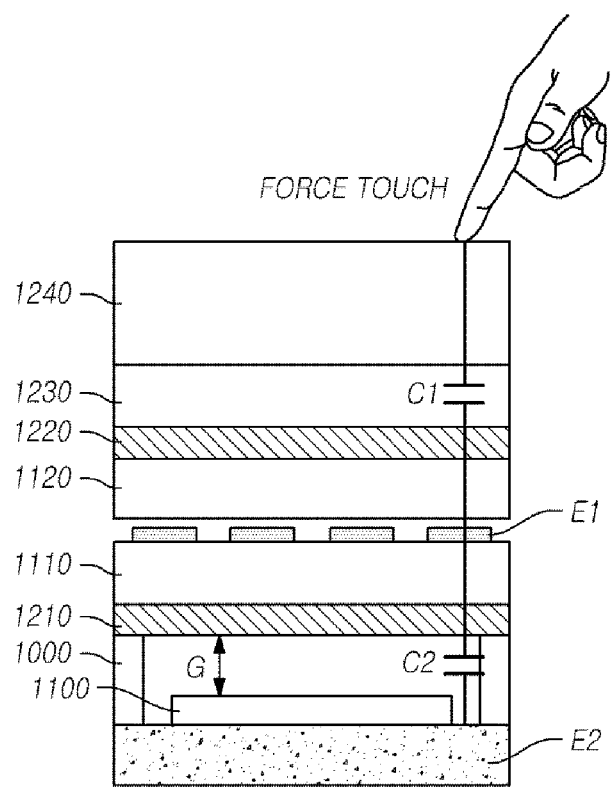
FIG. 12A is a cross-sectional view of the touch display device according to the present embodiments.
Figure 12B:
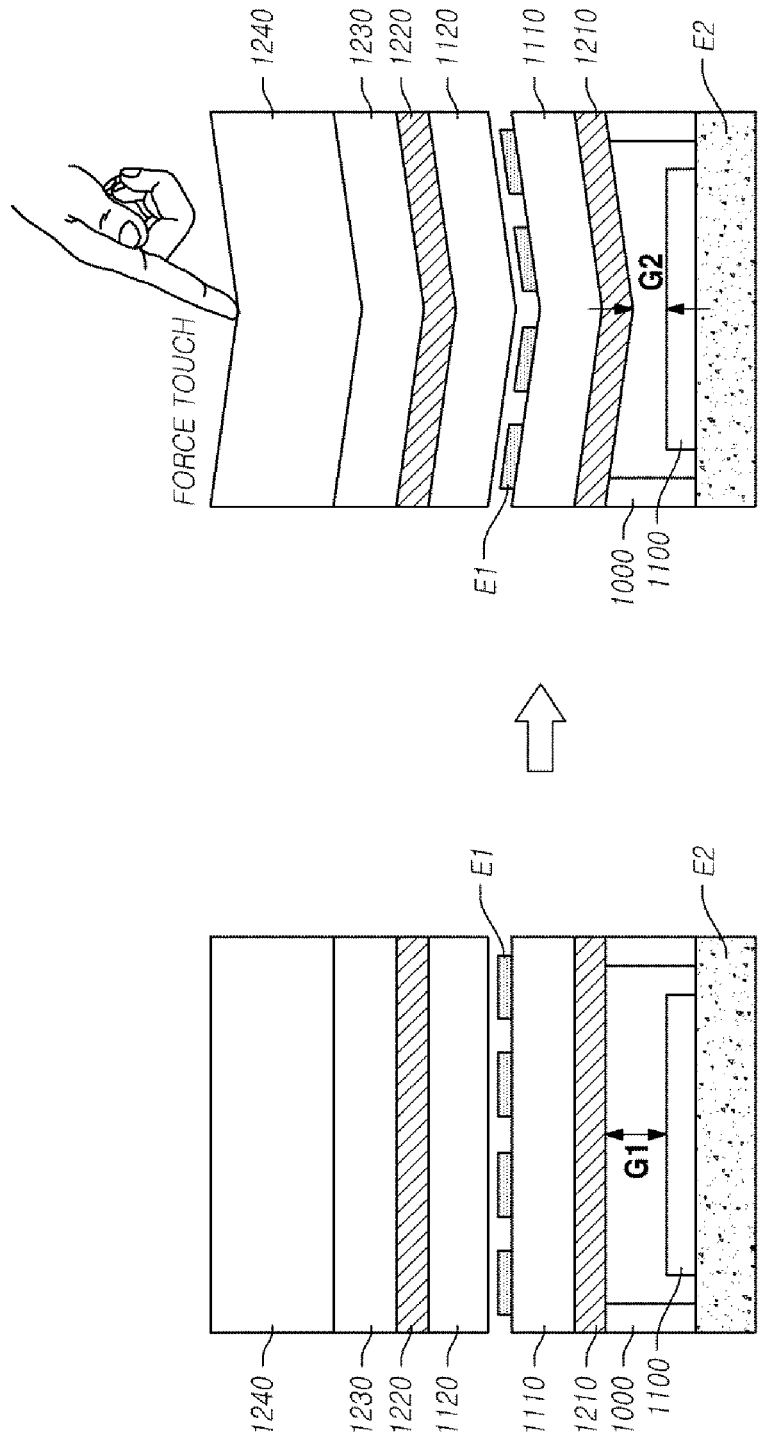
FIG. 12B illustrates a situation in which the size of the gap changes in response to a force touch.

FIG. 12A is a cross-sectional view of the touch display device 100 having the force sensing structure according to the present embodiments, and FIG. 12B illustrates a situation in which the size of the gap G changes in response to a force touch.

Referring to FIG. 12A, the display panel 110 includes a first polarization plate 1210, a first substrate 1110, a plurality of first electrodes E1, a second substrate 1120, and a second polarization plate 1220.

A bonding layer 1230 and an upper cover 1240 are disposed on the upper part of the display panel 110.

A lower structure 1100 is disposed on the lower part of the display panel 110.

The lower structure 1100 may be a structure that is previously provided in the display device or a separate structure provided for a second electrode E2.

For example, the lower structure 1100 may be a backlight unit or a rear cover of the LCD device.

In addition, the lower structure 1100 may be any structure that can form a capacitor between each of the first electrodes E1 and the second electrode E2.

Referring to FIG. 12A, for example, the gap structure unit 1000 has the shape of a frame period having an open central portion. At least a portion of the periphery of the gap structure unit 1000 abuts the upper component and the lower component (the second electrode E2).

The gap structure unit 1000 is situated between the periphery of the rear surface (of the first polarization plate 1210) of the display panel 110 and the periphery of the second electrode E2.

In addition, the lower structure 1100, such as a backlight unit, is situated in a space defined by the gap structure unit 1000, between the rear surface (of the first polarization plate 1210) of the display panel 110 and the second electrode E2.

A gap G, such as an air gap or a dielectric gap, is present between the rear surface (of the first polarization plate 1210) of the display panel 110 and the lower structure 1000.

Referring to FIG. 12b, when a force touch has occurred, the upper cover 1240, the display panel 110, and the like are slightly warped downward.

This consequently changes the size of the gap g, such as an air gap or a dielectric gap, disposed between the first electrodes E1 and the second electrode E2.

When the gap G prior to the force touch is designated as G1 and the gap G after the force touch is designated suitable G2, the touching force reduces G2 to be smaller than G1.

As the gap G is reduced from G1 to G2 due to the force touch, a second capacitance C2 is changed, whereby the force touch can be recognized.

Figure 13A:
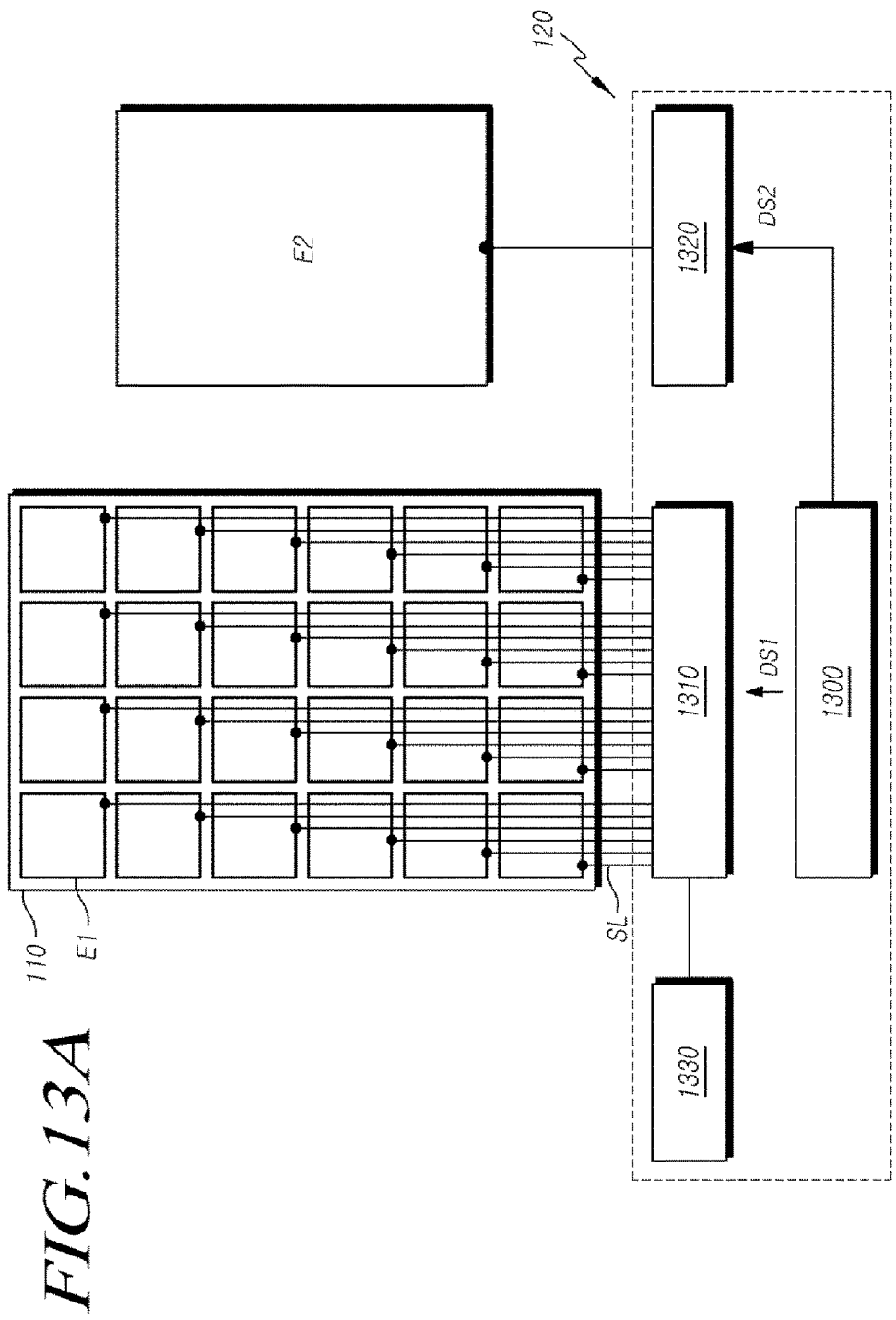
FIG. 13A and FIG. 13B illustrate the driving circuit of the touch display device according to the present embodiments.
Figure 13B:
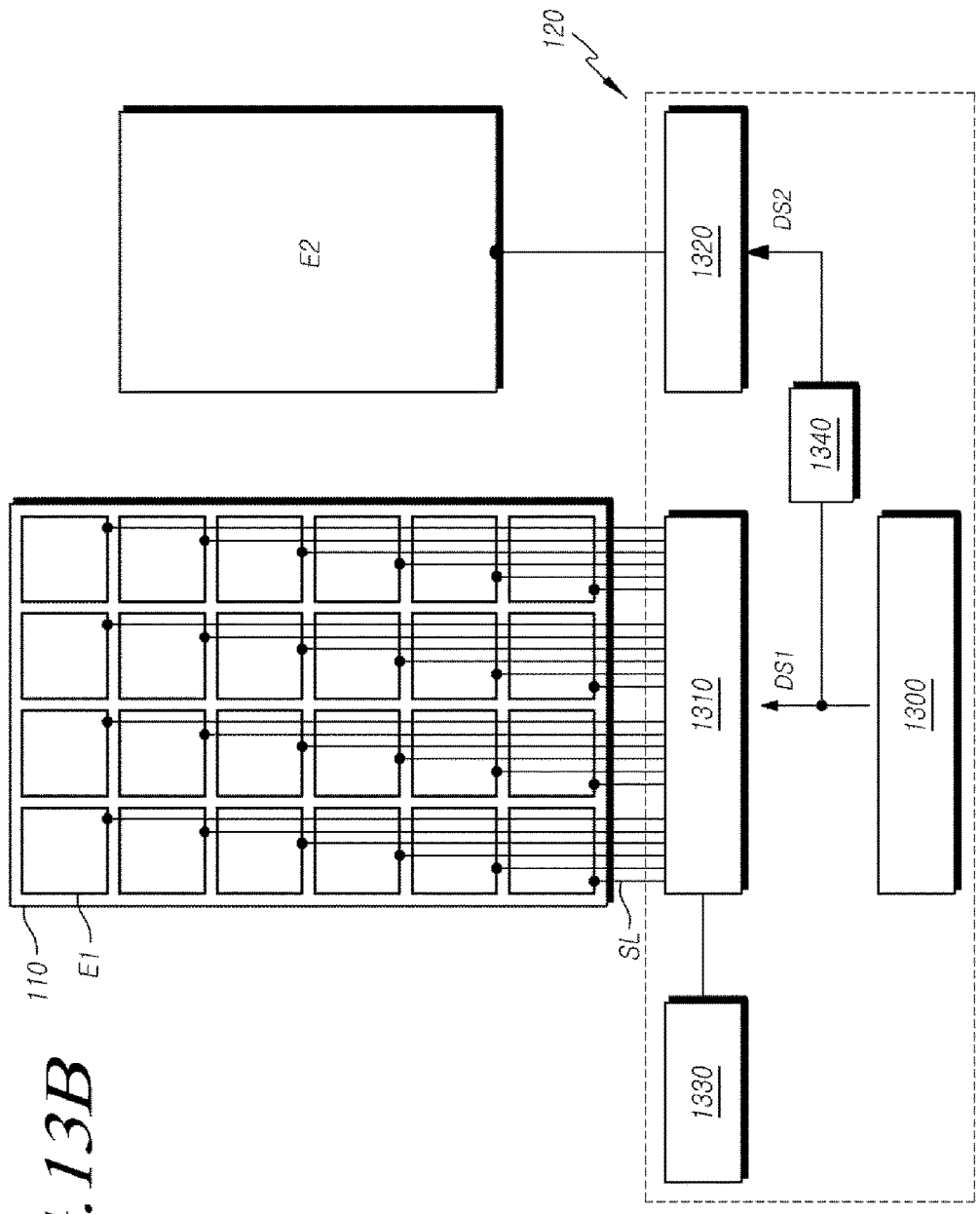

FIG. 13A and FIG. 13B illustrate the driving circuit 120 of the touch display device 100 according to the present embodiments.

Referring to FIG. 13A and FIG. 13B, the driving circuit 120 of the touch display device 100 according to the present embodiments is a circuit able to improve both the touch sensing function and the force sensing function.

The driving circuit 120 includes a signal generating circuit 1300, a first electrode driving circuit 1310, a second electrode driving circuit 1320, and a detection processor 1330.

The signal generating circuit 1300 generates and outputs a first electrode driving signal DS1.

The signal generating circuit 1300 may further generate a second electrode driving signal DS2. FIG. 13A illustrates the driving circuit 120 when the signal generating circuit 1300 generates the second electrode driving signal DS2, and FIG. 13B illustrates the driving circuit 120 when the signal generating circuit 1300 does not generate the second electrode driving signal DS2.

Referring to FIG. 13A and FIG. 13B, in a touch driving period, the first electrode driving circuit 1310 receives the first electrode driving signal DS1 and sequentially applies the first electrode driving signal DS1 to the plurality of first electrodes E1.

The first electrode driving circuit 1310 may include an integrator 730, an analog-digital converter ADC, and the like, as illustrated in FIG. 7.

When the plurality of first electrodes E1 are one type of display electrodes to which display driving voltages are applied during a display driving period, the first electrode driving circuit 1310 may apply display driving voltages to all of the plurality of first electrodes E1 during the display driving period.

Consequently, the plurality of first electrodes E1 functioning as display driving electrodes during the display driving period can be used as touch sensors and force sensors in the touch driving period.

Referring to FIG. 13A and FIG. 13B, the second electrode driving circuit 1320 is a circuit for applying the second electrode driving signal DS2 to the second electrode E2 positioned outside of the display panel 110 in the touch driving period.

The use of the above-described driving circuit 120 can provide not only the touch sensing function of determining whether or not the screen has been touched and/or detecting a touch point, but also the force sensing function of determining the presence and/or magnitude of touching force.

Referring to FIG. 13A, the signal generating circuit 1300 can further generate and output the second electrode driving signal DS2.

Then, the second electrode driving circuit 1320 transfers the second electrode driving signal DS2, output from the signal generating circuit 1300, to the second electrode E2.

Since the signal generating circuit 1300 generates and outputs not only the first electrode driving signal DS1, but also the second electrode driving signal DS2, as illustrated in FIG. 13, the use of the second electrode driving signal DS2 different from the first electrode driving signal DS1 facilitates driving in the touch driving period.

Referring to FIG. 13B, since the signal generating circuit 1300 does not generate the second electrode driving signal DS2, the driving circuit 120 further includes a signal converter 1340 to generate the second electrode driving signal DS2 by converting at least one of the amplitude, the phase, and the like of the first electrode driving signal DS1 generated by the signal generating circuit 1300.

With this configuration, the signal generating circuit 1300 is only required to generate the first electrode driving signal DS1. The signaling load of the signal generating circuit 1300 can be reduced, and effective touch driving can be provided.

For example, the signal converter 1340 may include a level shifter to adjust the voltage level of a signal, may include a phase controller to control the phase of a signal, and/or may include a DA converter to convert a DC signal into an AC signal (e.g. a pulse signal) or an AD converter to convert an AC signal (e.g. a pulse signal) into a DC signal. The signal converter 1340 may be implemented as the second electrode driving circuit 1320 or may be included in the second electrode driving circuit 1320.

Referring to FIG. 13A and FIG. 13B, in the touch driving period, the detection processor 1330 detects both touch position and the touching force of a touch by receiving a signal from at least one first electrode E1 among the plurality of first electrodes E1 via the first electrode driving circuit 1310. The signal received from the at least one first electrode E1 is generated as a result of the first electrode driving signal applied to the first electrodes E1, the second electrode driving signal applied to the second electrodes E2, and a capacitance between the electrodes E1 and E2, as shown in FIG. 7.

The detection processor 1330 may be a component corresponding to the processor 740 in FIG. 7, and may be a micro controller unit (MCU).

As described above, the detection processor 1330 not only performs the touch sensing function but also performs the force sensing function by receiving signals from the first electrodes E1 via the first electrode driving circuit 1310, whereby the two sensing functions can be efficiently performed using the same processing method.

The signal generating circuit 1300 may be implemented as a power integrated circuit (IC).

The signal generating circuit 1300, the first electrode driving circuit 1310, and the detection processor 1330 may be implemented as separate ICs. Alternatively, at least two of the signal generating circuit 1300, the first electrode driving circuit 1310, and the detection processor 1330 may be formed in a single IC. For example, the signal generating circuit 1300 and the first electrode driving circuit 1310 may be included in a single IC. In some cases, the signal generating circuit 1300, the first electrode driving circuit 1310 and the detection processor 1330 may be included in a single IC.

The driving circuit 120 may further include a data driving circuit to apply data voltages to a plurality of data lines, disposed on the display panel 110, in the display driving period.

Figure 14A:
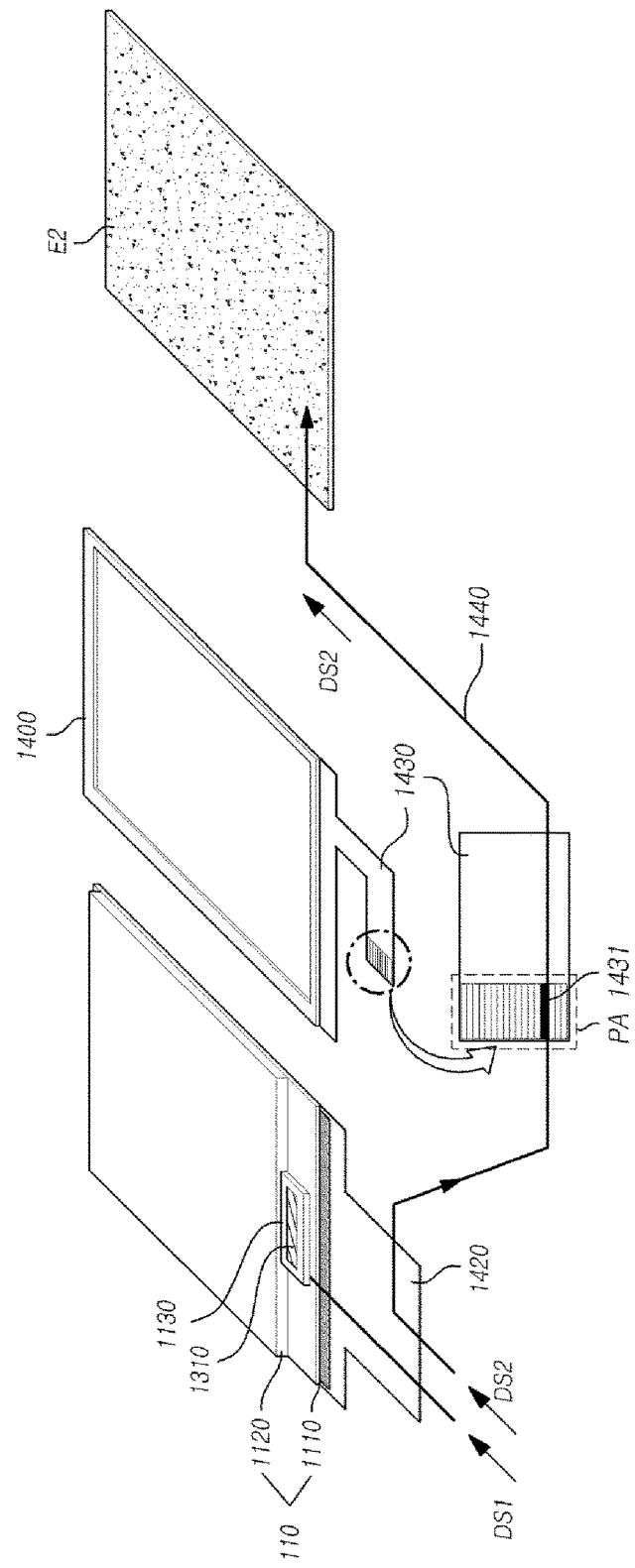
FIG. 14A and FIG. 14B illustrate signal supply structures of the touch display device according to the present embodiments.
Figure 14B:
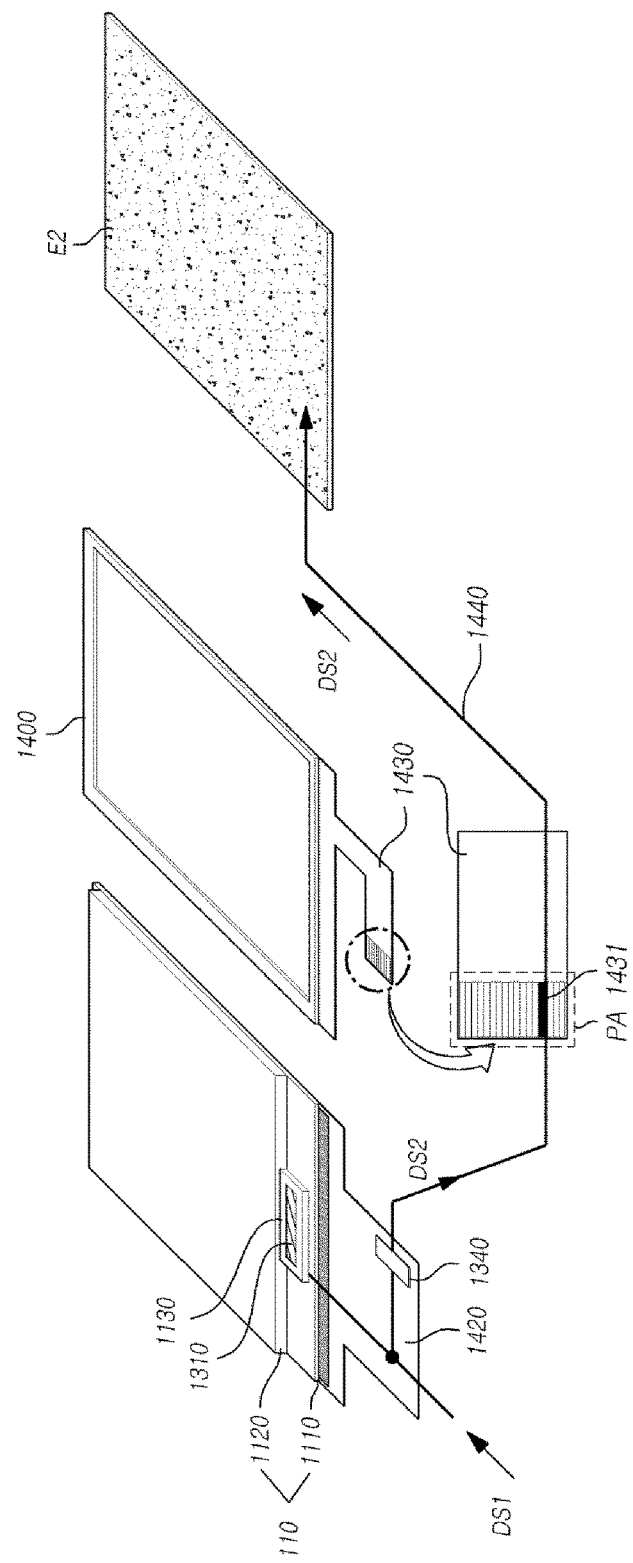

FIG. 14A and FIG. 14B illustrate signal supply structures of the touch display device 100 according to the present embodiments.

FIG. 14A and FIG. 14B illustrate the touch display device 100 including a backlight unit 1400 as the lower structure 1100. The backlight unit 1400 includes a first printed circuit 1420 to transfer signals to the display panel 110, a second printed circuit 1430 to transfer signals to a backlight driver within the backlight unit 1400, and the like.

FIG. 14A is an exemplary embodiment of FIG. 13A, and FIG. 14B is an exemplary embodiment of FIG. 13B.

Referring to FIG. 14A and FIG. 14B, the second electrode driving circuit 1320 includes one or more of the printed circuits 1420 and 1430, electrically connecting the signal generating circuit 1300 and the second electrode E2, as a component for transferring a second electrode driving signal.

That is, the printed circuits 1420 and 1430 provided for the display driving operation can be used for the transfer of driving signals in a touch driving period.

As described above, one or more of the printed circuits 1420 and 1430 can be used as the second electrode driving circuit 1320 to transfer the second electrode driving signal DS2 for driving in the touch driving period. Accordingly, it is unnecessary to form an additional circuit, and a compact signal transfer structure can be formed using one or more of the printed circuits 1420 and 1430 formed of a flexible material.

More specifically, by way of example, referring to FIG. 14A and FIG. 14B, the first printed circuit 1420 receiving the first electrode driving signal DS1 output from the signal generating circuit 1300 is connected to a peripheral portion of the display panel 110, thereby being electrically connected to the driving chip 1130.

The first and second printed circuits 1420 and 1430 may be connected to each other using a pin contact method.

The second printed circuit 1430 has a terminal PA connected to the first printed circuit 1420.

The terminal PA of the second, flexible printed circuit 1430 not only has a pin to receive a signal for the driving of the backlight unit 1400, but also a touching force sensing driving pin 1431 to receive the second electrode driving signal DS2 from the first printed circuit 1420.

The touching force sensing driving pin 1431 allows the second electrode driving signal DS2 to be transferred from the first printed circuit 1420 to the second printed circuit 1430.

The second printed circuit 1430 and the second electrode E2 may be directly connected via contact terminals, or may be electrically connected via a connecting medium 1440, such as a wire, a conductive tape, or a conductive electrode pattern.

Hereinafter, reference will be made to exemplary operating driving periods of the two driving modes (the display mode and the touch mode) of the touch display device 100 and exemplary driving methods of the touch display device 100 in a touch driving period.

Figure 15:
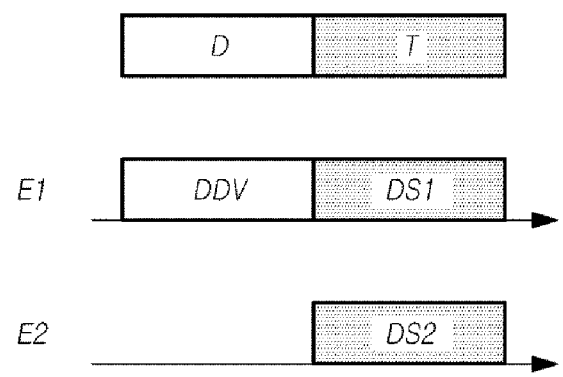
FIG. 15 illustrates two operating driving periods of the touch display device according to the present embodiments and signals applied to a first electrode and a second electrode depending on the operating driving periods.

FIG. 15 illustrates two operating driving periods of the touch display device 100 according to the present embodiments and signals applied to a first electrode E1 and a second electrode E2 depending on the operating driving periods.

Referring to FIG. 15, a display driving period D in which a display function is executed and a touch driving period T in which a touch position and a touching force are detected may be, for example, temporally divided.

During display driving period D, the driving circuit 120 supplies display driving voltages (e.g. common voltages Vcom) to a plurality of first electrodes E1.

In the touch driving period T, the driving circuit 120 applies a first electrode driving signal DS1 to the plurality of first electrodes E1 and applies a second electrode driving signal DS2 to the second electrode E2.

Since the driving and sensing processes for touch sensing and force sensing are simultaneously executed in the touch driving period T, amounts of time required for the driving and sensing processes for touch sensing and force sensing can be reduced.

Hereinafter, exemplary methods of allocating the display driving period D and the touch driving period T to frame periods will be described.

Figure 16A:
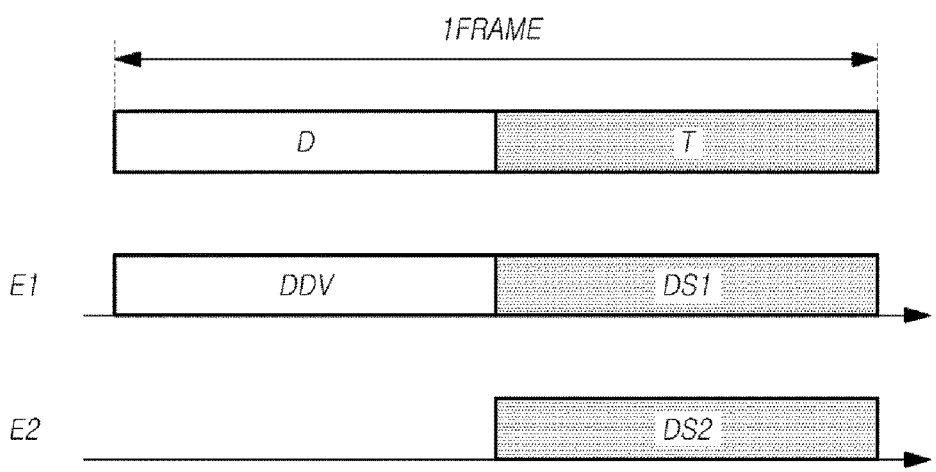
FIG. 16A and FIG. 16b illustrate first and second allocation methods for two driving periods of the touch display device according to the present embodiments.
Figure 16B:
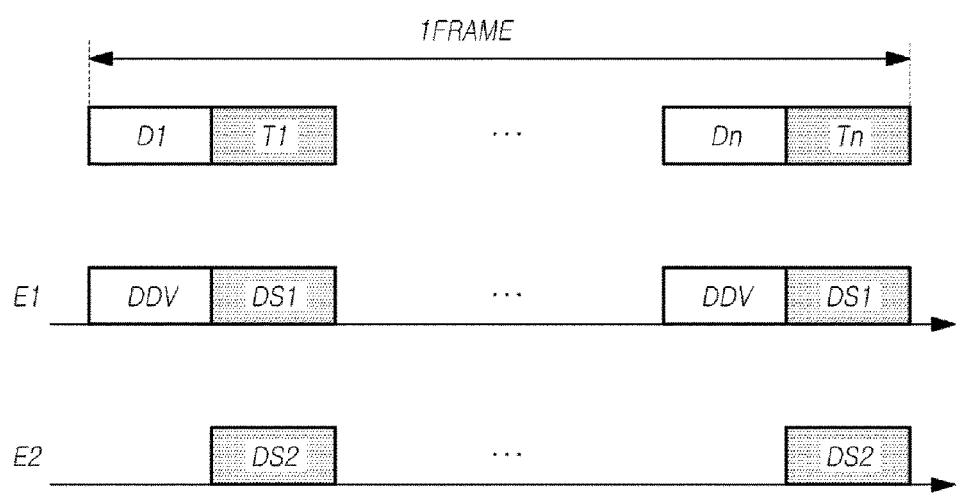

FIG. 16A and FIG. 16b illustrate first and second allocation methods for the two driving periods of the touch display device 100 according to the present embodiments.

As described above, at least one display driving period is present in every frame period, and at least one touch driving period is present in every frame period.

Referring to the first allocation method illustrated in FIG. 16A, one display driving period D and one touch driving period T are allocated to at least one frame period. In this case, specific frame periods may only be allocated with the display driving period D.

Referring to the second allocation method illustrated in FIG. 16B, at least one frame period may be allocated with n number of display driving periods D1, ..., and Dn (where n is a natural number equal to or greater than 2) and n number of touch driving periods T1, ..., and Tn.

Although it is illustrated in FIG. 16B that the number of the display driving periods and the number of the touch driving periods present in a single frame period are the same, the numbers thereof may differ.

A specific frame period may only have the display driving period D allocated thereto.

Figure 17:
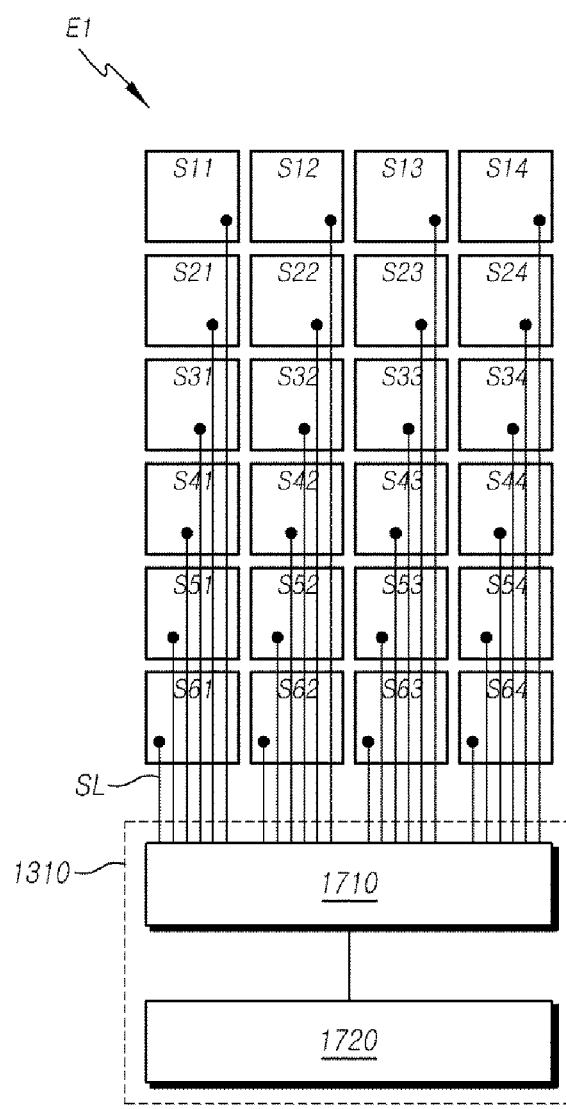
FIG. 17 illustrates a switch circuit and a signal detection circuit of the first electrode driving circuit in the driving circuit of the touch display device according to the present embodiments.
Figure 18:
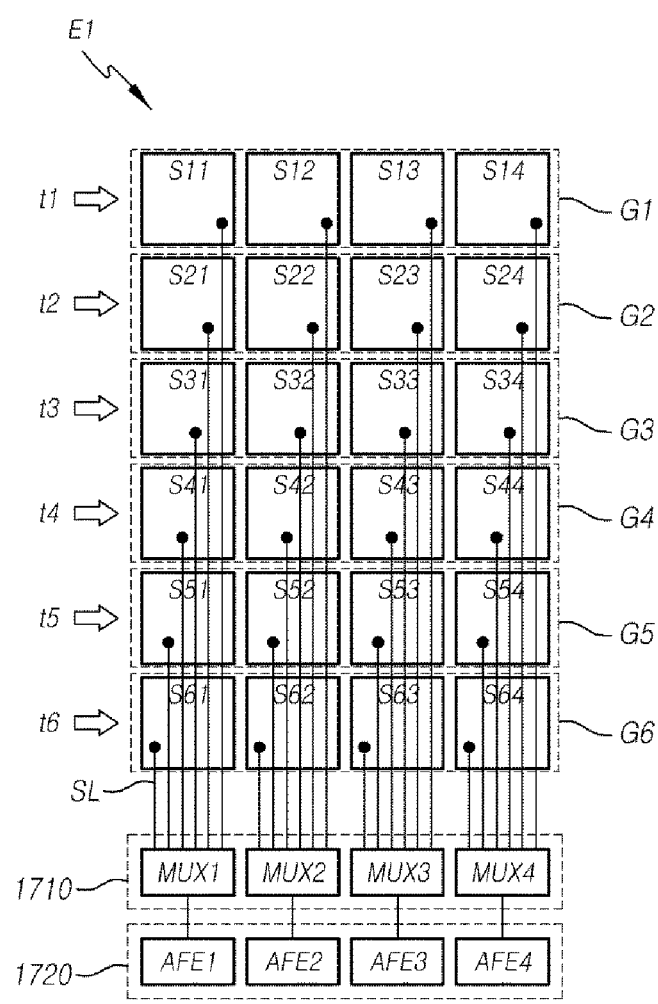
FIG. 18 illustrates exemplary embodiments of the switch circuit and the signal detection circuit of the first electrode driving circuit in the driving circuit of the touch display device according to the present embodiments.

FIG. 17 illustrates a switch circuit 1710 and a signal detection circuit 1720 of the first electrode driving circuit 1310 in the driving circuit 120 of the touch display device 100 according to the present embodiments, and FIG. 18 illustrates exemplary embodiments of the switch circuit 1710 and the signal detection circuit 1720 of the first electrode driving circuit 1310 in the driving circuit 120 of the touch display device 100 according to the present embodiments.

Referring to FIG. 17, in order to selectively supply display driving voltages (e.g. Vcom) and a first electrode driving signal DS1 to the first electrodes E1 according to the two driving periods D and T, the first electrode driving circuit 1310 includes the switch circuit 1710 to select at least one signal line among signal lines SL connected to the plurality of first electrodes E1 and the signal detection circuit 1720 to detect signals via the plurality of first electrodes E1 connected to the switch circuit 1710.

The switch circuit 1710 includes one or more multiplexers. The signal detection circuit 1720 includes one or more analog front ends (AFEs).

In the display driving period D, the switch circuit 1710 selects the entirety of the signal lines SL connected to the plurality of first electrodes E1 and connects the entirety of the signal lines SL to a display driving voltage supply circuit (not shown), whereby display driving voltages are applied to all of the plurality of first electrodes E1.

In the touch driving period T, the first electrode driving circuit 1310 sequentially drives the plurality of first electrodes E1, i.e. drives the plurality of first electrodes E1 one by one in a specific order.

According to this individual driving, the plurality of first electrodes E1 may be driven in the order of S11, S12, S13, S14, S21, S22, ..., S63, and S64.

In the case of individual driving, in the touch driving period T, the switch circuit 1710 sequentially selects the signal lines SL connected to the plurality of first electrodes E1. Thus, the first electrode driving signal DS1 is applied to the corresponding first electrode E1 through the selected signal line.

The first electrode driving circuit 1310 may drive the plurality of first electrodes E1 in groups.

In the case of driving in groups, in the touch driving period T, the switch circuit 1710 sequentially selects a set number of signal lines among the signal lines SL connected to the plurality of first electrodes E1 (where the set number of signal lines is the number of the first electrodes belonging to a single group, and is 4 in FIG. 18). Thus, the first electrode driving signal DS1 is applied to two or more first electrodes E1 belonging to a specific group.

As illustrated in FIG. 17 and FIG. 18, twenty-four first electrodes E1 (S11, S12, S13, S14, S21, S22, S23, S24, ..., S61, S62, S63, and S64) are arranged in a matrix of six rows and four columns. Considering driving efficiency, for example, the switch circuit 1710 includes four multiplexers MUX1, MUX2, MUX3, and MUX4, and the signal detection circuit 1720 includes four analog front ends AFE1, AFE2, AFE3, and AFE4.

Referring to FIG. 18, four first electrodes S11 to S14 arranged in the first row form a first group G1, four first electrodes S21 to S24 arranged in the second row form a second group G2, four first electrodes S31 to S34 arranged in the third row form a third group G3, four first electrodes S41 to S44 arranged in the fourth row form a fourth group G4, four first electrodes S51 to S54 arranged in the fifth row form a fifth group G5, and four first electrodes S61 to S64 arranged in the sixth row form a sixth group G6.

Figure 20A:
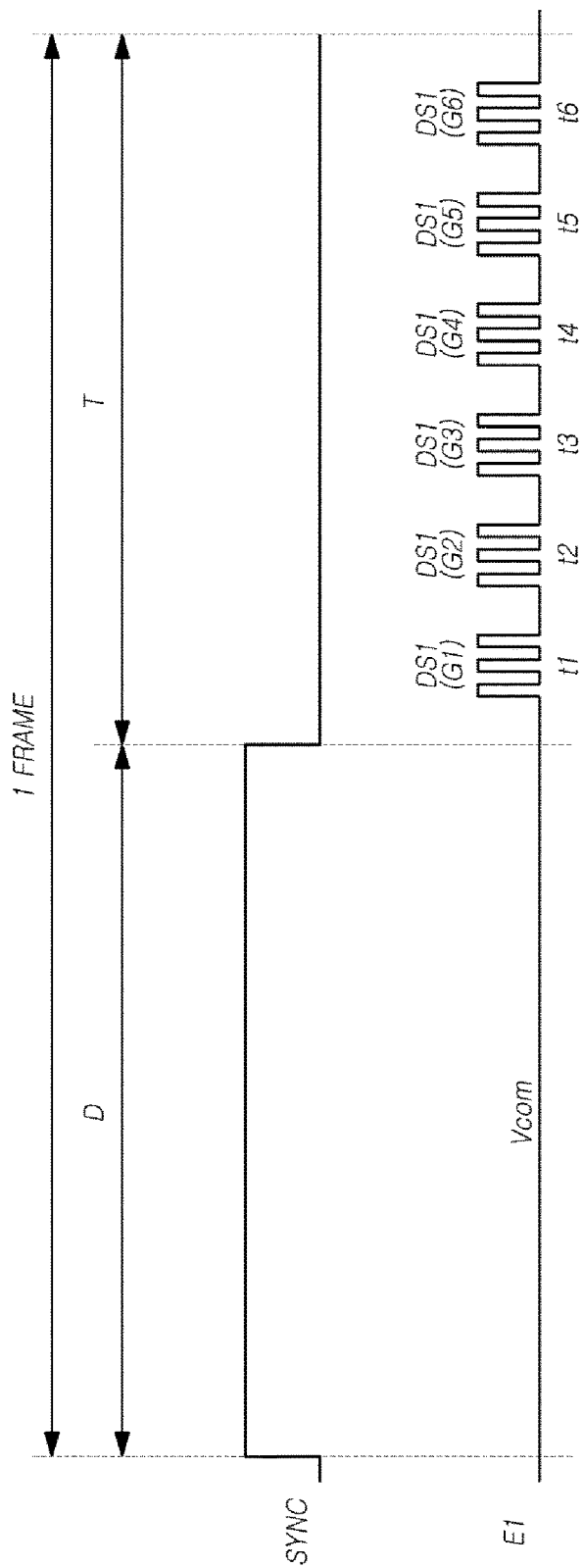

FIG. 19, FIG. 20A, and FIG. 20B illustrate an exemplary first electrode driving method of the touch display device 100 according to the present embodiments.

FIG. 19 illustrates twenty-four first electrodes E1 (S11, S12, S13, S14, S21, S22, S23, S24, ..., S61, S62, S63, and S64) arranged in six groups G1 to G6, as in FIG. 18, in which the six groups G1 to G6 are sequentially driven. As a result, different groups G1 to G6 are driven with the first electrode driving signal DS1 at different points in time t1 to t6 of a frame period.

Referring to FIG. 19, at a point in time t1, the first group G1 is driven in response to a first electrode driving signal DS1 being simultaneously applied to four first electrodes S11 to S14 in the first group G1.

Subsequently, at a point in time t2, the second group G2 is driven in response to a first electrode driving signal DS1 being simultaneously applied to four first electrodes S21 to S24 in the second group G2.

Thereafter, at a point in time t3, the third group G3 is driven in response to a first electrode driving signal DS1 being simultaneously applied to four first electrodes S31 to S34 in the third group G3.

Subsequently, at a point in time t4, the fourth group G4 is driven in response to a first electrode driving signal DS1 being simultaneously applied to four first electrodes S41 to S44 in the fourth group G4.

Thereafter, at a point in time t5, the fifth group G5 is driven in response to a first electrode driving signal DS1 being simultaneously applied to four first electrodes S51 to S54 in the fifth group G5.

Subsequently, at a point in time t6, the sixth group G6 is driven in response to a first electrode driving signal DS1 being simultaneously applied to four first electrodes S61 to S64 in the sixth group G6.

As illustrated in FIG. 20A, a t1 period, a t2 period, a t3 period, a t4 period, a t5 period, and a t6 period may be periods connected to each other, forming a plurality of sub-periods included in a single touch driving period T.

Alternatively, as illustrated in FIG. 20, the t1, t2, t3, t4, t5, and t6 periods correspond to touch driving periods T1, T2, T3, T4, T5, and T6, which are not connected to each other. Here, display driving periods D alternate with the touch driving periods T1 to T6.

Referring to the first allocation method illustrated in FIG. 20A, one display driving period D and one touch driving period T are present in a single frame period.

Referring to FIG. 20a, the display driving period D and the touch driving period T may be controlled based on a synchronous signal SYNC provided from a controller (not shown), such as a timing controller, to the driving circuit 120. Here, a higher level period (or a lower level period) of the synchronous signal SYNC indicates the display driving period D, whereas a lower level period (or a higher level period) of the synchronous signal SYNC indicates the touch driving period T.

In the case in which the two operating modes are controlled using the first allocation method illustrated in FIG. 20A, when the first electrodes are driven in groups, during a single touch driving period T, the first group G1 is driven at the point in time t1, the second group G2 is driven at the point in time t2, the third group G3 is driven at the point in time t3, the fourth group G4 is driven at the point in time t4, the fifth group G5 is driven at the point in time t5, and the sixth group G6 is driven at the point in time t6.

Referring to the second allocation method illustrated in FIG. 20B, six display driving periods D1 to D6 and six touch driving periods T1 to T6 are present in a single frame period.

Referring to FIG. 20B, the six display driving periods D1 to D6 and the six touch driving periods T1 to T6 are controlled based on a synchronous signal SYNC provided from a controller (not shown), such as a timing controller, to the driving circuit 120. Here, a higher level period (or a lower level period) of the synchronous signal SYNC indicates the display driving periods D1 to D6, whereas a lower level period (or a higher level period) of the synchronous signal SYNC indicates the touch driving periods T1 to T6.

In the case in which the two operating modes are controlled using the first allocation method illustrated in FIG. 20B, when the first electrodes are driven in groups, the first group G1 is driven at the point in time t1 in the first touch driving period T1, the second group G2 is driven at the point in time t2 in the second touch driving period T2, the third group G3 is driven at the point in time t3 in the third touch driving period T3, the fourth group G4 is driven at the point in time t4 in the fourth touch driving period T4, the fifth group G5 is driven at the point in time t5 in the fifth touch driving period T4, and the sixth group G6 is driven at the point in time t6 in the sixth touch driving period T6.

The second electrode E2, forming a force sensor together with the plurality of first electrodes E1, may be a single electrode plate or may a split electrode assembly including a plurality of split electrodes.

Hereinafter, exemplary driving methods in a touch driving period T when the second electrode E2 is an electrode plate will be described first, and then exemplary driving methods in a touch driving period T when the second electrode E2 is a split electrode assembly will be described.

Exemplary cases of controlling two operating modes using a first allocation method and exemplary cases of controlling two operating modes using a second allocation method are illustrated in the following drawings, in which a first electrode driving signal DS1 is applied to the plurality of first electrodes E1, and a second electrode driving signal DS2 is applied to the second electrode E2.

Figure 22A:
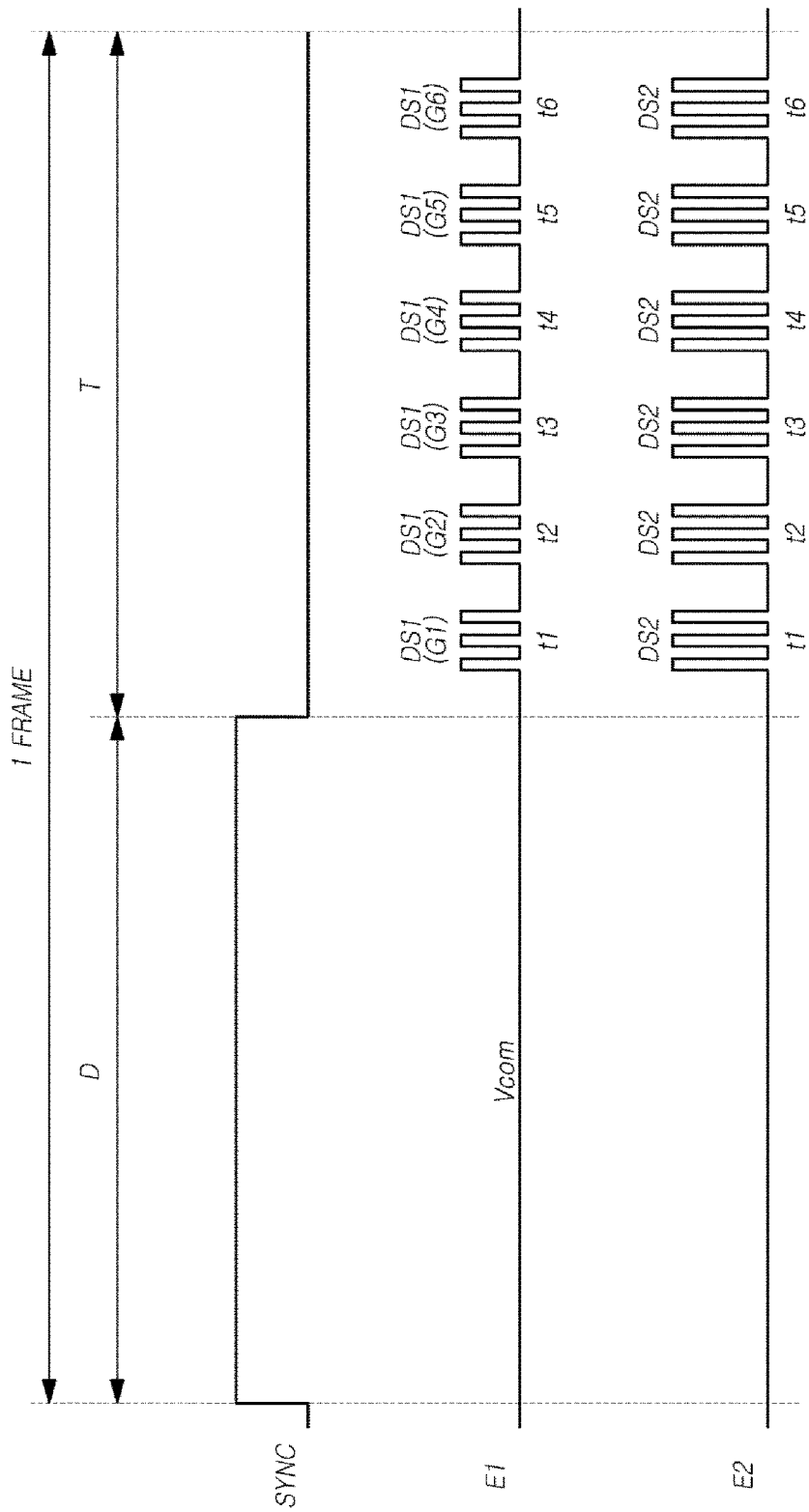
Figure 22B:
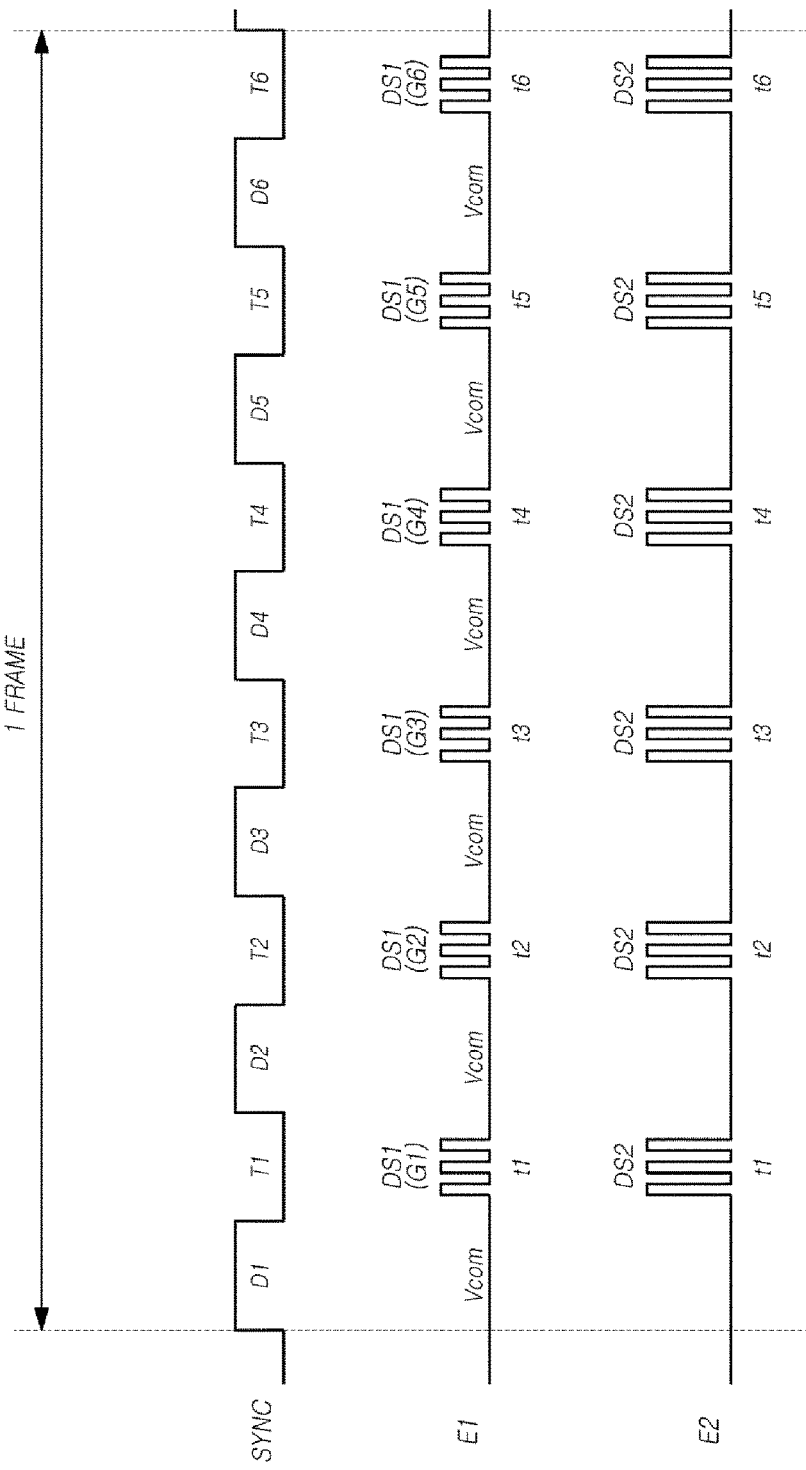

FIG. 21, FIG. 22A, and FIG. 22B illustrate an exemplary touch driving method including full driving of the second electrode E2 in the touch display device 100 according to the present embodiments when the second electrode E2 is an electrode plate. The second electrode E2 is a single electrode having substantially the same size as all of the first electrodes E1.

Referring to FIG. 21, the touch driving method including full driving of the second electrode E2 is a method of driving the second electrode at all points in time t1 to t6 in which the plurality of first electrodes E1 are driven.

In this regard, the driving circuit 120 applies a second electrode driving signal DS2 to the second electrode E2 at each point in time in which a first electrode driving signal DS1 is applied to at least one first electrode among the plurality of first electrodes E1.

Referring to FIG. 22A, when the two operating modes are controlled by the first allocation method, during the touch driving period T, the driving circuit 120 applies the second electrode driving signal DS2 to the second electrode E2 at each of points in time t1 to t6, in each of which the first electrode driving signal DS1 is applied to at least one first electrode (four first electrodes in the case of driving in groups as illustrated) among the plurality of first electrodes E1.

Referring to FIG. 22B, when the two operating modes are controlled by the second allocation method, the driving circuit 120 applies a second electrode driving signal DS2 to the second electrode E2 at points in time t1 to t6 in each of touch driving periods T1 to T6, in which a first electrode driving signal DS1 is applied to at least one first electrode (four first electrodes in the case of driving in groups as illustrated) among the plurality of first electrodes E1.

According to the touch driving method including full driving of the second electrode E2 as described above, the second electrode E2 can be driven in a simple manner.

Figure 23:
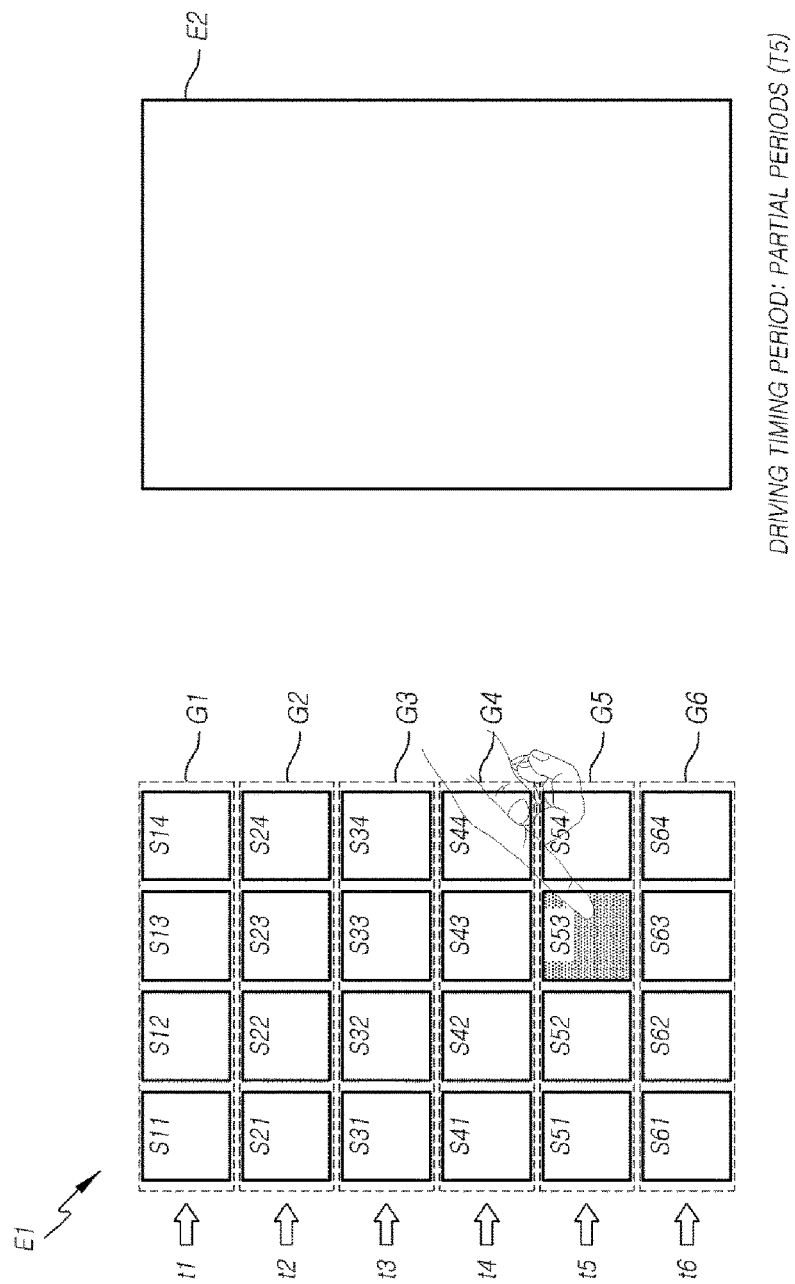
FIG. 23, FIG. 24A, and FIG. 24B illustrate an exemplary touch driving method including temporal partial driving of the second electrode in the touch display device according to the present embodiments when the second electrode is an electrode plate.
Figure 24A:
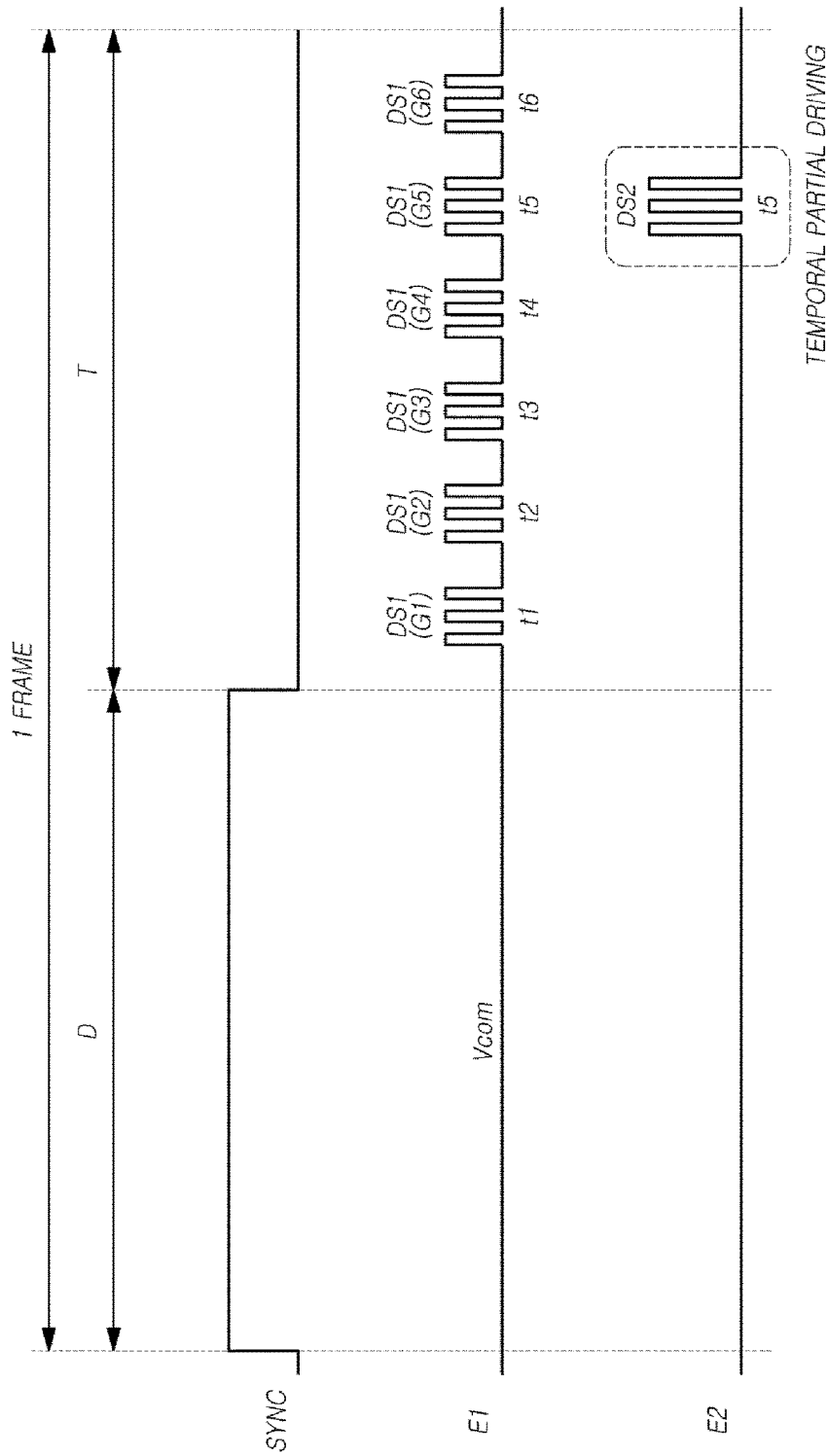
Figure 24B:
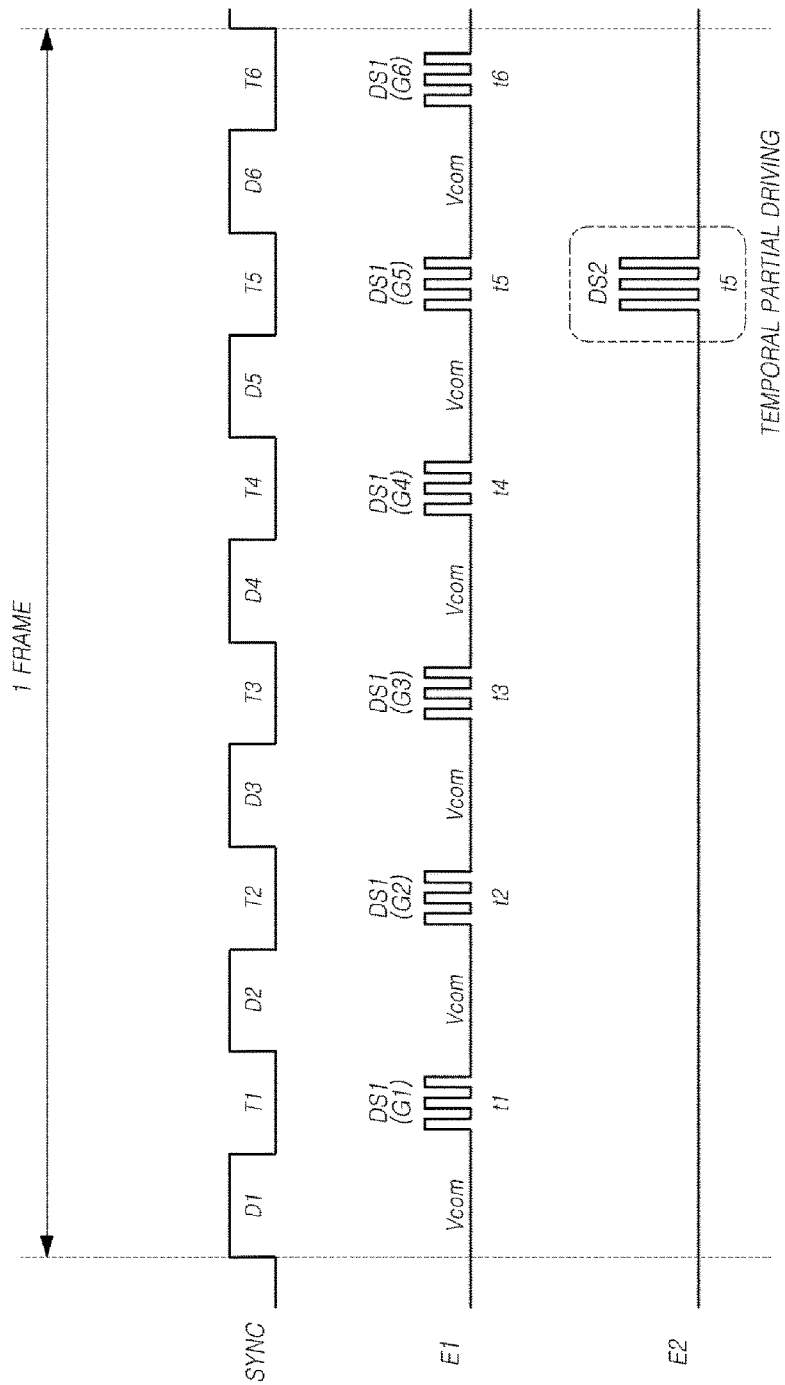

FIG. 23, FIG. 24A, and FIG. 24B illustrate an exemplary touch driving method including temporal partial driving of the second electrode E2 in the touch display device 100 according to the present embodiments when the second electrode E2 is an electrode plate.

Referring to FIG. 23, the touch driving method including temporal partial driving of the second electrode E2 is a method able to reduce the driving time of the second electrode E2, thereby reducing power consumption.

In this regard, the driving circuit 120 applies a second electrode driving signal DS2 to the second electrode E2 at a point in time (e.g. t5) in which a first electrode driving signal DS1 is applied to group G5, which includes the first electrode S53 among the plurality of first electrodes E1 corresponding to a previously-detected touch position in a touch driving period that has already been processed.

Referring to FIG. 24A, when two operating modes are controlled by the first allocation method, in a touch driving period T, the driving circuit 120 applies a second electrode driving signal DS2 to the second electrode E2 only at a point in time t5 at which the first electrode S53 corresponding to a previously-detected touch position is driven, among all points in time t1 to t6 at which a first electrode driving signal DS1 is applied to at least one first electrode among the plurality of first electrodes E1 (four first electrodes in the case of driving in groups), and does not apply the second electrode driving signal DS2 to the second electrode E2 at the other points in time t1 to t4 and t6.

Referring to FIG. 24B, when the two operating modes are controlled by the second allocation method, the driving circuit 120 applies a second electrode driving signal DS2 to the second electrode E2 only at a point in time t5 at which the first electrode S53 corresponding to a previously-detected touch position is driven, among points in time t1 to t6 in each of touch driving periods T1 to T6 in which a first electrode driving signal DS1 is applied to at least one first electrode among the plurality of first electrodes E1 (four first electrodes in the case of driving in groups), and does not apply the second electrode driving signal DS2 to the second electrode E2 at the other points in time t1 to t4 and t6.

When the second electrode E2 is driven using the touch driving method including temporal partial driving of the second electrode E2, it is possible to reduce power consumption while enabling force sensing.

Figure 26A:
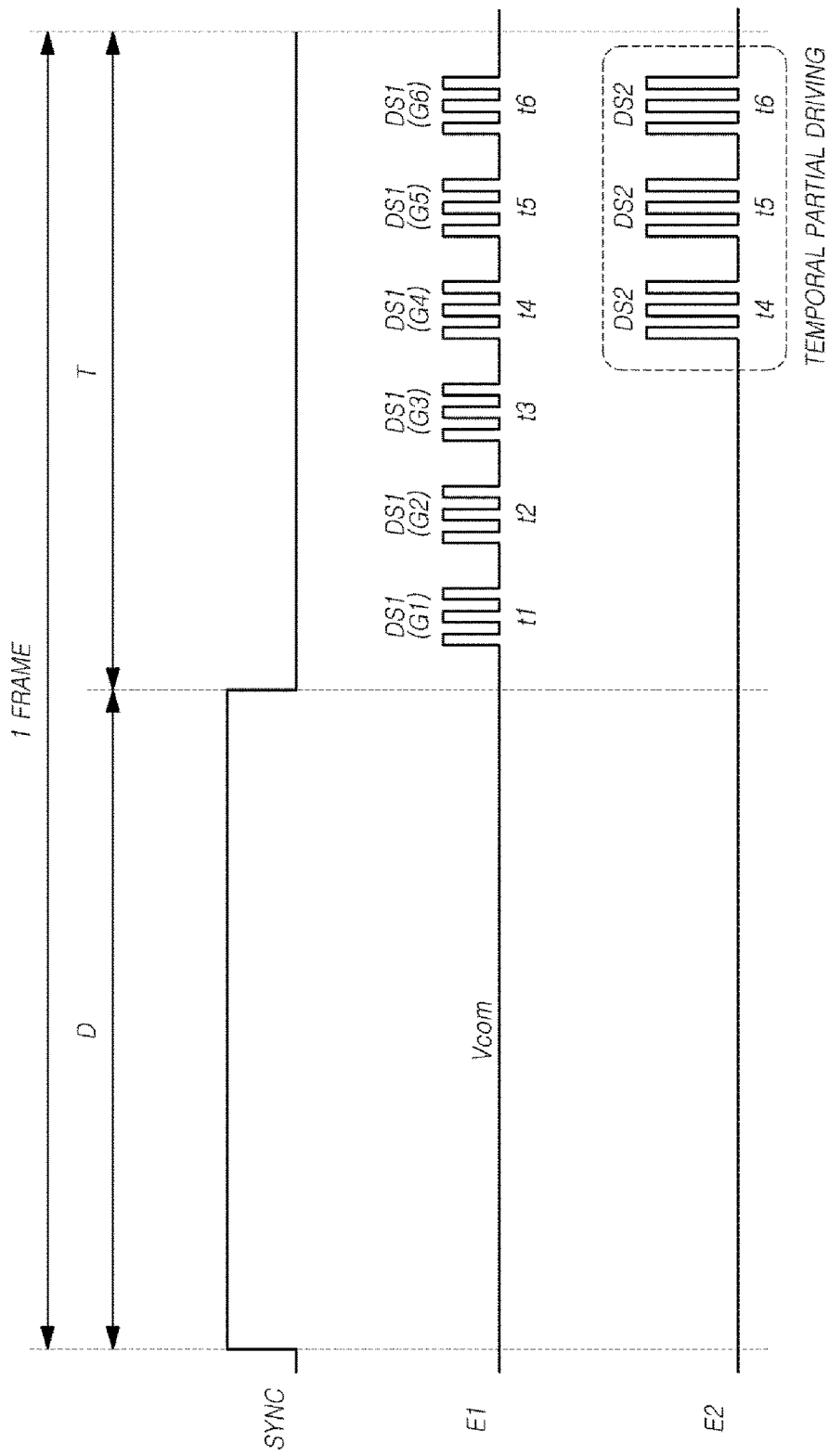
Figure 26B:
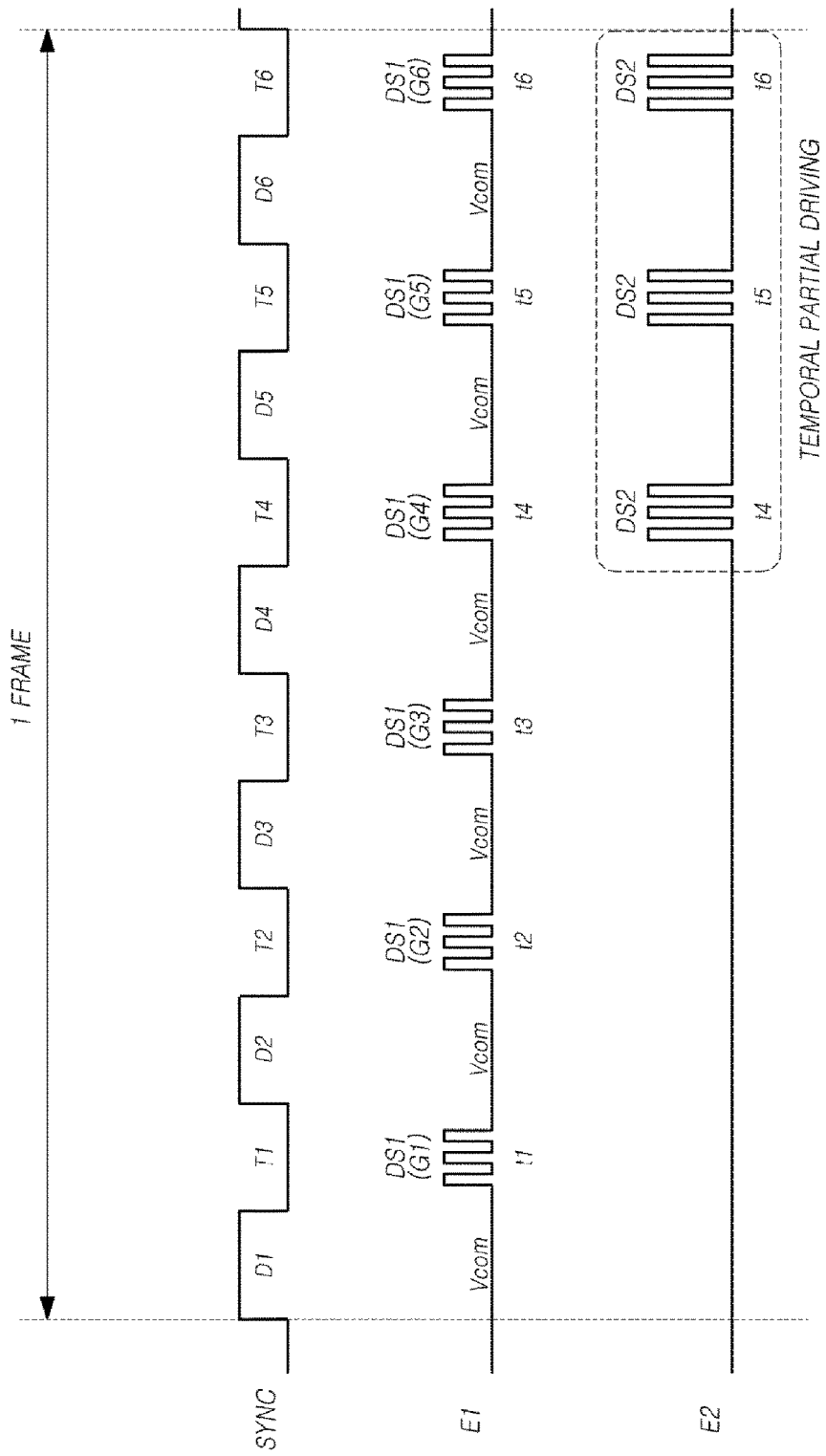

FIG. 25, FIG. 26A, and FIG. 26B illustrate an exemplary touch driving method including extended temporal partial driving of the second electrode E2 in the touch display device 100 according to the present embodiments when the second electrode E2 is an electrode plate.

Referring to FIG. 25, the touch driving method including extended temporal partial driving of the second electrode E2 is a method able to reduce power consumption while preventing the accuracy of force sensing from being lowered due to temporal partial driving.

The driving circuit 120 applies a second electrode driving signal DS2 to the second electrode E2 at points in time t4, t5, and t6 at which a first electrode driving signal DS1 is applied to the first electrode S53 corresponding to a previously-detected touch position and the surrounding first electrodes S42 to S44, S52, S54, and S62 to S64. More specifically, during t5 first electrode driving signal DS1 is applied to group G5, and during t4 and t6 first electrode driving signal DS1 is applied to adjacent groups G4 and G6.

Referring to FIG. 26a, when two operating modes are controlled by the first allocation method, during a touch driving mode T, the driving circuit 120 applies a second electrode driving signal DS2 to the second electrode E2 at points in time t4, t5, and t6 at which the first electrode S53 corresponding to a previously-detected touch position and the surrounding first electrodes S42 to S44, S52, S54, and S62 to S64 are driven, among all points in time t1 to t6 at which a first electrode driving signal DS1 is applied to at least one first electrode among the plurality of first electrodes E1 (four first electrodes in the case of driving in groups). The driving circuit 120 does not apply the second electrode driving signal DS2 to the second electrode E2 at the other points in time t1 to t3.

Referring to FIG. 26B, when the two operating modes are controlled by the second allocation method, the driving circuit 120 applies a second electrode driving signal DS2 to the second electrode E2 at points in time t4, t5, and t6 at which the first electrode S53 corresponding to a previously-detected touch position and the surrounding first electrodes S42 to S44, S52, S54, and S62 to S64 are driven, among points in time t1 to t6 in each of touch driving periods T1 to T6 in which a first electrode driving signal DS1 is applied to at least one first electrode among the plurality of first electrodes E1 (four first electrodes in the case of driving in groups), and does not apply the second electrode driving signal DS2 to the second electrode E2 at the other points in time t1 to t3.

When the second electrode E2 is driven using the touch driving method including extended temporal partial driving of the second electrode E2, it is possible to reduce power consumption while preventing the accuracy of force sensing from being lowered due to temporal partial driving.

The second electrode E2 may be a split electrode assembly including two or more split electrodes.

The number of the split electrodes may be the same as or lower than the number of the first electrodes.

The number of the split electrodes may be set in consideration of the efficiency and accuracy of force sensing.

When the second electrode E2 is a split electrode assembly, precise force sensing is possible. In particular, a multi-force sensing function able to detect two or more force touches can be provided.

Hereinafter, reference will be made to exemplary touch driving methods in a touch driving period T when the second electrode E2 is a split electrode assembly.

Figure 27:
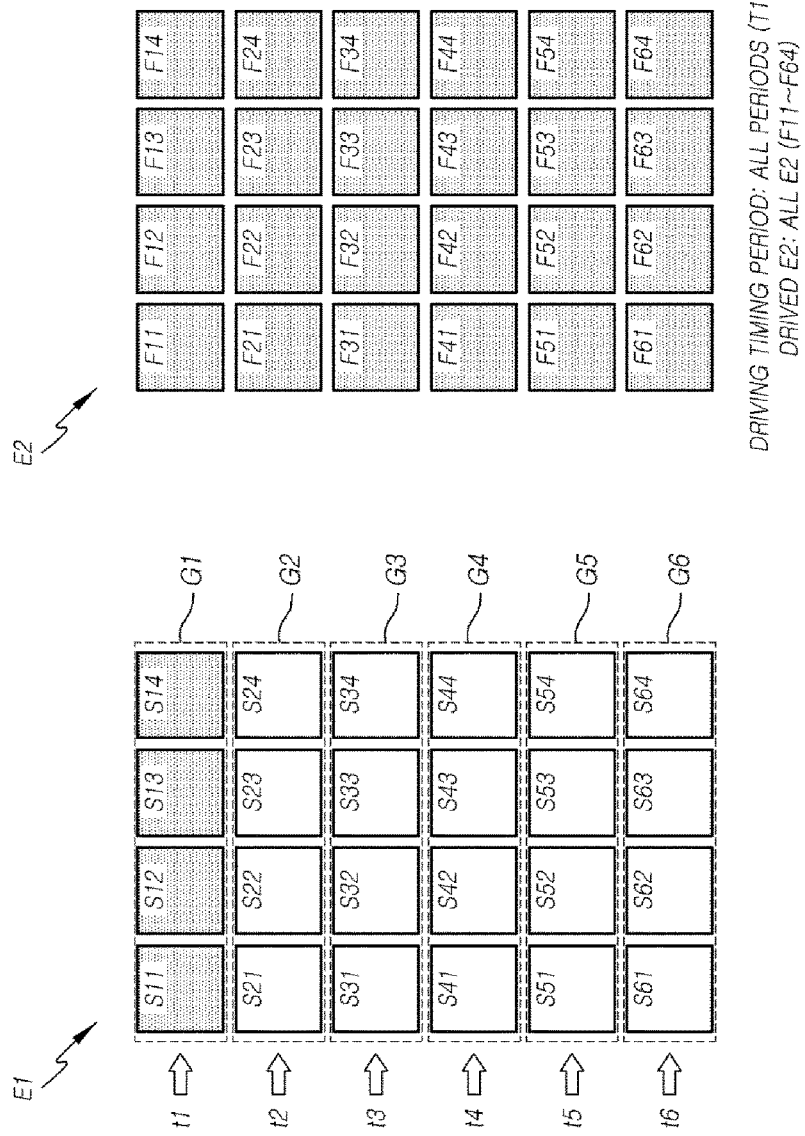
FIG. 27, FIG. 28A, and FIG. 28B illustrate an exemplary touch driving method including full driving of the second electrode when the second electrode of the touch display device according to the present embodiments is a split electrode assembly.
Figure 28A:
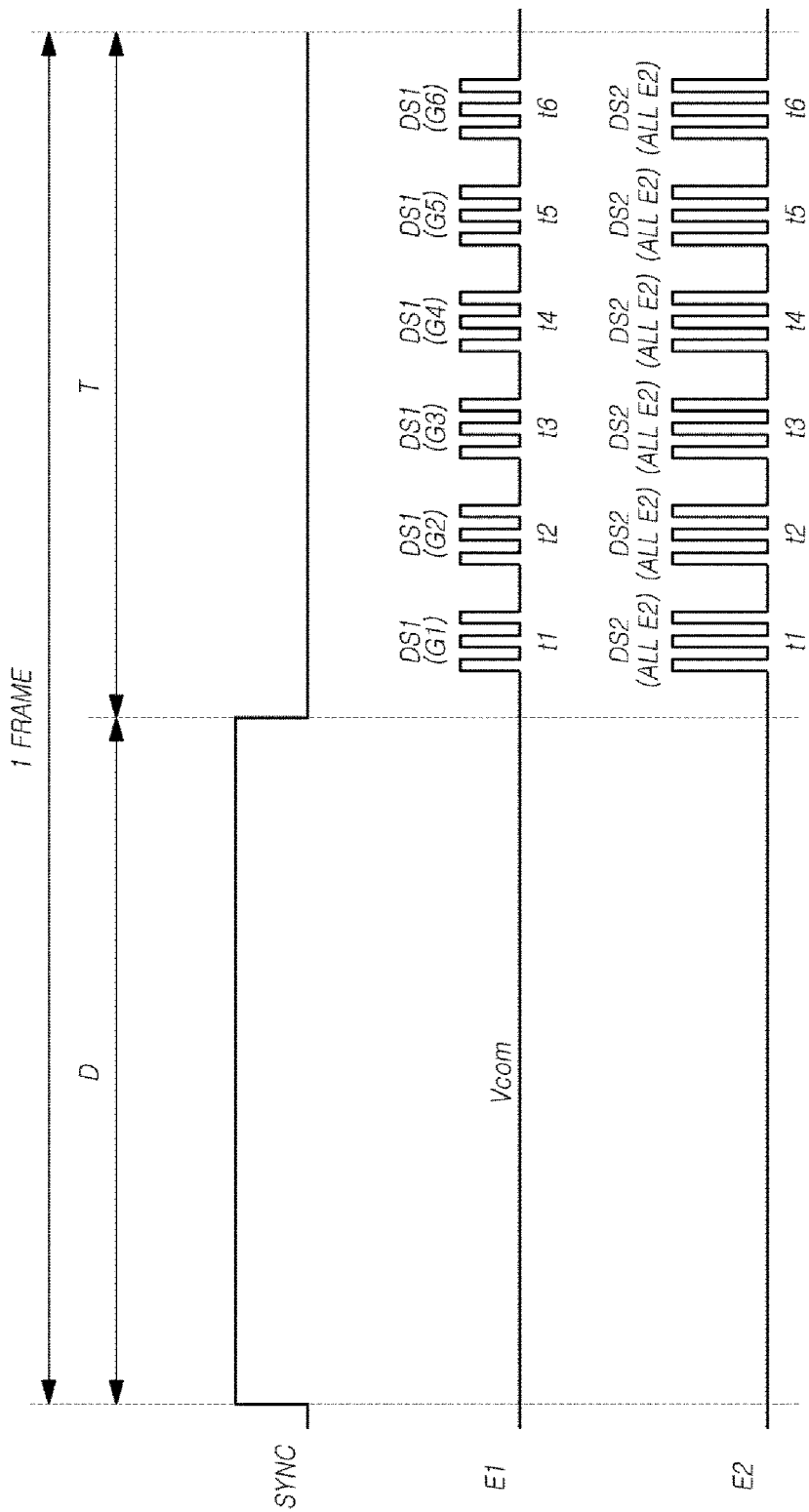
Figure 28B:
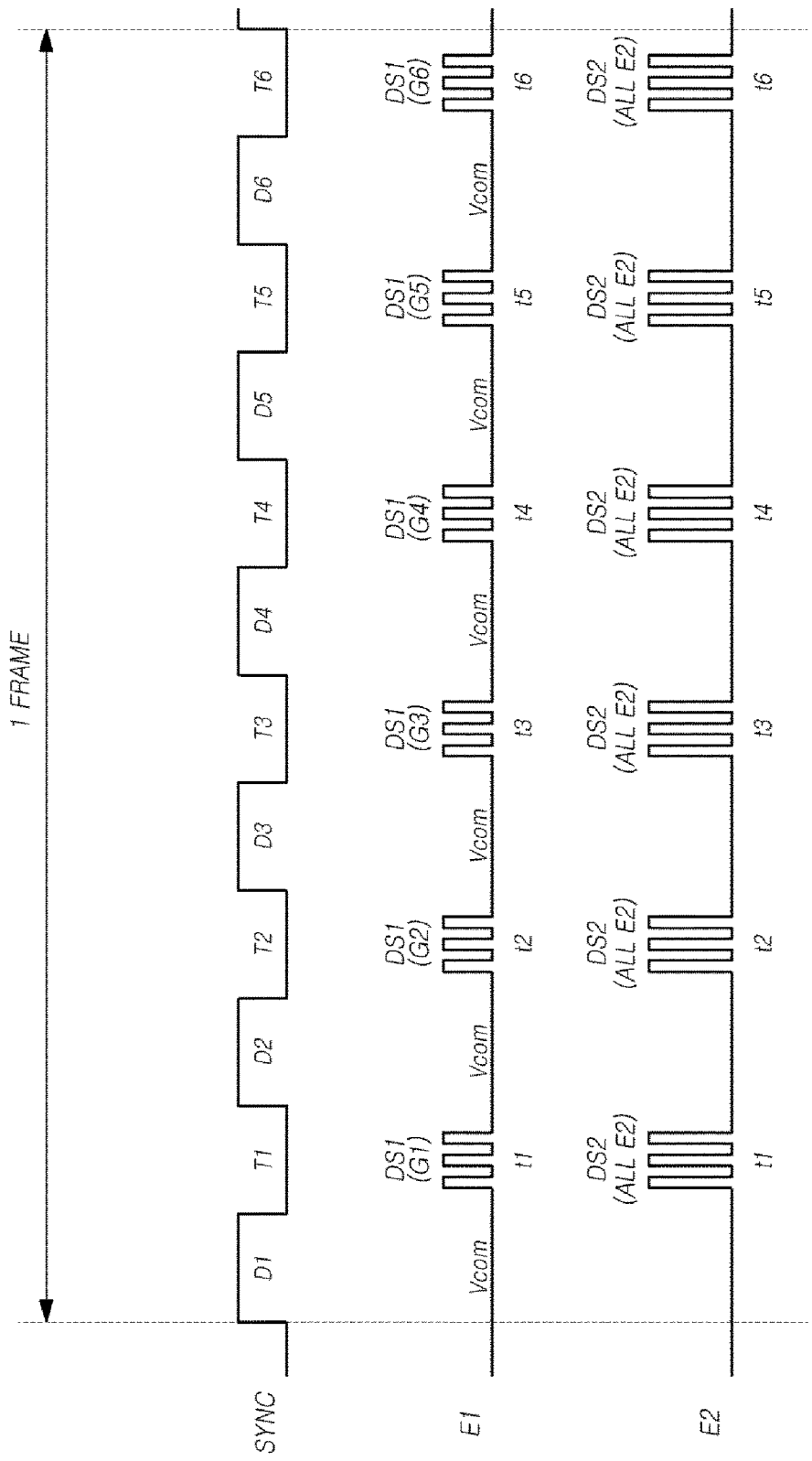

FIG. 27, FIG. 28A, and FIG. 28B illustrate an exemplary touch driving method including full driving of the second electrode E2 when the second electrode E2 of the touch display device 100 according to the present embodiments is a split electrode assembly.

Hereinafter, for the sake of explanation, the second electrode E2 includes twenty four split electrodes F11 to F14, F21 to F24, F31 to F34, F41 to F44, F51 to F54, and F61 to F64.

Referring to FIG. 27, the touch driving method including full driving of the second electrode E2 is a method of driving all of the split electrodes of the second electrode E2 while driving all of the plurality of first electrodes E1.

Referring to FIG. 27, FIG. 28A, and FIG. 28B, the driving circuit 120 applies a second electrode driving signal DS2 to all of two or more split electrodes F11 to F14, F21 to F24, F31 to F34, F41 to F44, F51 to F54, and F61 to F64 at points in time t1 to t6 at which a first electrode driving signal DS1 is sequentially applied to at least one first electrode among the plurality of first electrodes E1.

When the second electrode E2 is a split electrode assembly, according to the touch driving method including full driving of the second electrode E2 as described above, the second electrode E2 can be driven in a simple manner.

Figure 29:
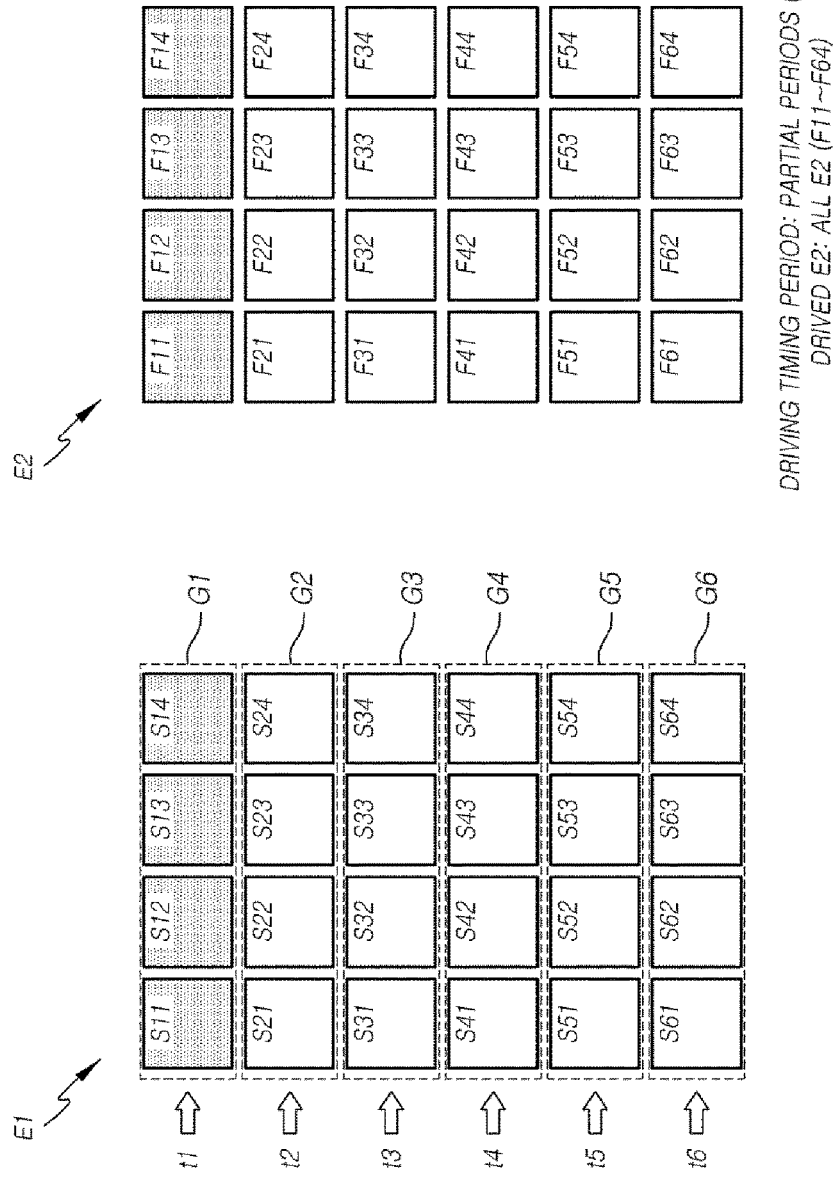
FIG. 29, FIG. 30A, and FIG. 30B illustrate another exemplary touch driving method including full driving of the second electrode when the second electrode of the touch display device according to the present embodiments is a split electrode assembly.
Figure 30A:
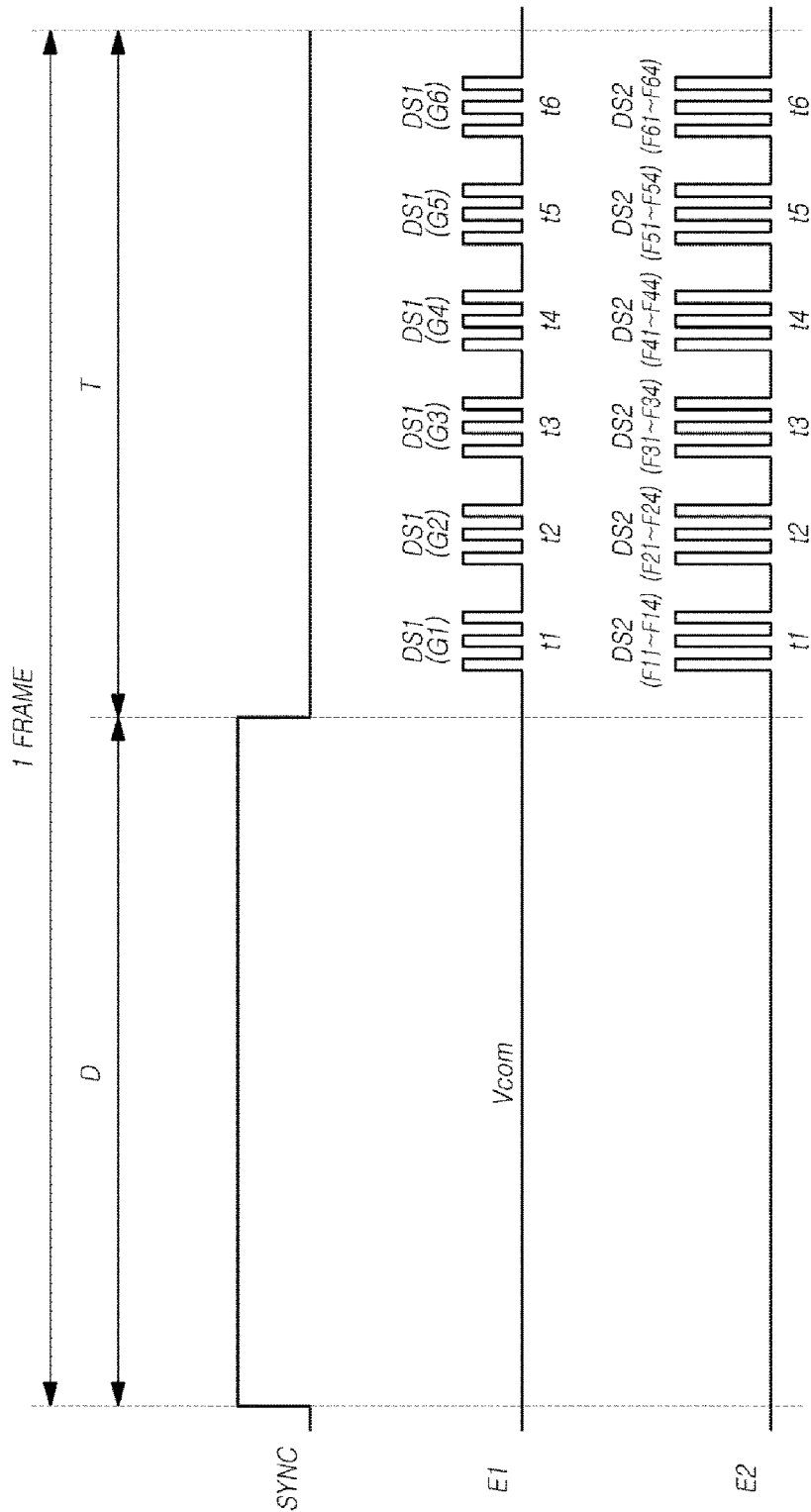
Figure 30B:
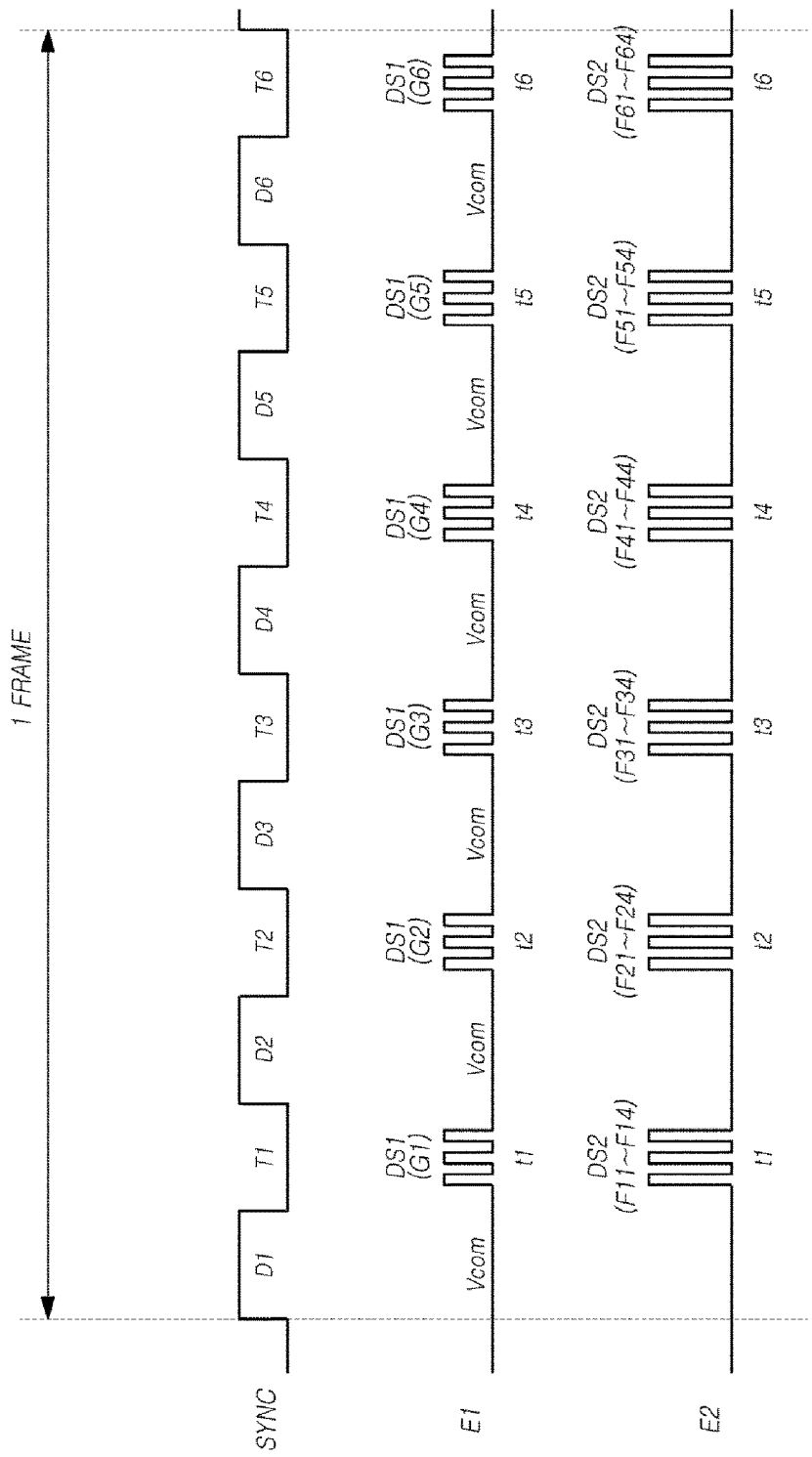

FIG. 29, FIG. 30A, and FIG. 30B illustrate another exemplary touch driving method including full driving of the second electrode E2 when the second electrode E2 of the touch display device 100 according to the present embodiments is a split electrode assembly.

Referring to FIG. 29, the touch driving method including full driving of the second electrode E2 is a method of driving all of the split electrodes of the second electrode E2 while driving all of the plurality of first electrodes E1, by driving specific groups of split electrodes corresponding to specific first electrodes being driven.

Referring to FIG. 29, FIG. 30A, and FIG. 30B, the driving circuit 120 applies a second electrode driving signal DS2 to a group of split electrodes (e.g. F11 to F14) corresponding to a group of first electrodes (e.g. S11 to S14 in the first group G1) to which a first electrode driving signal DS1 is applied at each of points in time t1 to t6 at which the first electrode driving signal DS1 is applied to at least one first electrode among the plurality of first electrodes E1.

At t1, when the first electrode driving signal DS1 is applied to the first electrodes S11 to S14 in the first group G1 among the plurality of first electrodes E1, the second electrode driving signal DS2 is applied to the group of split electrodes F11 to F14 among the twenty four split electrodes of the second electrode E2, corresponding to the first electrodes S11 to S14.

At t2, when the first electrode driving signal DS1 is applied to the first electrodes S21 to S24 in the second group G2 among the plurality of first electrodes E1, the second electrode driving signal DS2 is applied to the group of split electrodes F21 to F24 among the twenty four split electrodes of the second electrode E2, corresponding to the first electrodes S21 to S24.

At t3, when the first electrode driving signal DS1 is applied to the first electrodes S31 to S34 in the third group G3 among the plurality of first electrodes E1, the second electrode driving signal DS2 is applied to the group of split electrodes F31 to F34 among the twenty four split electrodes of the second electrode E2, corresponding to the first electrodes S31 to S34.

At t4, when the first electrode driving signal DS1 is applied to the first electrodes S41 to S44 in the fourth group G4 among the plurality of first electrodes E1, the second electrode driving signal DS2 is applied to the group of split electrodes F41 to F44 among the twenty four split electrodes of the second electrode E2, corresponding to the first electrodes S41 to S44.

At t5, when the first electrode driving signal DS1 is applied to the first electrodes S51 to S54 in the fifth group G5 among the plurality of first electrodes E1, the second electrode driving signal DS2 is applied to the group of split electrodes F51 to F54 among the twenty four split electrodes of the second electrode E2, corresponding to the first electrodes S51 to S54.

At t6, when the first electrode driving signal DS1 is applied to the first electrodes S61 to S64 in the sixth group G6 among the plurality of first electrodes E1, the second electrode driving signal DS2 is applied to the group of split electrodes F61 to F64 among the twenty four split electrodes of the second electrode E2, corresponding to the first electrodes S61 to S64.

When the second electrode E2 is a split electrode assembly, the use of the touch driving method, including full driving of the second electrode E2 as described above, can reduce the driving time of each of the plurality of split electrodes of the second electrode E2, thereby reducing power consumption.

Figure 32A:
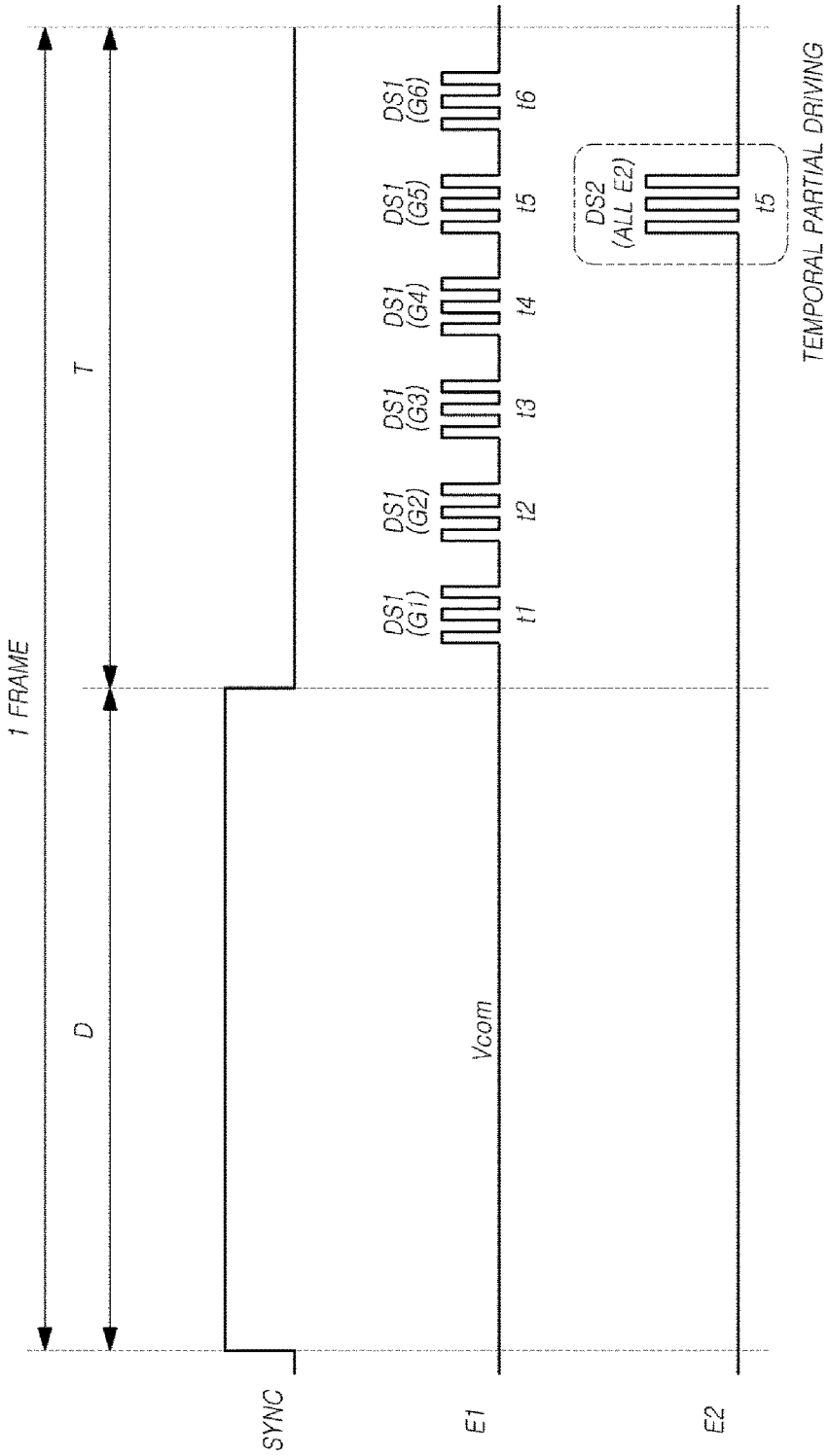
Figure 32B:
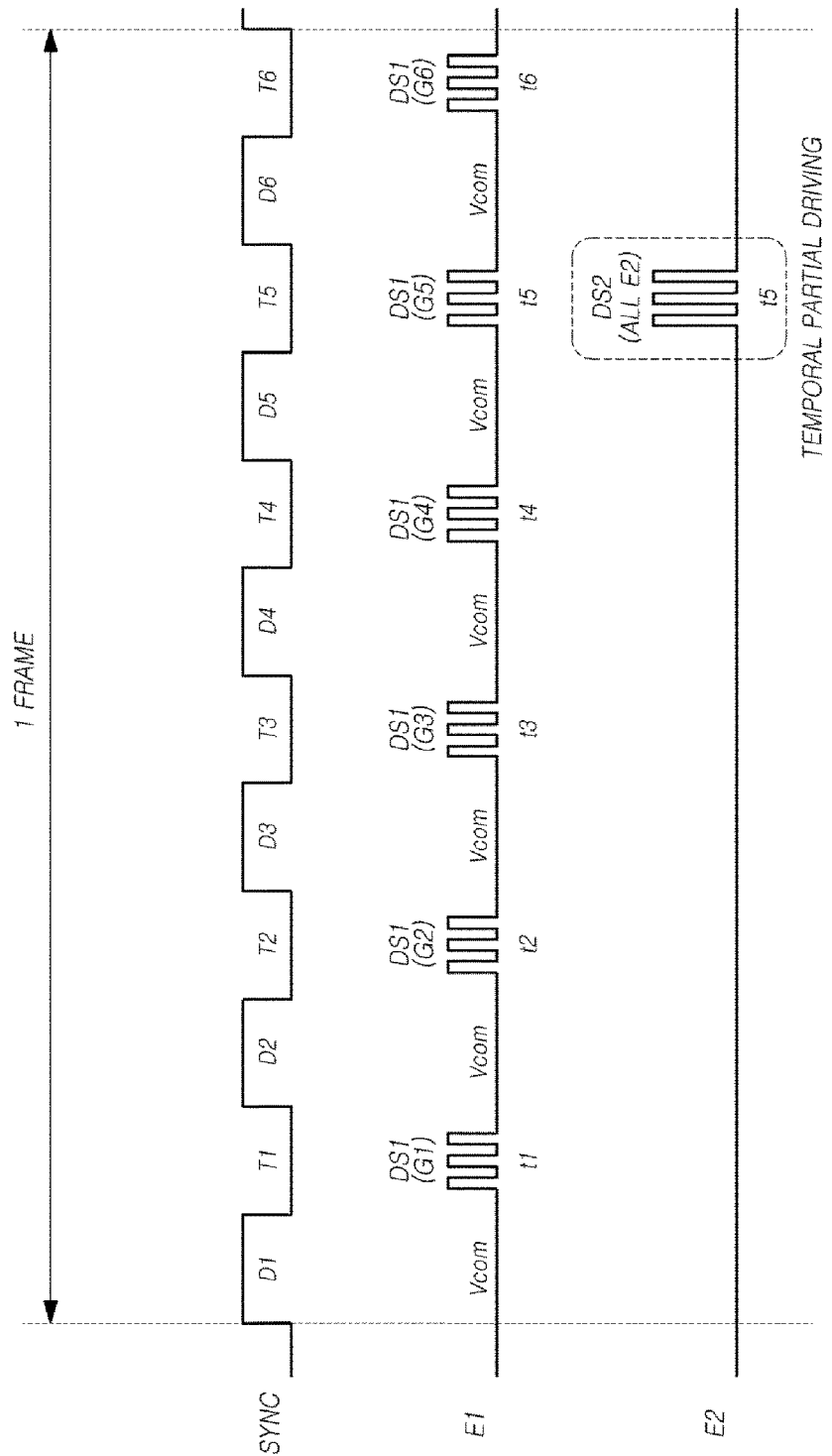

FIG. 31, FIG. 32A, and FIG. 32B illustrate an exemplary touch driving method including temporal partial driving of the second electrode E2 when the second electrode E2 of the touch display device 100 according to the present embodiments is a split electrode assembly.

Referring to FIG. 31, FIG. 32A, and FIG. 32B, the touch driving method including temporal partial driving of the second electrode E2 is a method able to reduce the driving time of each of the plurality of split electrodes F11 to F14, F21 to F24, F31 to F34, F41 to F44, F51 to F54, and F61 to F64 of the second electrode E2 (temporal partial driving), thereby reducing power consumption.

Referring to FIG. 31, FIG. 32A, and FIG. 32B, the driving circuit 120 applies a second electrode driving signal DS2 to all of two or more split electrodes F11 to F14, F21 to F24, F31 to F34, F41 to F44, F51 to F54, and F61 to F64 of the second electrode E2 only at a point in time t5 at which a first electrode driving signal DS1 is applied to the electrode group G5 that includes first electrode S53 corresponding to a previously-detected touch position.

When the second electrode E2 is a split electrode assembly, the touch driving method including temporal partial driving of the second electrode E2 can reduce power consumption while enabling force sensing.

Figure 33:
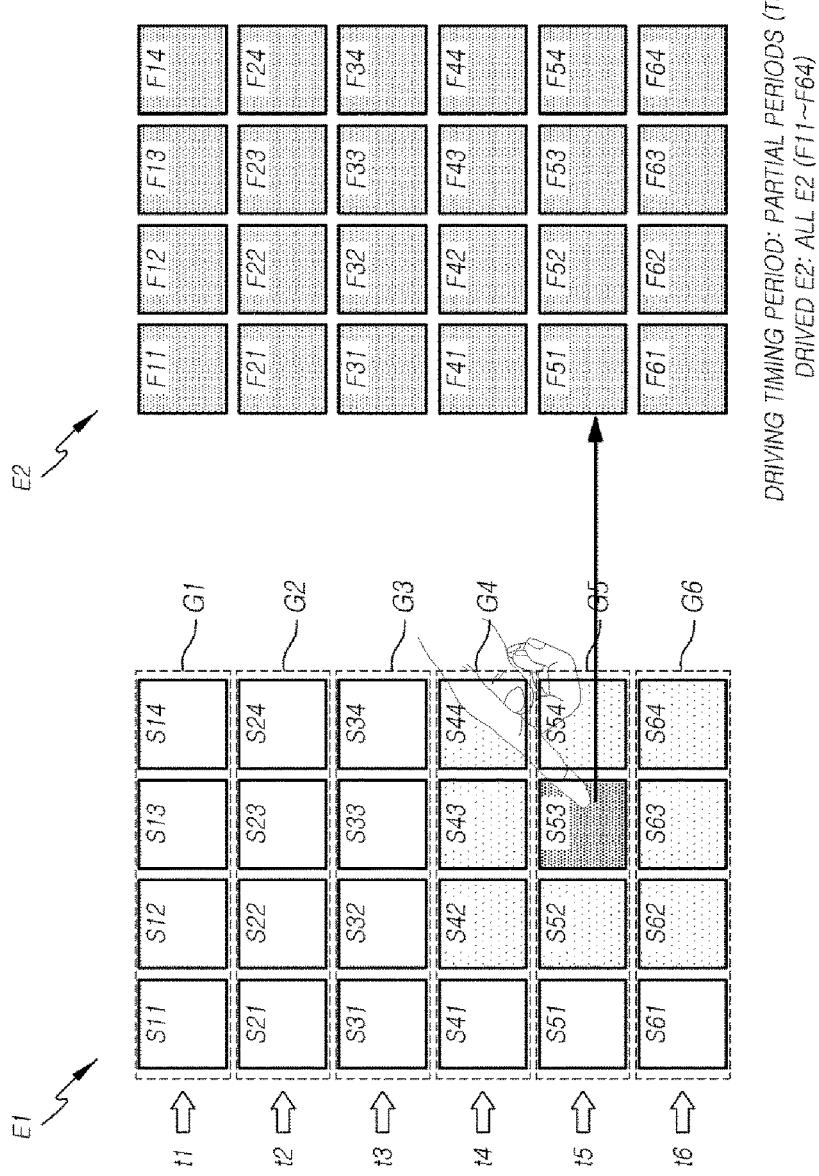
FIG. 33, FIG. 34A, and FIG. 34B illustrate an exemplary touch driving method including extended temporal partial driving of the second electrode when the second electrode of the touch display device according to the present embodiments is a split electrode assembly.
Figure 34A:
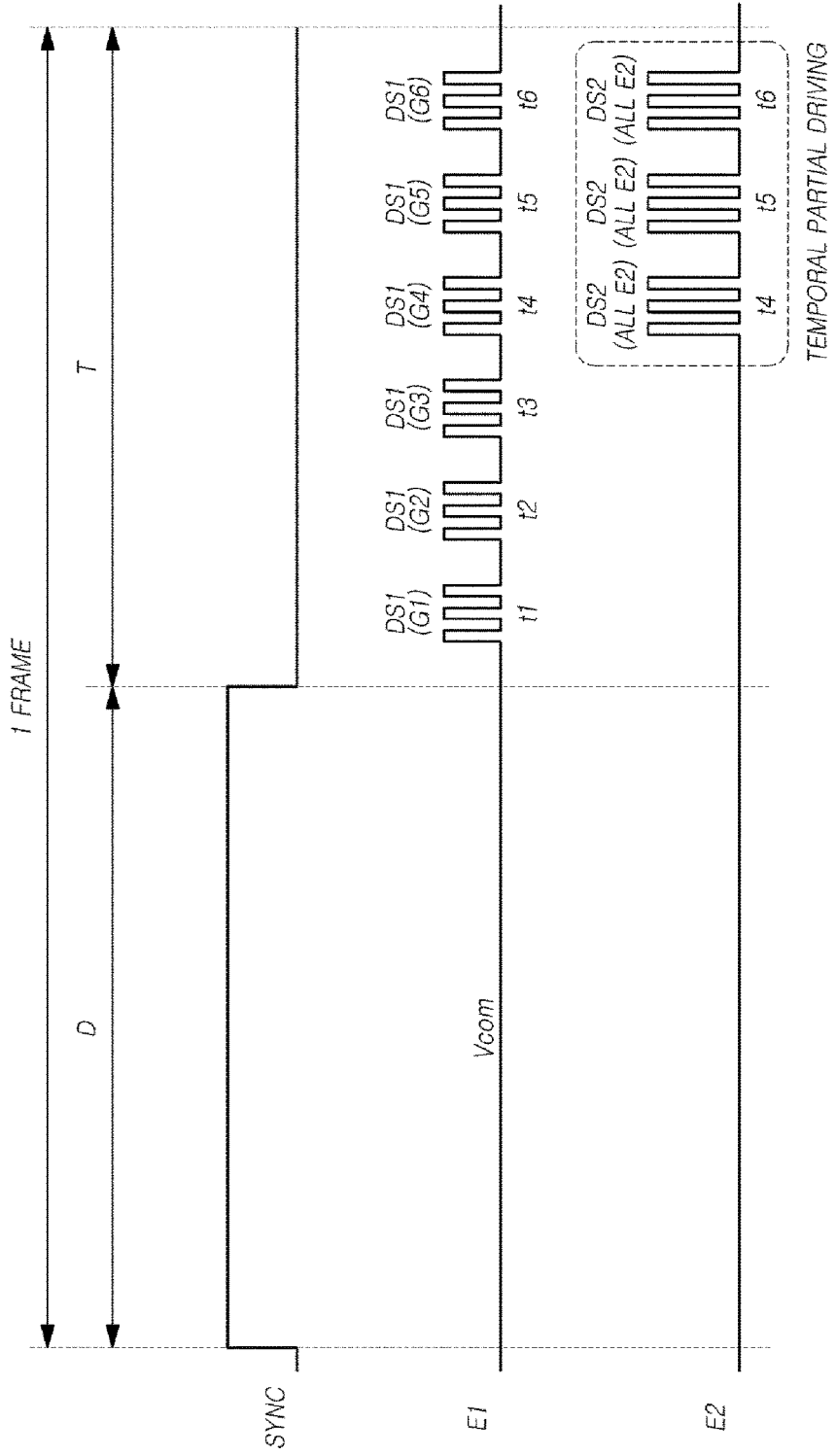
Figure 34B:
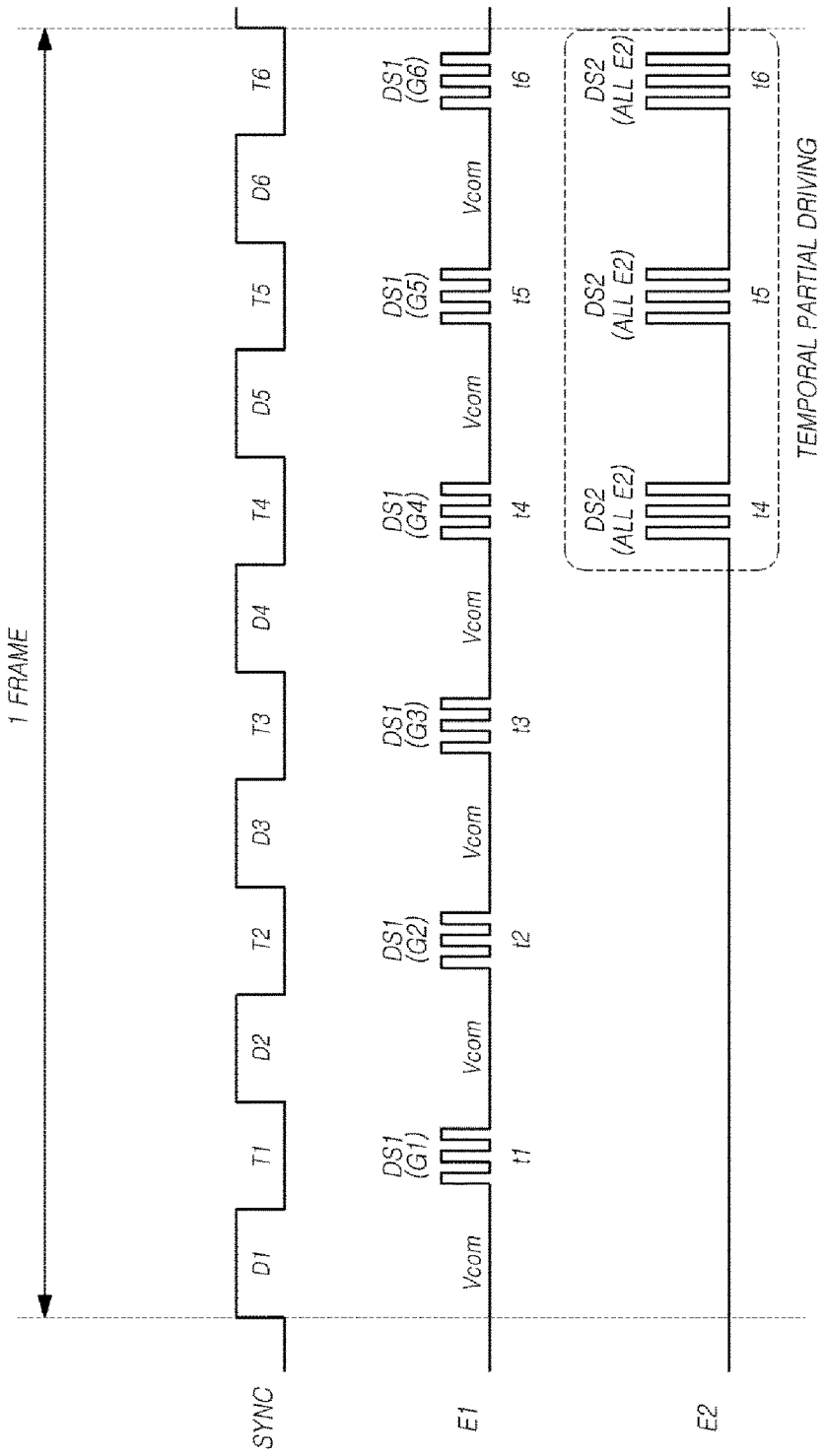

FIG. 33, FIG. 34A, and FIG. 34B illustrate an exemplary touch driving method including extended temporal partial driving of the second electrode E2 when the second electrode E2 of the touch display device 100 according to the present embodiments is a split electrode assembly.

Referring to FIG. 33, FIG. 34A, and FIG. 34B, the touch driving method including extended temporal partial driving of the second electrode E2 is a method able to reduce power consumption by reducing the driving time of each of the plurality of split electrodes F11 to F14, F21 to F24, F31 to F34, F41 to F44, F51 to F54, and F61 to F64 of the second electrode E2 (temporal partial driving) while preventing the accuracy of force sensing from being lowered due to temporal partial driving.

Referring to FIG. 33, FIG. 34A, and FIG. 34B, the driving circuit 120 applies a second electrode driving signal DS2 to all of two or more split electrodes F11 to F14, F21 to F24, F31 to F34, F41 to F44, F51 to F54, and F61 to F64 of the second electrode E2 at points in time t4 to t6 at which a first electrode driving signal DS1 is applied to the first electrode S53 corresponding to a previously-detected touch position and the surrounding first electrodes S42 to S44, S52, S54, and S62 to S64. More specifically, during t5 first electrode driving signal DS1 is applied to group G5, and during t4 and t6 first electrode driving signal DS1 is applied to adjacent groups G4 and G6.

When the second electrode E2 is a split electrode assembly, the touch driving method including extended temporal partial driving of the second electrode E2 can reduce power consumption while preventing the accuracy of force sensing from being lowered due to temporal partial driving.

Figure 36B:
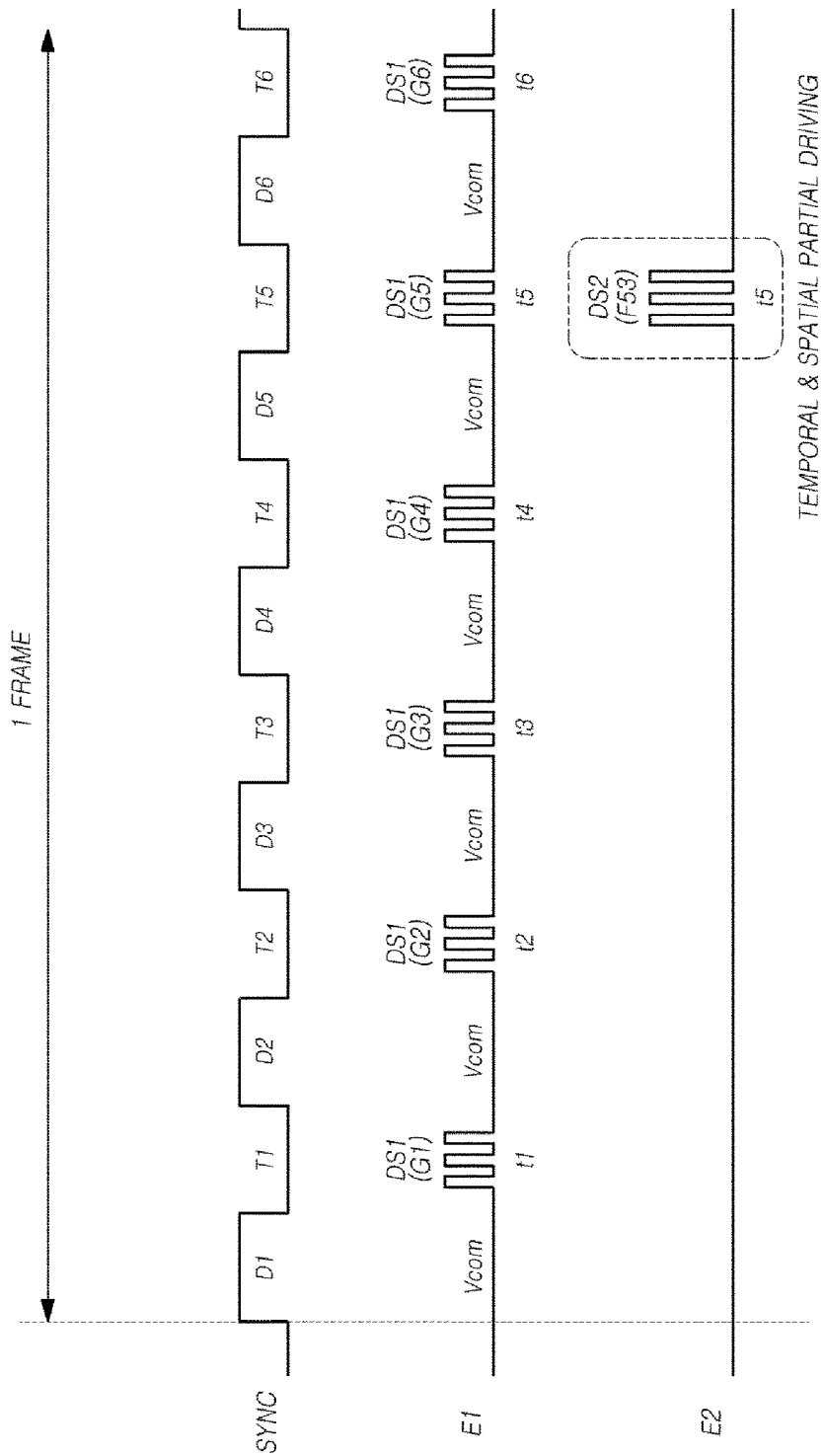

FIG. 35, FIG. 36A, and FIG. 36B illustrate an exemplary touch driving method including temporal/spatial partial driving of the second electrode E2 when the second electrode E2 of the touch display device 100 according to the present embodiments is a split electrode assembly.

Referring to FIG. 35, FIG. 36A, and FIG. 36B, the touch driving method including temporal/spatial partial driving of the second electrode E2 is a method able to further reduce power consumption by reducing the driving time of each of the plurality of split electrodes F11 to F14, F21 to F24, F31 to F34, F41 to F44, F51 to F54, and F61 to F64 of the second electrode E2 (temporal partial driving) and reducing the number of the split electrodes to be driven (spatial partial driving).

Referring to FIG. 35, FIG. 36A, and FIG. 36B, the driving circuit 120 applies a second electrode driving signal DS2 to the split electrode F53 corresponding to a previously-detected touch position instead of to the entirety of the split electrodes, at a point in time t5 at which a first electrode driving signal DS1 is applied to the first electrode S53 corresponding to the previously-detected touch position.

When the second electrode E2 is a split electrode assembly, the touch driving method including temporal/spatial partial driving of the second electrode E2 can further reduce power consumption by reducing the driving time of the split electrodes and reducing the number of the split electrodes to be driven.

Figure 37:
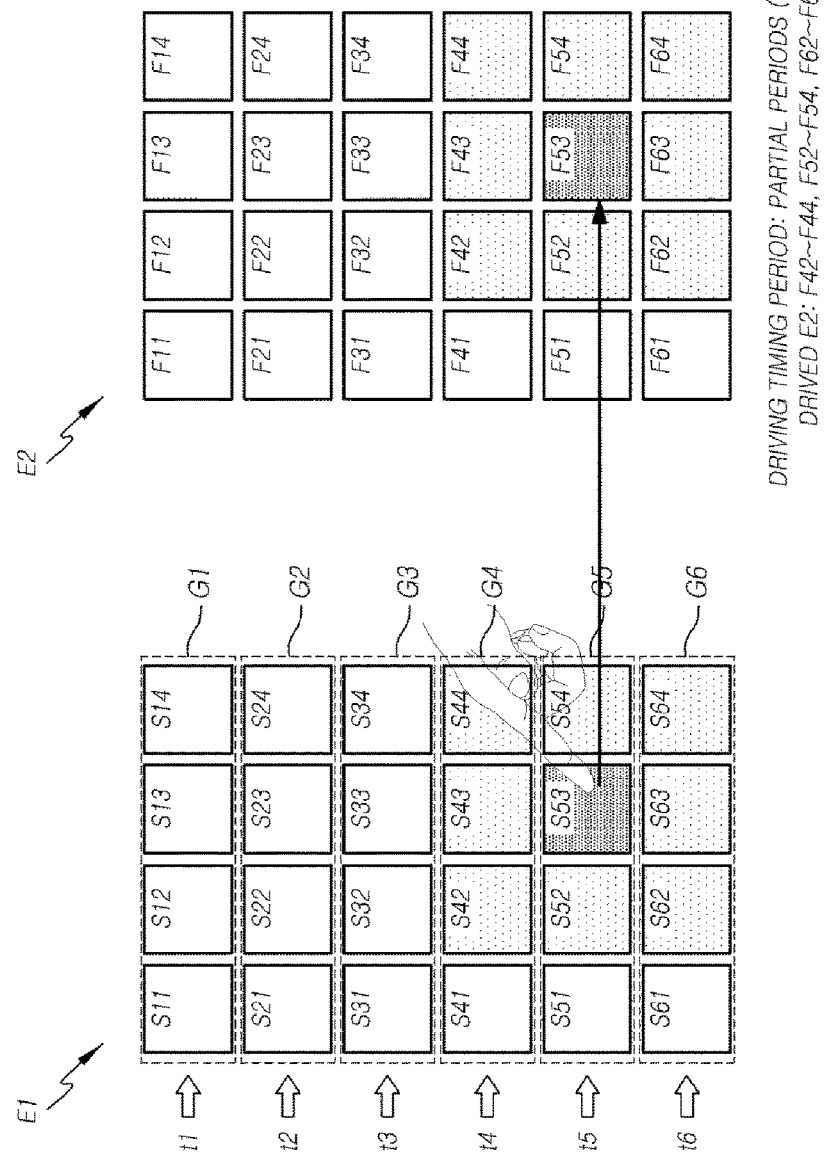

FIG. 37, FIG. 38A, and FIG. 38B illustrate an exemplary touch driving method including extended temporal/spatial partial driving of the second electrode E2 when the second electrode E2 of the touch display device 100 according to the present embodiments is a split electrode assembly.

Referring to FIG. 37, FIG. 38A, and FIG. 38B, in a touch driving period, the driving circuit 120 applies a second electrode driving signal DS2 to the split electrode F53 corresponding to a previously-detected touch position at a point in time t5 at which a first electrode driving signal DS1 is applied to the first electrode S53 corresponding to the previously-detected touch position.

In addition, at each of points in time t4 to t6 at which the first electrode driving signal DS1 is applied to the first electrodes S42 to S44, S52, S54, and S62 to S64 adjacent to and surrounding the first electrode S53 corresponding to the previously-detected touch position, the driving circuit 120 further applies the second electrode driving signal DS2 to the split electrodes F42 to F44, F52, F54, and F62 to F64 corresponding to the surrounding first electrodes S42 to S44, S52, S54, and S62 to S64. Specifically, electrode F53 is at the previously-detected touch position, and electrodes F42, F43, F44, F52, F54, F62, F63 and F64 are adjacent to and surround electrode F53.

When the second electrode E2 is a split electrode assembly, the touch driving method including temporal/spatial partial driving of the second electrode E2 can further reduce power consumption by reducing the driving time of the split electrodes and reducing the number of the split electrodes to be driven while preventing the accuracy of force sensing from being lowered due to partial driving.

Hereinafter, a method of driving the above-described touch display device 100 will be described in brief.

Figure 39:
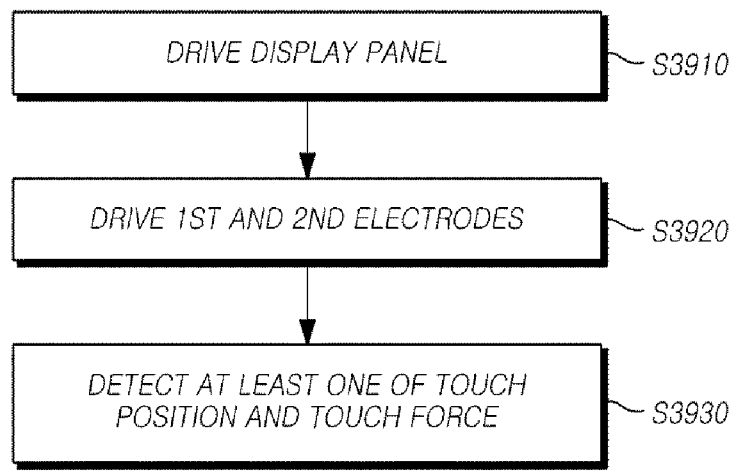
FIG. 39 is a flowchart illustrating the method of driving the touch display device according to the present embodiments.

FIG. 39 is a flowchart illustrating the method of driving the touch display device 100 according to the present embodiments.

Referring to FIG. 39, the method of driving the touch display device 100 according to the present embodiments includes: step S3910 of driving the display panel 110 in a display driving period; step S3920 of sequentially driving the plurality of first electrodes E1 disposed within the display panel 110 and driving the second electrode E2 disposed outside of the display panel 110 in a touch driving period; and step S3930 of detecting at least one of the touch position and the touching force of a touch.

The use of the driving method as described above can detect both the touch position and the touching force using a single operating mode, i.e. a touch mode.

FIG. 40 to FIG. 43 illustrate exemplary display driving ICs 4000, 4100, 4200, and 4300 of the touch display device 100 according to the present embodiments.

Figure 40:
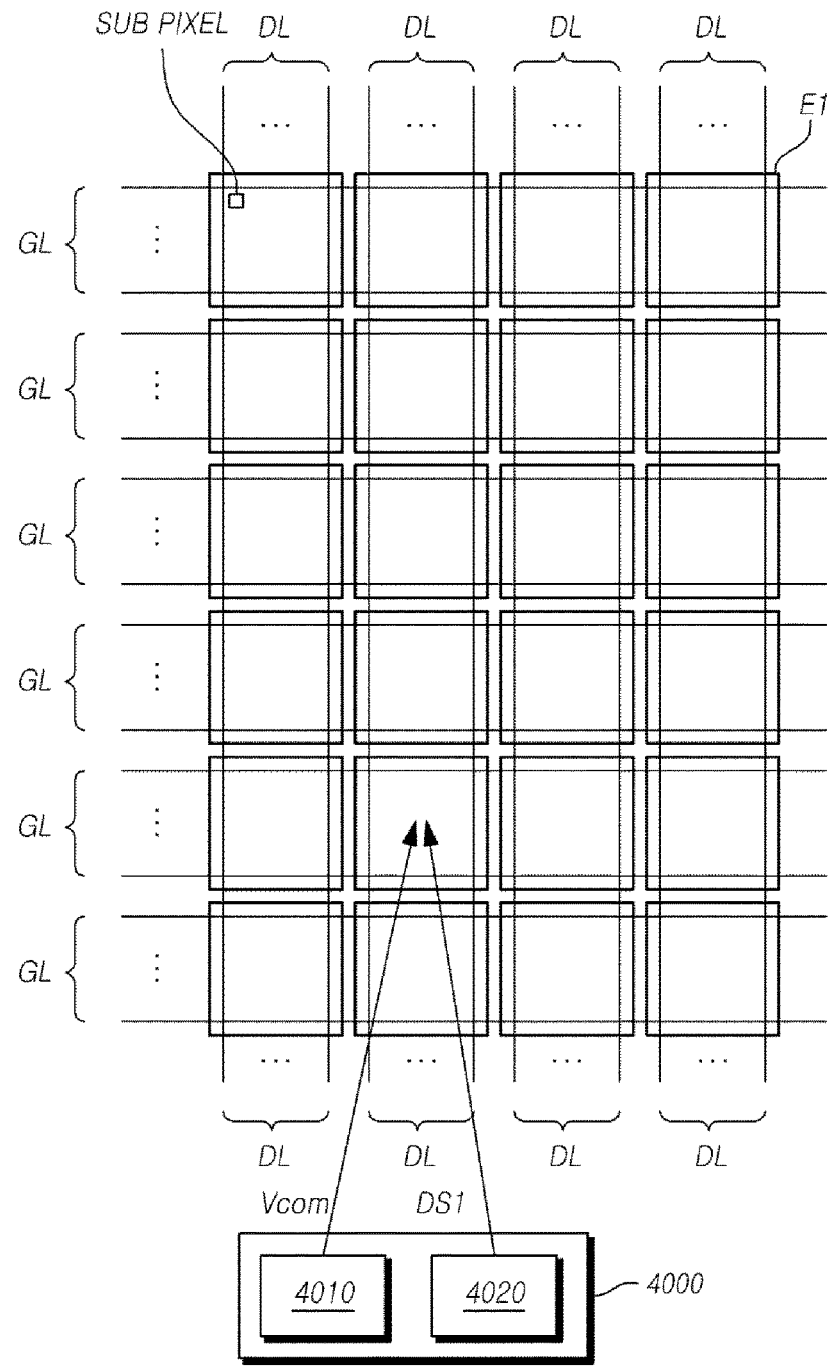
FIG. 40 to FIG. 43 illustrate exemplary display driving ICs of the touch display device according to the present embodiments.

Referring to FIG. 40, the display driving IC 4000 may be a driving IC to drive the first electrode E1.

The display driving IC 4000 includes: a display driving circuit 4010 supplying a display driving voltage (e.g. a common voltage Vcom) to the plurality of first electrodes E1 disposed within the display panel 110 in a display driving period D; and a touch driving circuit 4020 sequentially applying a touch driving signal TDS to at least one first electrode among the plurality of first electrodes E1 in a touch driving period T.

The display driving IC 4000 illustrated in FIG. 40 may be an exemplary embodiment of the first electrode driving circuit 1310 illustrated in FIG. 13A and FIG. 13B.

Figure 41:
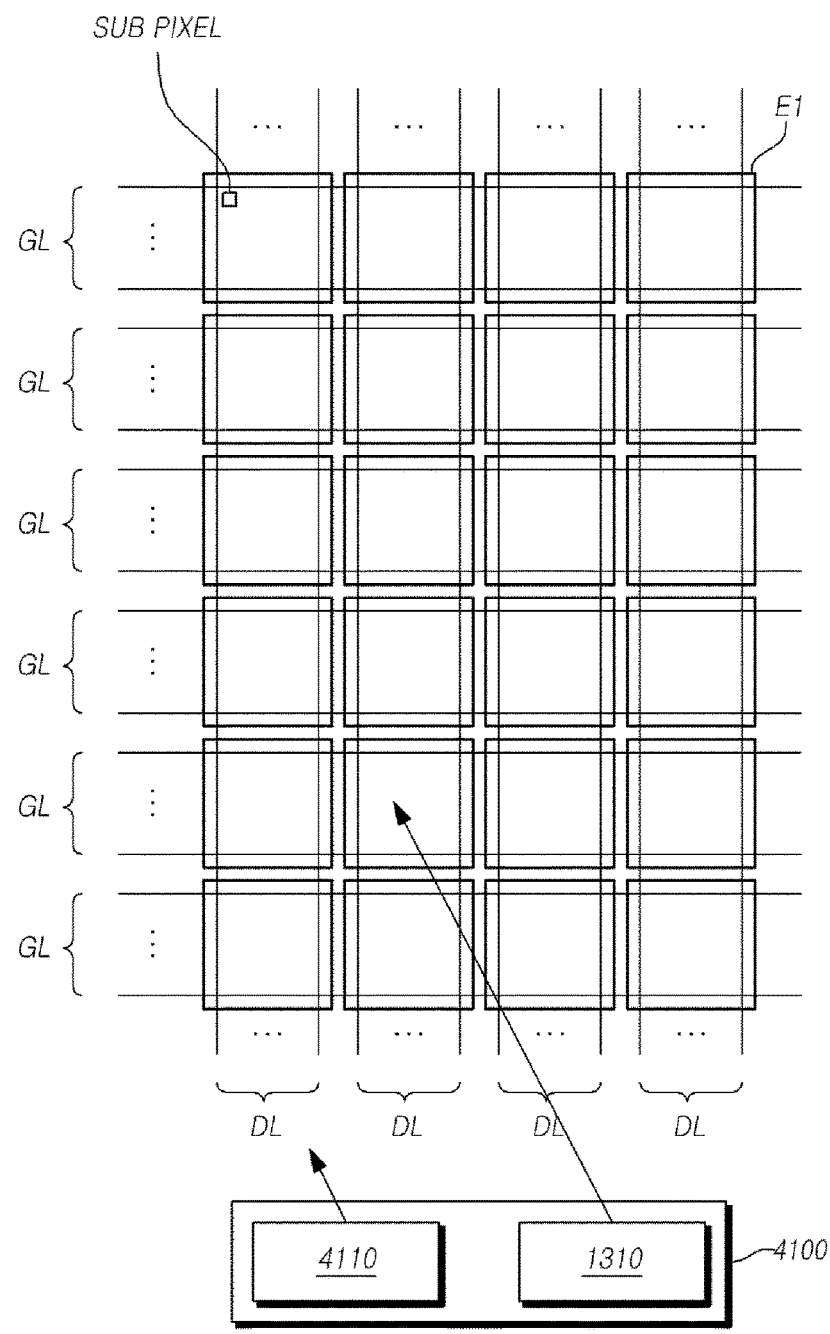

Referring to FIG. 41, the display driving IC 4100 includes the first electrode driving circuit 1310 and a data driving circuit 4110. The data driving circuit 4110 drives a plurality of data lines DL disposed on the display panel 110 by supplying data voltages to the plurality of data lines DL.

Figure 42:
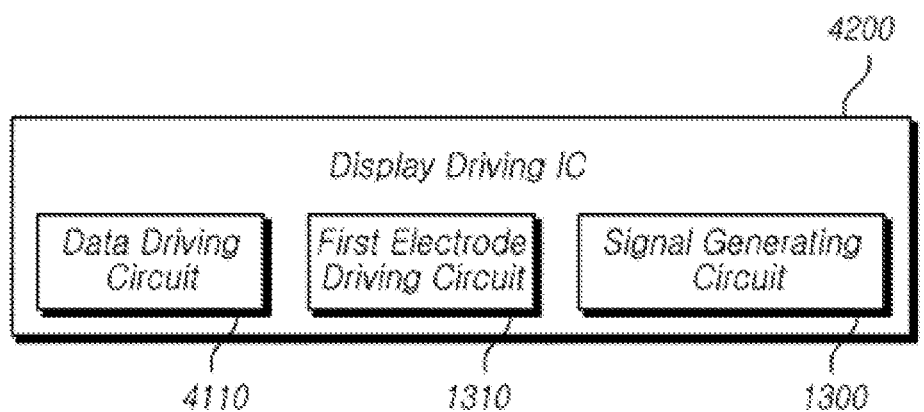

Referring to FIG. 42, the display driving IC 4200 further includes a signal generating circuit 1300, in addition to the first electrode driving circuit 1310 and the data driving circuit 4110.

Figure 43:
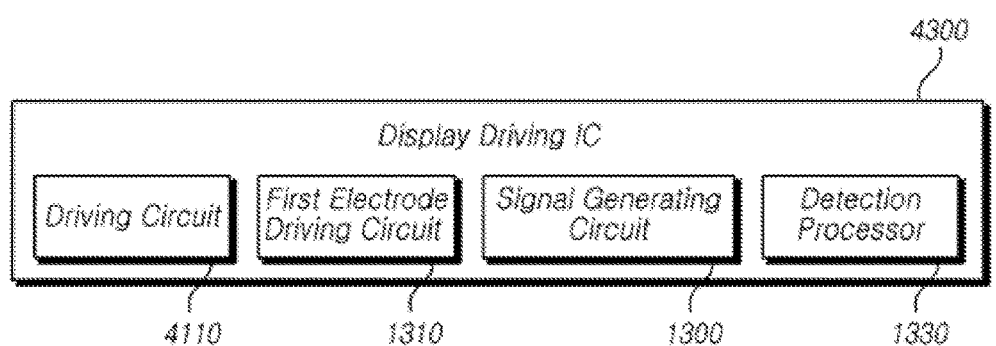

Referring to FIG. 43, the display driving IC 4300 further includes a detection processor 1330, in addition to the first electrode driving circuit 1310, the driving circuit 4110, and the signal generating circuit 1300.

As set forth above, in the driving circuit, the touch display device 100, and the method driving the touch display device according to the present disclosure, when a user touches a screen, not only can a touch position be sensed, but also a touching force with which the user presses the screen can also be efficiently sensed, in order to provide a range of functions.

In addition, in the driving circuit, the touch display device 100, and the method driving the touch display device according to the present disclosure, the electrodes of a single type disposed within the display panel 110 can be simultaneously used for three distinct driving operations, including display (image output), touch sensing, and force sensing.

Furthermore, in the driving circuit, the touch display device 100, and the method driving the touch display device according to the present disclosure, both a touch sensing operation and a force sensing operation can be simultaneously executed in a touch driving period.

In addition, in the driving circuit, the touch display device 100, and the method driving the touch display device according to the present disclosure, it is possible to detect multiple touches by executing force sensing.

In this regard, the touch display device 100 has the second electrode structure including split electrodes, with which force sensing at a plurality of points is enabled.

The foregoing descriptions and the accompanying drawings have been presented in order to explain the certain principles of the present disclosure. A person skilled in the art to which the disclosure relates can make many modifications and variations by combining, dividing, substituting for, or changing the elements without departing from the principle of the disclosure. The foregoing embodiments disclosed herein shall be interpreted as illustrative only but not as limitative of the principle and scope of the disclosure. It should be understood that the scope of the disclosure shall be defined by the appended Claims and all of their equivalents fall within the scope of the disclosure.

What is claimed is:

1. A touch display device comprising:
    a plurality of first electrodes disposed within a display panel;
    one or more second electrodes separated from the first electrodes by a gap and disposed outside of the display panel; and
    a driving circuit, wherein the driving circuit:
        applies a first electrode driving signal to at least one first electrode among the plurality of first electrodes;
        applies a second electrode driving signal different than the first electrode driving signal to the one or more second electrodes while the first electrode driving signal is applied to the at least one first electrode; and
        detects touch position and force touch based on a signal generated responsive to both the first electrode driving signal and the second electrode driving signal,
    wherein the plurality of first electrodes is divided into a plurality of first electrode groups,
        the driving circuit applies, during a touch driving period of a frame period, the first electrode driving signal to respective groups of the first electrode groups, and
        the driving circuit applies, during the touch driving period of the frame period, the second electrode driving signal to the one or more second electrodes.

2. The touch display device according to claim 1, wherein the driving circuit applies a common voltage to the at least one first electrode during a display driving period of the frame period; and
    the touch driving period is distinct in time from the display driving period.

3. The touch display device according to claim 1, wherein the first electrode driving signal is a pulse signal, and the second electrode driving signal is a pulse signal or a signal having a direct current (DC) voltage.

4. The touch display device according to claim 3, wherein, when the first electrode driving signal and the second electrode driving signal are pulse signals, the first electrode driving signal and the second electrode driving signal are in phase with each other or 180 degrees out of phase with each other.

5. The touch display device according to claim 4, wherein, when the first electrode driving signal and the second electrode driving signal are in-phase pulse signals, an amplitude of the second electrode driving signal is greater than an amplitude of the first electrode driving signal.

6. The touch display device according to claim 4, wherein the direct current voltage is a predetermined reference voltage or a ground voltage.

7. The touch display device according to claim 1, wherein the one or more second electrodes is a single second electrode that corresponds to all of the plurality of first electrodes.

8. The touch display device according to claim 7, wherein,
    the driving circuit applies, during the frame period, the first electrode driving signal to respective groups of the first electrode groups at different respective times, and
    the driving circuit applies, during the frame period, the second electrode driving signal to the second electrode only at a point in time at which the first electrode driving signal is applied to an electrode group among the first electrode groups corresponding to a previously-detected touch position.

9. The touch display device according to claim 7, wherein,
    the driving circuit applies, during the frame period, the first electrode driving signal to respective groups of the first electrode groups at different respective times, and
    the driving circuit applies, during the frame period, the second electrode driving signal to the second electrode only at points in time at which the first electrode signal is applied to an electrode group among the first electrode groups corresponding to a previously-detected touch position and is applied to other electrode groups among the first electrode groups that are adjacent to the electrode group.

10. The touch display device according to claim 1, wherein the one or more second electrodes comprises a plurality of second electrodes.

11. The touch display device according to claim 10, wherein,
    the driving circuit applies, during the frame period, the first electrode driving signal to respective groups of the first electrode groups at different respective times, and
    the driving circuit applies, during the frame period, the second electrode driving signal to all of the plurality of second electrodes during each of the different respective times.

12. The touch display device according to claim 10, wherein,
    the plurality of second electrodes is divided into a plurality of second electrode groups corresponding to the first electrode groups,
    the driving circuit applies, during the frame period, the first electrode driving signal to respective groups of the first electrode groups at different respective times while also providing the second electrode driving signal to respective groups of the second electrode groups at each of the different respective times.

13. The touch display device according to claim 10, wherein,
    the driving circuit applies, during the frame period, the first electrode driving signal to respective groups of the first electrode groups at different respective times, and
    the driving circuit applies, during the frame period, the second electrode driving signal to all of the plurality of second electrodes only at a point in time during which the first electrode driving signal is applied to an electrode group among the plurality of first electrode groups corresponding to a previously-detected touch position.

14. The touch display device according to claim 10, wherein,
    the driving circuit applies, during the frame period, the first electrode driving signal to respective groups of the first electrode groups at different respective times, and the driving circuit applies, during the frame period, the second electrode driving signal to all of the plurality of second electrodes only at points in time at which the first electrode signal is applied to an electrode group of the electrode groups and is applied to other electrode groups among the first electrode groups that are adjacent to the electrode group.

15. The touch display device according to claim 10, wherein,
the driving circuit applies, during the frame period, the first electrode driving signal to respective groups of the first electrode groups at different respective times, and
the driving circuit applies the second electrode driving signal during the frame period and at a point in time at which the first electrode driving signal is applied to an electrode group among the plurality of first electrode groups corresponding to a previously-detected touch position, the second electrode driving signal applied only to a single second electrode among the plurality of second electrodes that corresponds to the previously-detected touch position.

16. The touch display device according to claim 10, wherein,
the driving circuit applies, during the frame period, the first electrode driving signal to respective groups of the first electrode groups at different respective times, and
the driving circuit applies the second electrode driving signal during the frame period and at a point in time at which the first electrode driving signal is applied to an electrode group among the plurality of first electrode groups corresponding to a previously-detected touch position and other electrode groups among the plurality of first electrode groups adjacent to the electrode group, the second electrode driving signal applied only to a subset of the second electrodes corresponding to the previously-detected touch position and adjacent to the previously-detected touch position.

17. The touch display device according to claim 1, wherein the signal used by the driving circuit to detect touch position and force touch is a signal received from the one or more first electrodes.

18. The touch display device according to claim 1, wherein a size of the gap varies depending on a force of a touch.

19. A driving circuit for a touch display device, the touch display device comprising a plurality of first electrodes disposed within a display panel and one or more second electrodes separated from the first electrodes by a gap and disposed outside of the display panel, the driving circuit comprising:
a first circuit to apply a first electrode driving signal to at least one first electrode among the plurality of first electrodes;
a second circuit to apply a second electrode driving signal different than the first electrode driving signal to the one or more second electrodes while the first electrode driving signal is applied to the at least one first electrode; and
a third circuit to detect touch position and force touch based on a signal generated responsive to both the first electrode driving signal and the second electrode driving signal,
wherein the plurality of first electrodes is divided into a plurality of first electrode groups,
the first circuit applies, during a touch driving period of a frame period, the first electrode driving signal to respective groups of the first electrode groups, and
the second circuit applies, during the touch driving period of the frame period, the second electrode driving signal to the one or more second electrodes.

20. The driving circuit of claim 19, wherein
the first circuit applies a common voltage to the at least one first electrode during a display driving period of the frame period; and
the touch driving period is distinct in time from the display driving period.

21. The driving circuit of claim 20, wherein the first electrode driving signal is a pulse signal, and the second electrode driving signal is a pulse signal or a signal having a direct current (DC) voltage.

22. The driving circuit of claim 21, wherein, when the first electrode driving signal and the second electrode driving signal are pulse signals, the first electrode driving signal and the second electrode driving signal are in phase with each other or 180 degrees out of phase with each other.

23. The driving circuit of claim 22, wherein, when the first electrode driving signal and the second electrode driving signal are in-phase pulse signals, an amplitude of the second electrode driving signal is greater than an amplitude of the first electrode driving signal.

24. The driving circuit of claim 21, wherein the direct current voltage is a predetermined reference voltage or a ground voltage.

25. A method of driving a touch display device, the touch display device comprising a plurality of first electrodes disposed within a display panel, and one or more second electrodes separated from the first electrodes by a gap and disposed outside of the display panel, the method comprising:
applying a first electrode driving signal to at least one first electrode among the plurality of first electrodes;
applying a second electrode driving signal different than the first electrode driving signal to the one or more second electrodes while the first electrode driving signal is applied to the at least one first electrode; and
detecting touch position and force touch based on a signal generated responsive to both the first electrode driving signal and the second electrode driving signal,
wherein the plurality of first electrodes is divided into a plurality of first electrode groups,
the touch display device applies, during a touch driving period of a frame period, the first electrode driving signal to respective groups of the first electrode groups, and
the touch display device applies, during the touch driving period of the frame period, the second electrode driving signal to the one or more second electrodes.

26. The method of claim 25, further comprising:
applying a common voltage to the at least one first electrode during a display driving period of the frame period; and
the touch driving period distinct in time from the display driving period.

27. The method of claim 25, wherein the first electrode driving signal is a pulse signal, and the second electrode driving signal is a pulse signal or a signal having a direct current (DC) voltage.

28. The method of claim 27, wherein, when the first electrode driving signal and the second electrode driving signal are pulse signals, the first electrode driving signal and the second electrode driving signal are in phase with each other or 180 degrees out of phase with each other.

29. The method of claim 28, wherein, when the first electrode driving signal and the second electrode driving signal are in-phase pulse signals, an amplitude of the second electrode driving signal is greater than an amplitude of the first electrode driving signal.

30. A touch display device comprising:
- a plurality of first electrodes disposed within a display panel;
- one or more second electrodes separated from the first electrodes by a gap and disposed outside of the display panel;
- a first driving circuit configured to apply a first electrode driving signal to at least one first electrode among the plurality of first electrodes; and
- a second driving circuit configured to apply a second electrode driving signal different than the first electrode driving signal to the one or more second electrodes while the first electrode driving signal is applied to the at least one first electrode,
- wherein the first driving circuit detects touch position and force touch based on a signal generated responsive to both the first electrode driving signal and the second electrode driving signal, and
- wherein the plurality of first electrodes is divided into a plurality of first electrode groups,
- the first driving circuit applies, during a touch driving period of a frame period, the first electrode driving signal to respective groups of the first electrode groups, and
- the second driving circuit applies, during the touch driving period of the frame period, the second electrode driving signal to the one or more second electrodes.

* * * * *